United States Patent
Adams et al.

(10) Patent No.: US 6,290,068 B1
(45) Date of Patent: Sep. 18, 2001

(54) SHAKER SCREENS AND METHODS OF USE

(75) Inventors: Thomas C. Adams, Hockley; Kenneth W. Seyffert, Houston; David W. Largent, Cleveland, all of TX (US); David L. Schulte, Broussard, LA (US); Guy L. McClung, III, Spring, TX (US); Jeffrey E. Walker, Lafayette, LA (US); Hector M. Murray, Willis, TX (US); James F. Maroney, III; Joseph C. Winkler, both of Houston, TX (US)

(73) Assignee: Tuboscope I/P, Inc., Houston, TX (US)

( * ) Notice: Subject to any disclaimer, the term of this patent is extended or adjusted under 35 U.S.C. 154(b) by 0 days.

(21) Appl. No.: 09/296,975

(22) Filed: Apr. 22, 1999

Related U.S. Application Data

(63) Continuation-in-part of application No. 09/228,572, filed on Jan. 11, 1999, which is a continuation-in-part of application No. 09/183,005, filed on Oct. 30, 1998, which is a continuation-in-part of application No. 09/090,554, filed on Jun. 4, 1998, which is a continuation-in-part of application No. 08/895,976, filed on Jul. 17, 1997, which is a continuation-in-part of application No. 08/786,515, filed on Jan. 21, 1997, and a continuation-in-part of application No. 08/598,566, filed on Feb. 12, 1996, now abandoned, said application No. 08/786,515, is a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, which is a continuation-in-part of application No. 08/056,123, filed on Apr. 30, 1993, now Pat. No. 5,385,669, and a continuation-in-part of application No. 08/105,696, filed on Aug. 12, 1993, now Pat. No. 5,392,925, and a continuation-in-part of application No. 08/504,495, filed on Jul. 20, 1995, and a continuation-in-part of application No. 08/598,566, filed on Feb. 12, 1996, which is a continuation-in-part of application No. 08/220,101, filed on Mar. 30, 1994, now Pat. No. 5,490,598.

(51) Int. Cl.[7] .................................................. B07B 1/49

(52) U.S. Cl. .................... 209/401; 209/399; 209/403; 210/488; 210/493.1; 210/499

(58) Field of Search .................................... 209/397, 399, 209/401, 403, 405, 409; 210/488, 489, 493.1, 493.5, 498, 499

(56) References Cited

U.S. PATENT DOCUMENTS

H1481 * 9/1995 Ray ........................................ 428/98

(List continued on next page.)

FOREIGN PATENT DOCUMENTS 2912228A 10/1980 (DE) .

(List continued on next page.)

OTHER PUBLICATIONS

U.S. Application S.N. 08/282,983; filed Jul. 29, 1994 entitled "Shale Shaker Screens," co-owned with present invention/application.

(List continued on next page.)

*Primary Examiner*—Tuan N. Nguyen
(74) *Attorney, Agent, or Firm*—Guy McClung

(57) ABSTRACT

A screen assembly for a vibratory separator has been invented, which, in certain aspects, has at least two ridge-valley series of screening material with a plurality of alternating ridges and valleys of screening material, and at least one ridge-valley series of screening material offset from at least one other ridge-valley series of screening material. A screen assembly for a vibratory separator has been invented, which, in certain aspects, has at least one ridge-valley series of screening material, said ridge-valley series including a plurality of ridges each ridge between valleys of a plurality of valleys, and each ridge having a first end spaced apart from a second end, said first end having a top wider than a top of second end.

26 Claims, 58 Drawing Sheets

U.S. PATENT DOCUMENTS

| | | |
|---|---|---|
| 40,242 | 10/1863 | Capell . |
| 236,416 | 1/1881 | Bourne . |
| 246,144 | 8/1881 | Keeler . |
| 268,491 | 12/1882 | Hubbell . |
| 275,190 | 4/1883 | Gilbert . |
| 275,340 | 4/1883 | Kimball . |
| 500,302 | 6/1893 | Stoecket et al. . |
| 516,673 | 3/1894 | Wilson . |
| 526,562 | 9/1894 | Cross . |
| 560,858 | 5/1896 | Missroon . |
| 583,981 | 6/1897 | Plaisted . |
| 607,598 | 7/1898 | Closz . |
| 777,317 | 12/1904 | Traylor . |
| 865,185 | 9/1907 | Kerrigan . |
| 948,222 | 2/1910 | Honabach . |
| 964,897 | 7/1910 | Bryant . |
| 966,578 | 8/1910 | Murphy et al. ............ 209/401 X |
| 984,866 | 2/1911 | Tate . |
| 1,082,612 | 12/1913 | Smith et al. . |
| 1,098,979 | 6/1914 | Schuchard . |
| 1,132,667 | 3/1915 | Milliot . |
| 1,139,041 | 5/1915 | Larson . |
| 1,242,982 | 10/1917 | Reynolds . |
| 1,248,081 | 11/1917 | Couch . |
| 1,250,768 | 12/1917 | Baumgartner ............. 209/392 |
| 1,344,747 | 6/1920 | Wright . |
| 1,359,426 | 11/1920 | Plaisted . |
| 1,397,339 | 11/1921 | Sturtevant . |
| 1,423,021 | 7/1922 | Reynolds . |
| 1,462,804 | 7/1923 | Evans . |
| 1,505,735 | 8/1924 | Stebbins . |
| 1,561,632 | 11/1925 | Woodward . |
| 1,614,586 | 1/1927 | Anderson et al. . |
| 1,626,774 | 5/1927 | Allan . |
| 1,678,941 | 7/1928 | Helman . |
| 1,713,143 | 5/1929 | Overstrom . |
| 1,716,758 | 6/1929 | Bland . |
| 1,785,195 | 12/1930 | Hoes et al. . |
| 1,822,298 | 9/1931 | Kerrigan . |
| 1,879,377 | 9/1932 | McNeely . |
| 1,950,861 | 3/1934 | O'Toole, Sr. . |
| 1,997,713 | 4/1935 | Boehm . |
| 1,997,740 | 4/1935 | Nickerson . |
| 2,052,467 | 8/1936 | Hermann ............... 209/401 |
| 2,061,850 | 11/1936 | Roberts . |
| 2,082,513 | 6/1937 | Roberts . |
| 2,089,548 | 8/1937 | Frantz et al. . |
| 2,104,785 | 1/1938 | Akeyson ............. 210/384 |
| 2,190,262 | 2/1940 | Geist . |
| 2,251,909 | 8/1941 | Lindsay ............. 210/149 |
| 2,274,700 | 3/1942 | Jenks . |
| 2,335,084 | 11/1943 | Rice .................. 209/408 |
| 2,406,051 | 8/1946 | Weiss . |
| 2,462,878 | 3/1949 | Logue . |
| 2,480,320 | 8/1949 | Carrier ............... 210/388 |
| 2,511,239 | 6/1950 | Behnke et al. ............ 209/403 |
| 2,648,441 | 8/1953 | Soldan . |
| 2,667,975 | 2/1954 | Seaholm ............. 210/152 |
| 2,670,079 | 2/1954 | Betts ................. 209/405 |
| 2,677,462 | 5/1954 | Conkling ............ 209/403 |
| 2,723,032 | 11/1955 | Gisler et al. . |
| 2,726,184 | 12/1955 | Cox et al. . |
| 2,774,477 | 12/1956 | Pollitz .................. 209/403 |
| 2,800,227 | 7/1957 | Kiger ............... 209/412 X |
| 2,813,629 | 11/1957 | Brugmann ............ 209/403 |
| 2,827,169 | 3/1958 | Cusi . |
| 2,902,165 | 9/1959 | Imershein . |
| 2,929,464 | 3/1960 | Sprouse . |
| 2,973,865 | 3/1961 | Cibula ............... 209/392 X |
| 2,980,208 | 4/1961 | Neumann . |
| 2,985,303 | 5/1961 | Wright . |
| 3,057,481 | 10/1962 | Pale ................... 210/493 |
| 3,070,231 | 12/1962 | McCorkel et al. ............. 209/319 |
| 3,092,573 | 6/1963 | Lambert et al. ........... 209/403 |
| 3,165,473 | 1/1965 | Pall et al. .............. 210/510 |
| 3,176,643 | 4/1965 | Hoskins et al. ........... 209/403 |
| 3,243,943 | 4/1966 | Getzin ................ 55/499 |
| 3,255,885 | 6/1966 | Burls ................. 207/314 |
| 3,285,413 | 11/1966 | Taylor-Smith . |
| 3,458,978 | 8/1969 | Davis ................. 55/499 |
| 3,464,413 | 9/1969 | Rosaen et al. ........... 29/428 |
| 3,542,636 | 11/1970 | Wandel ............... 161/114 |
| 3,574,103 | 4/1971 | Latkin ................ 428/72 |
| 3,655,060 | 4/1972 | Hagdahl .............. 210/493 |
| 3,679,057 | 7/1972 | Perez ................. 210/223 |
| 3,716,138 | 2/1973 | Lumsden ............. 209/401 |
| 3,747,770 | 7/1973 | Zentis ................ 210/402 |
| 3,747,772 | 7/1973 | Brown ................ 210/493 |
| 3,789,498 | 2/1974 | Cole .................. 29/470.9 |
| 3,793,692 | 2/1974 | Tate et al. ............ 29/163.5 |
| 3,853,529 | 12/1974 | Boothe et al. ............ 55/499 |
| 3,900,628 | 8/1975 | Stewart . |
| 4,019,987 | 4/1977 | Krashow .............. 210/232 |
| 4,022,596 | 5/1977 | Pedersen .............. 55/523 |
| 4,033,865 | 7/1977 | Derrick, Jr. ............ 209/275 |
| 4,062,769 | 12/1977 | Simonson ............ 209/399 |
| 4,075,106 | * 2/1978 | Yamazaki ............. 210/487 |
| 4,138,303 | * 2/1979 | Taylor ................ 156/264 |
| 4,380,494 | * 4/1983 | Wilson ................ 209/319 |
| 4,410,427 | * 10/1983 | Wydeven .............. 210/317 |
| 4,464,242 | * 8/1984 | Boulton ............... 209/397 |
| 4,472,473 | 9/1984 | Davis et al. ............ 428/184 |
| 4,546,783 | 10/1985 | Lott ................... 134/109 |
| 4,575,421 | * 3/1986 | Derrick et al. ........... 209/397 |
| 4,582,597 | 4/1986 | Huber ................. 204/313 |
| 4,589,983 | * 5/1986 | Wydeven .............. 210/317 |
| 4,617,122 | * 10/1986 | Kruse et al. ........... 210/493.3 |
| 4,634,535 | 1/1987 | Lott ................... 210/780 |
| 4,678,578 | * 7/1987 | Nodes et al. ........... 210/445 |
| 4,696,751 | * 9/1987 | Eifling ................ 210/780 |
| 4,728,422 | * 3/1988 | Bailey ................ 210/314 |
| 4,769,968 | 9/1988 | Davis et al. ............ 52/814 |
| 4,819,809 | 4/1989 | Derrick ............... 209/275 |
| 4,820,407 | * 4/1989 | Lilie .................. 209/397 |
| 4,832,834 | * 5/1989 | Baird, Jr. ............. 209/397 |
| 4,857,176 | 8/1989 | Derrick et al. ........... 209/392 |
| 4,882,044 | 11/1989 | Friessle ............... 209/319 |
| 4,882,054 | * 11/1989 | Derrick et al. ........... 210/389 |
| 4,892,767 | 1/1990 | Freissle ............... 428/52 |
| 4,940,500 | 7/1990 | Tadokoro et al. ........... 156/204 |
| 4,954,249 | 9/1990 | Gero et al. ............ 209/273 |
| 5,028,474 | 7/1991 | Czaplicki ............. 428/178 |
| 5,056,286 | 10/1991 | Bokor ................ 52/483 |
| 5,084,178 | * 1/1992 | Miller et al. ........... 210/493.5 |
| 5,137,622 | 8/1992 | Souter ................ 209/403 |
| 5,139,154 | 8/1992 | Gero et al. ............ 209/273 |
| 5,162,143 | 11/1992 | Porter et al. ............ 428/179 |
| 5,167,740 | 12/1992 | Michaelis et al. ............ 156/73.1 |
| 5,190,651 | * 3/1993 | Spencer et al. ........... 210/305 |
| 5,211,291 | * 5/1993 | Kelley et al. ............ 209/680 |
| 5,221,008 | * 6/1993 | Derrick, Jr. et al. ........... 209/269 |
| 5,256,292 | * 10/1993 | Cagle ................. 210/499 |
| 5,312,508 | * 5/1994 | Chisholm ............. 156/292 |
| 5,330,057 | * 7/1994 | Schiller et al. ........... 209/392 |
| 5,385,669 | * 1/1995 | Leone, Sr. ............. 210/488 |
| 5,392,925 | * 2/1995 | Seyffert ............... 209/405 |
| 5,417,793 | * 5/1995 | Bakula ................ 156/308.2 |
| 5,417,858 | * 5/1995 | Derrick et al. ........... 210/388 |
| 5,417,859 | * 5/1995 | Bakula ................ 210/388 |
| 5,490,598 | * 2/1996 | Adams ............... 209/403 X |
| 5,614,094 | 3/1997 | Deister et al. ........... 210/388 |

| | | | |
|---|---|---|---|
| 5,636,749 | 6/1997 | Wojciechowski | 209/403 |
| 5,720,881 | 2/1998 | Derrick et al. | 210/388 |
| 5,851,393 | 12/1998 | Carr et al. | 204/489 |
| 5,868,929 | 2/1999 | Derrick et al. | 210/388 |
| 5,876,552 | 3/1999 | BAkula | 156/308.2 |
| 5,944,993 | 8/1999 | Derrick et al. | 210/388 |
| 5,950,841 | 9/1999 | Knox et al. | 209/315 |
| 5,958,236 | 9/1999 | Bakula | 210/388 |
| 5,967,336 | 10/1999 | Baltzer et al. | 209/403 |
| 5,984,107 | 11/1999 | Bleh | 209/320 |
| 5,992,641 | 11/1999 | Caldwell, Jr. | 209/273 |
| 6,000,556 | 12/1999 | Bakula | 210/388 |
| 6,000,558 | 12/1999 | Proulx et al. | 210/486 |
| 6,006,923 | 12/1999 | Helmy et al. | 209/397 |
| 6,019,228 | 2/2000 | Duggan | 209/408 |
| 6,053,331 * | 4/2000 | Cravello | 209/403 X |
| 6,053,332 | 4/2000 | Bakula | 210/388 |

FOREIGN PATENT DOCUMENTS

| | | | |
|---|---|---|---|
| 3827259A | 4/1989 | (DE) . | |
| 8904477 U | 11/1989 | (DE) . | |
| 269877 | 4/1928 | (GB) | 8794/27 |
| 519680 | 4/1940 | (GB) . | |
| 823648 | 11/1959 | (GB) . | |
| 1412975 | 11/1975 | (GB) . | |
| 2124099A | 2/1984 | (GB) . | |
| 2161715A | 1/1986 | (GB) . | |
| 2161715B | 6/1988 | (GB) . | |
| 59-142818 | 8/1984 | (JP) . | |
| WO 9200133A | 1/1992 | (WO) . | |
| PCT/GB91/ 00957 | 6/1992 | (WO) . | |
| PCT/US94/ 00243 | 7/1994 | (WO) . | |
| WO 9415723A | 7/1994 | (WO) . | |
| WO 9611070A | 4/1996 | (WO) . | |
| PCT/EP96/ 03103 | 2/1997 | (WO) . | |
| WO 9703765A | 2/1997 | (WO) . | |
| WO 9523655A | 9/1998 | (WO) . | |

OTHER PUBLICATIONS

"The Future of Fine Screening," Derrick Equipment Co. 1993.

"Derrick Pyramid Screens," Derrick Corp.

"Advanced Wirecloth, Inc," Advanced Wirecloth, Inc., 1993.

"CPI Group, Inc.," CPI Group, Inc., 1990.

"LM3 Full–Flo ™ Shale Shaker," sweco Oilfield Services, 1991.

Pending U.S. Application 08/220,101 filed Mar. 30, 1994 entitled "Screen For Vibrating Separator".

Amendment Under 37 CFR 1.115 in pending U.S. S.N. 08/220,101.

Offical Gazette Entry for U.S. Patent 5,626,234, May 6, 1997.

The Brandt Company General Catalog 1982–1983, 4 pages, 1982.

Take the Drilled Solids Out, The Brandt Company, Sep. 1980.

Sweco Full–Flow, Sweco, Inc. 1992.

Catalog 105 H&K Perforated Materials, Harrington & King–Perforating Co., 1988.

Sweco Oilfield Services, Composite Catalog, 1992.

Screening Equipment Handbook, Pankratz, 1988.

Supertaut Mud Cleaner Screens, Sweco Oilfield Services, 1992.

Filtration & Separation, Flo Trend Systems, Inc. 1989.

Clean Liquids/Dry Solids, Flo Trend Systems, Inc. 1989.

Mcnally Coal Preparation Manual M 576, pp. 111,73–96, 216 (1978).

Layered Shale Shaker Screens Improve Mud Solids Control, World Oil, 1978.

Int'l Search Report, PCT/GB97/00385 co–owned with present application.

* cited by examiner

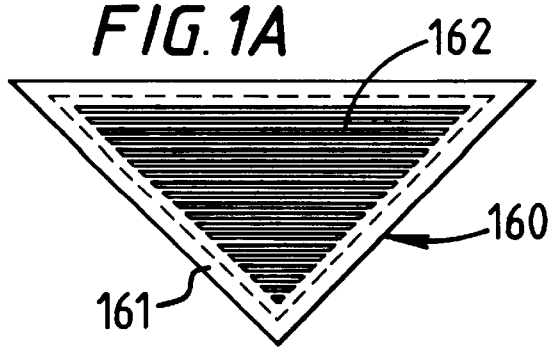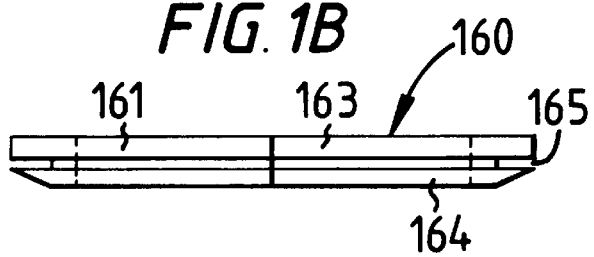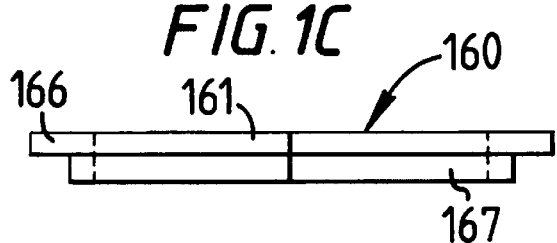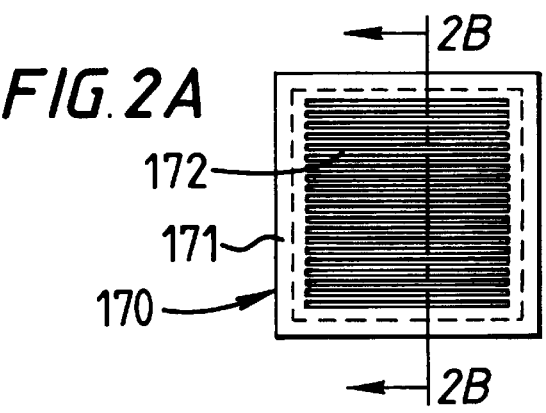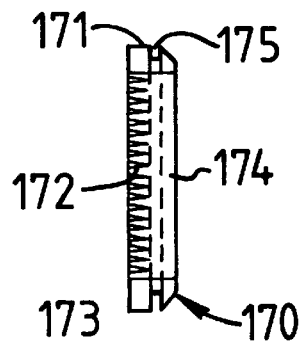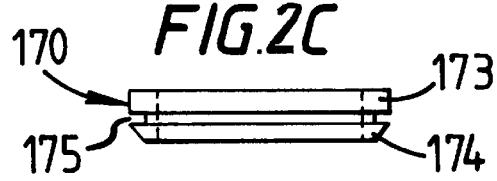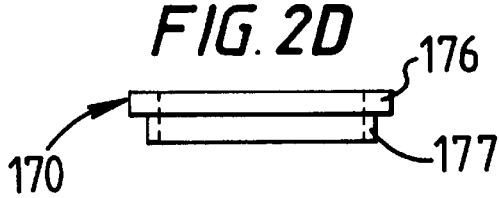

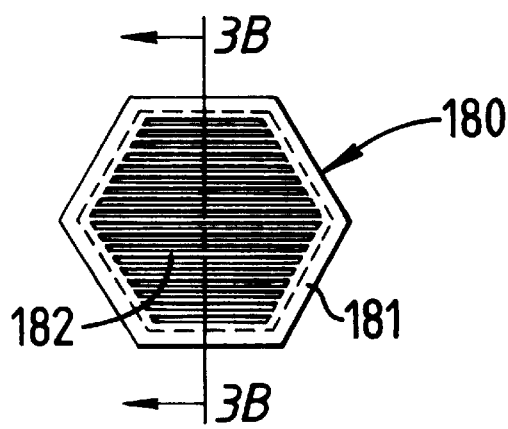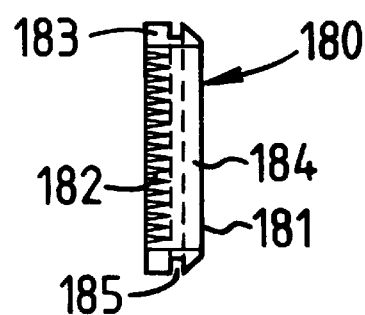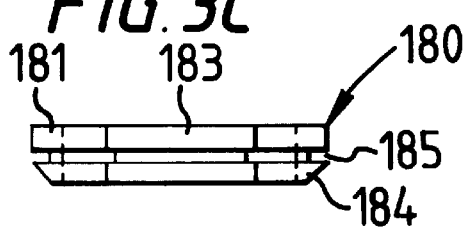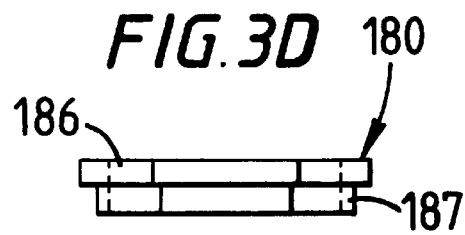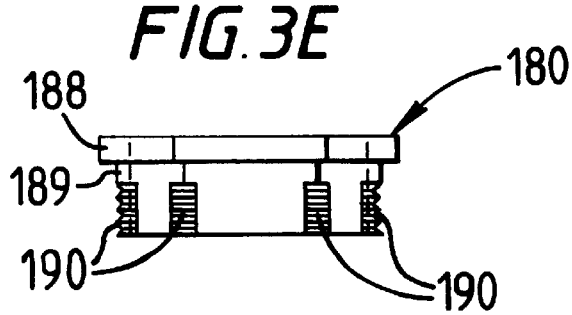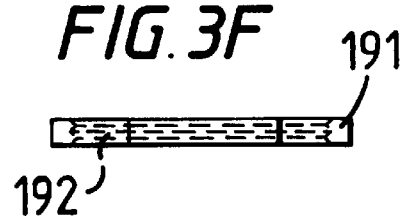

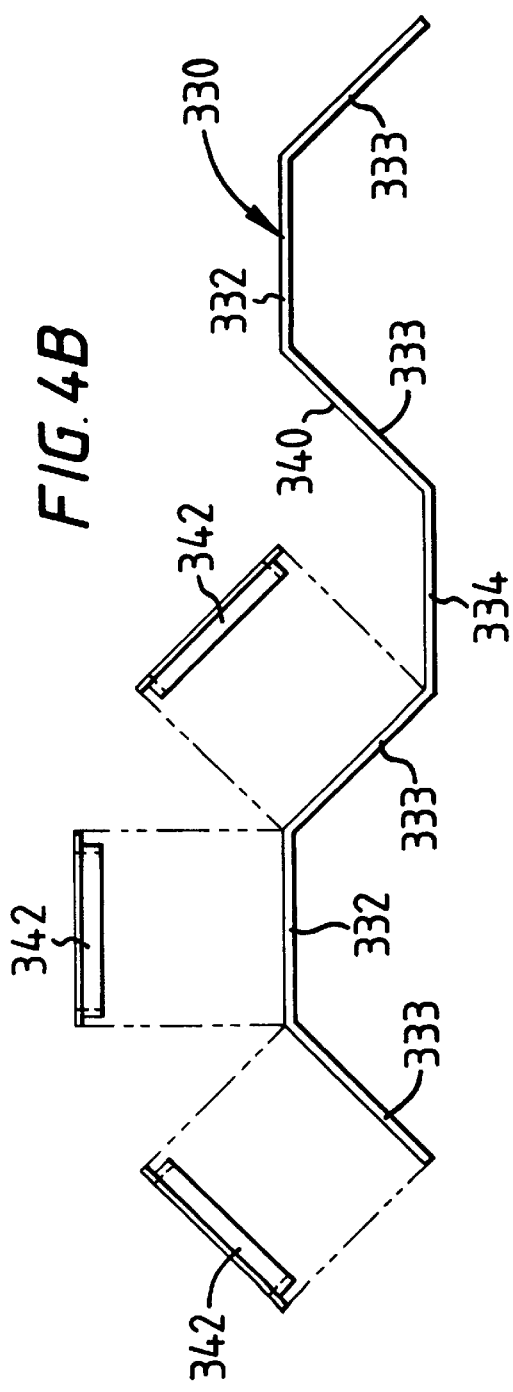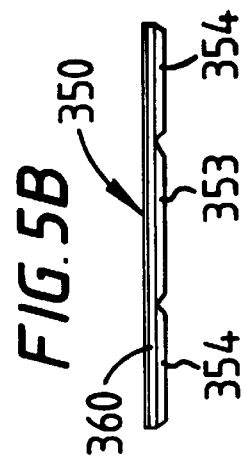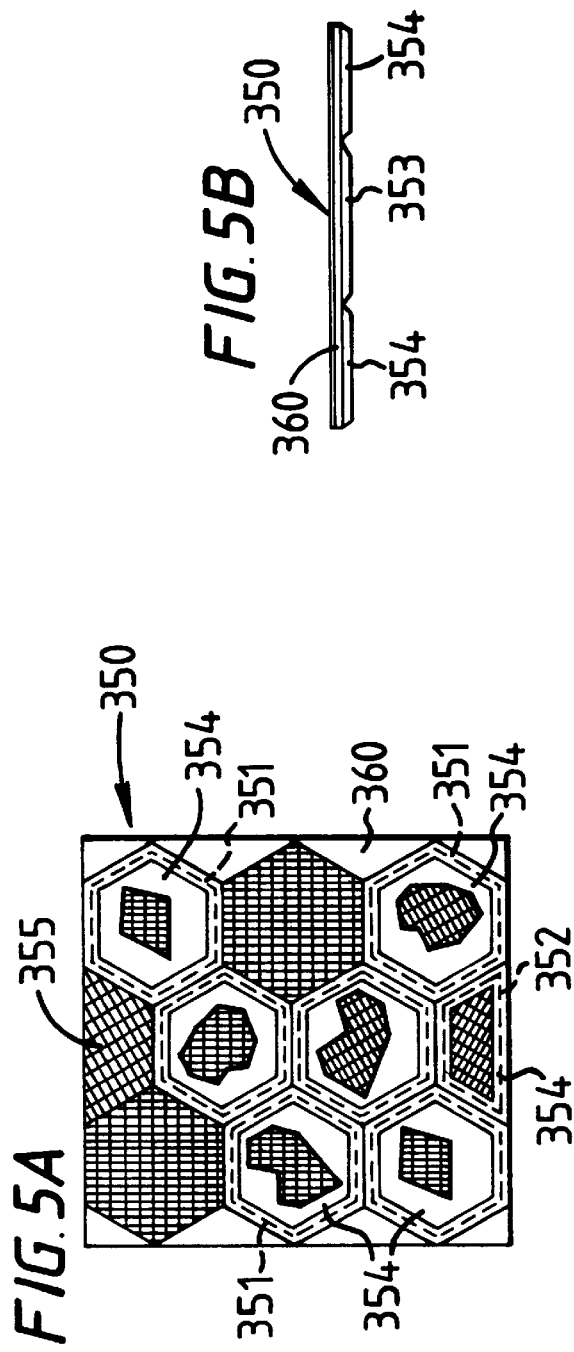

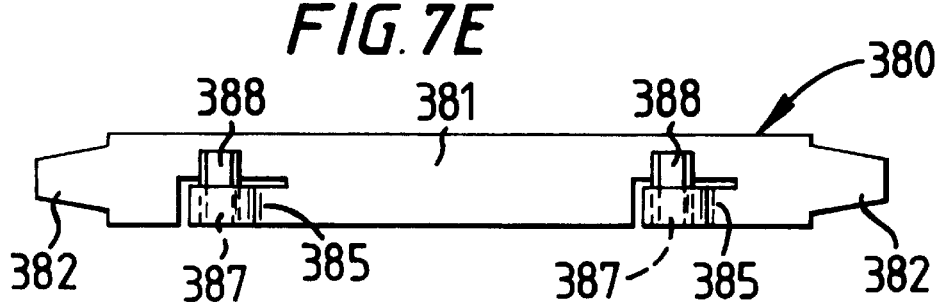
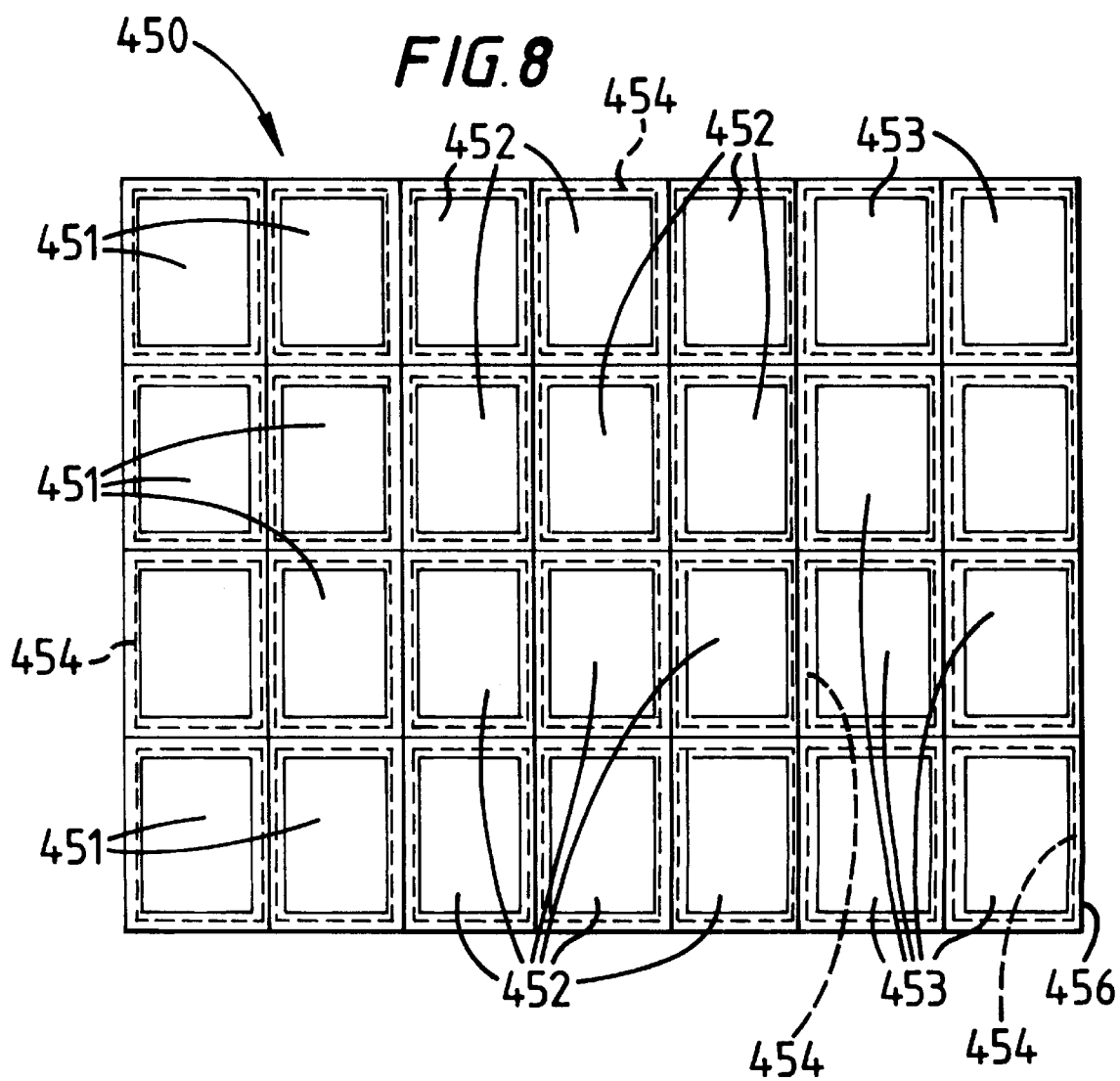

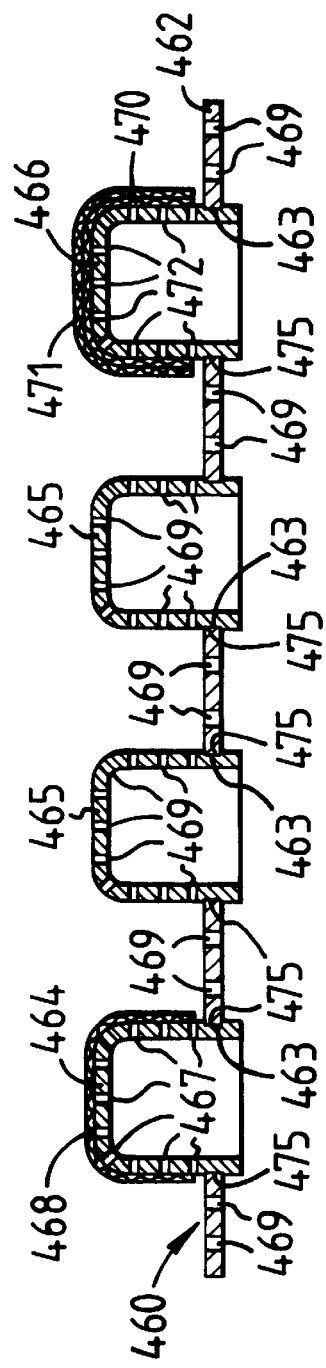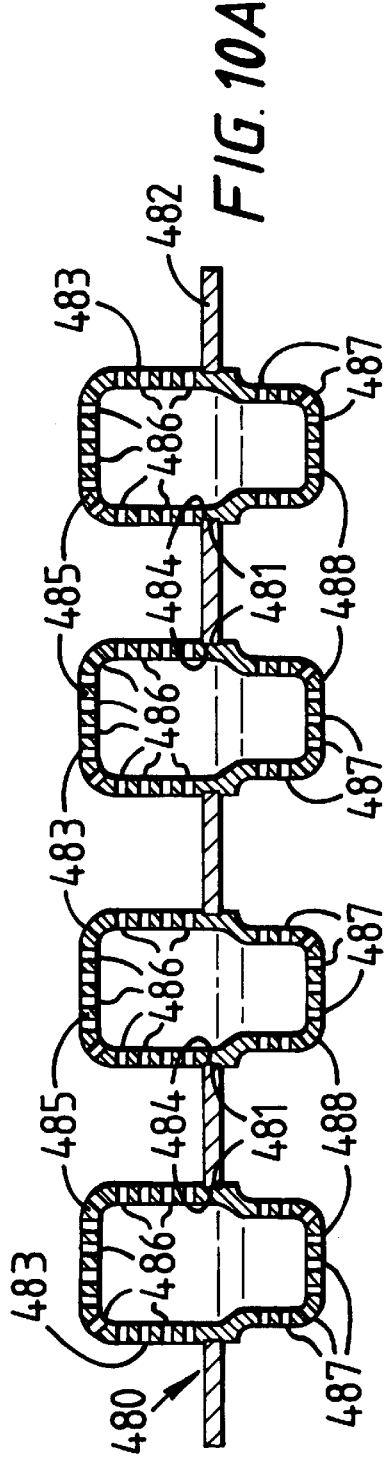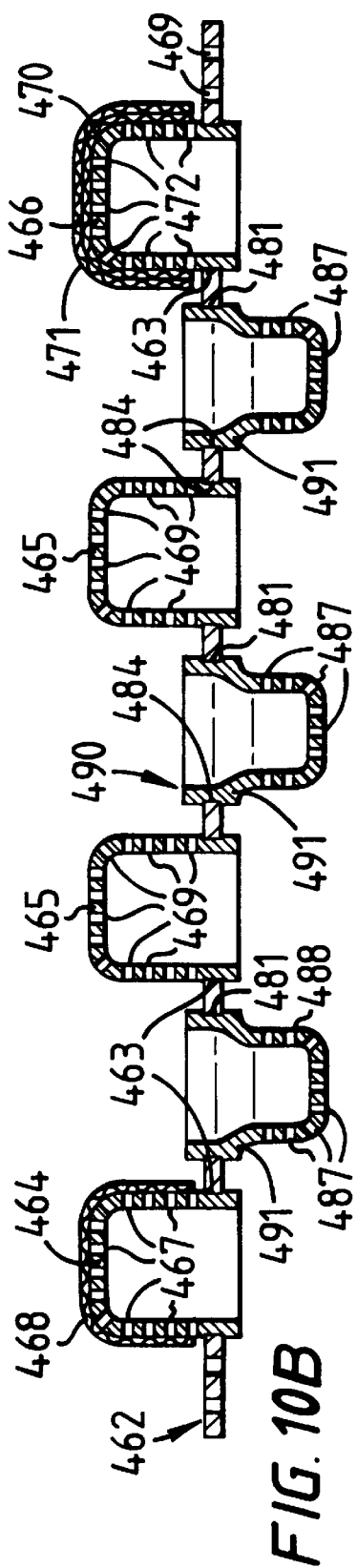

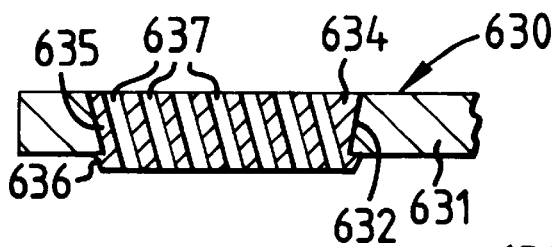
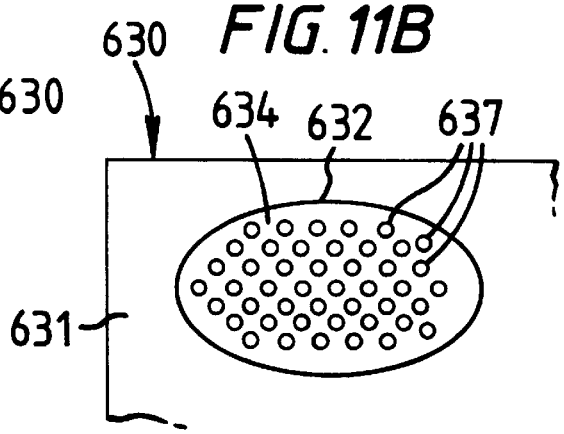
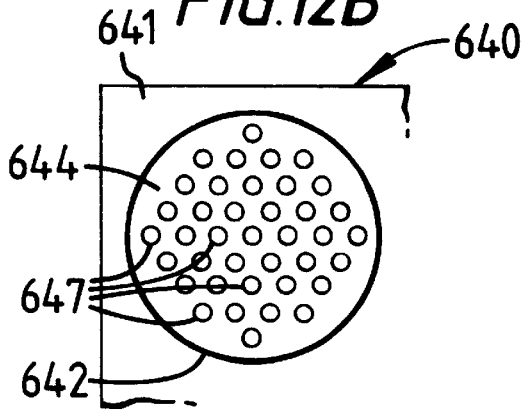
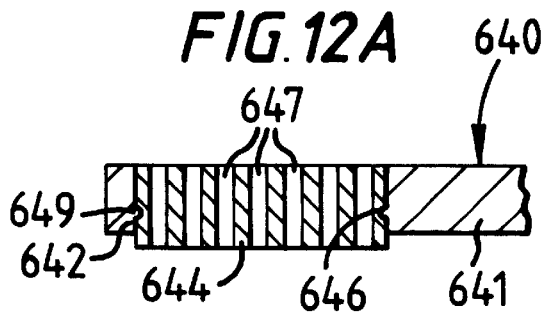
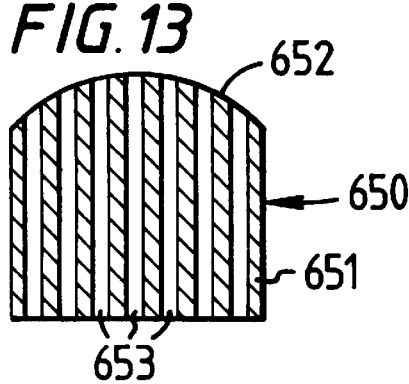
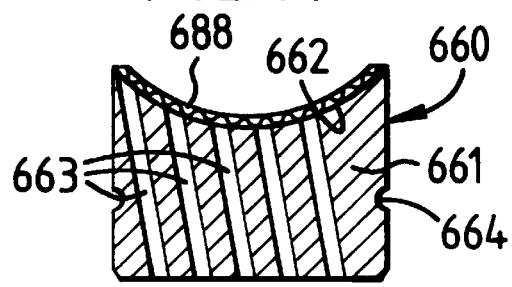
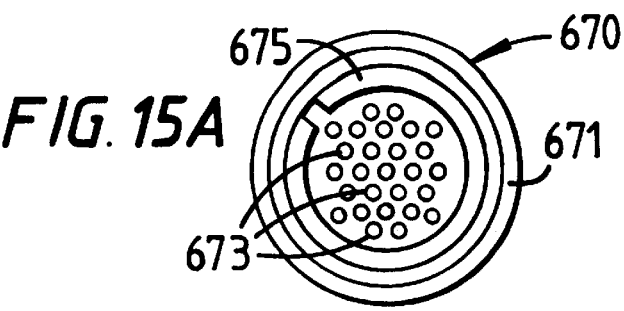
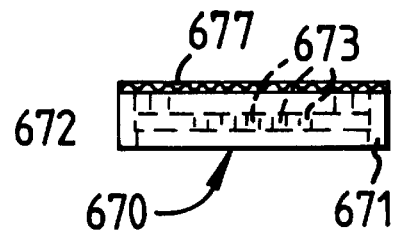

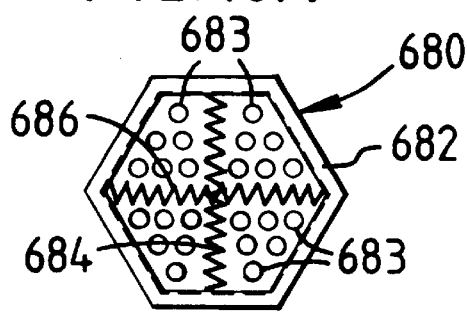
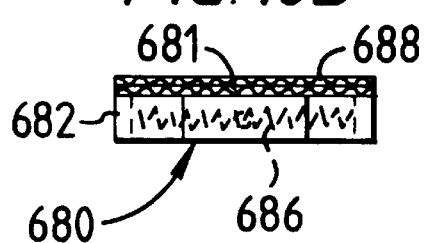
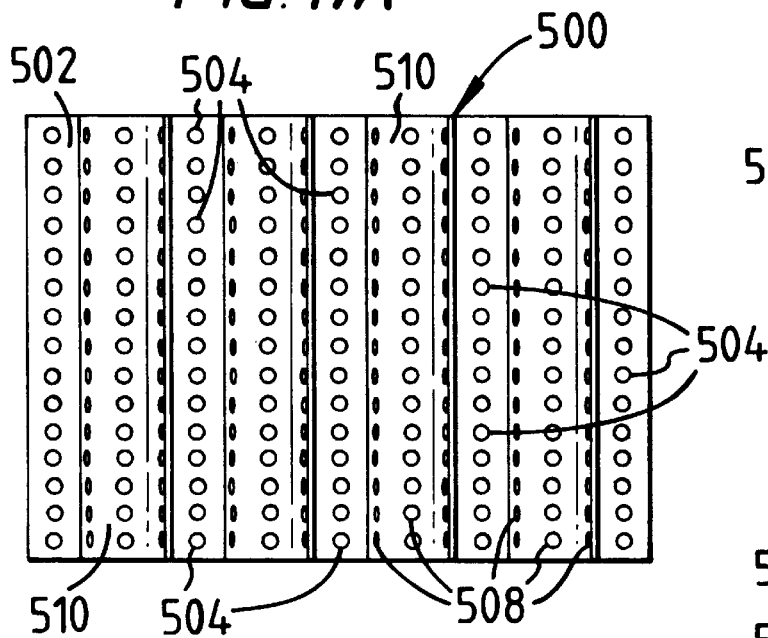
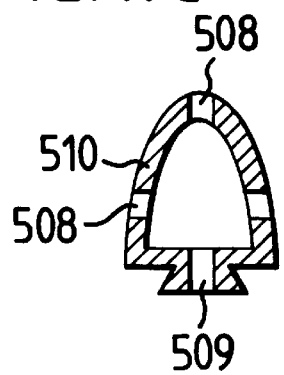
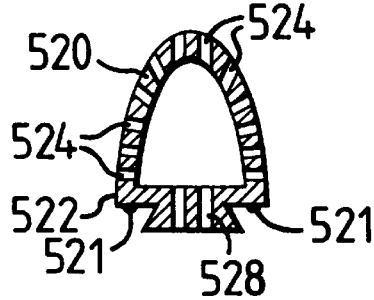
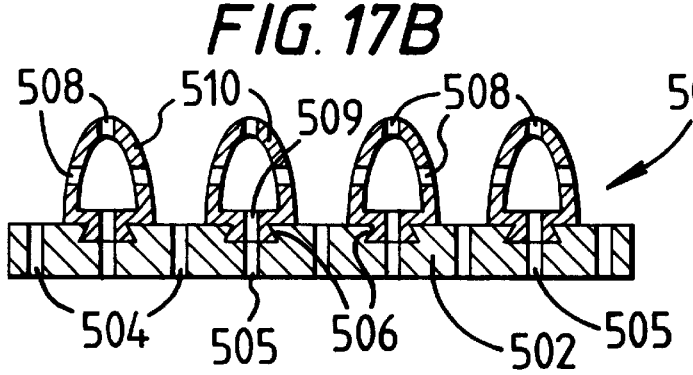
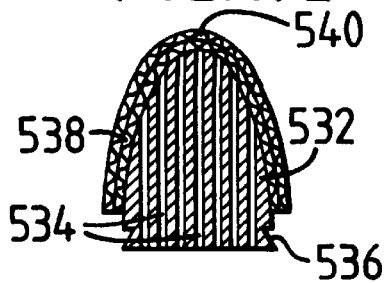

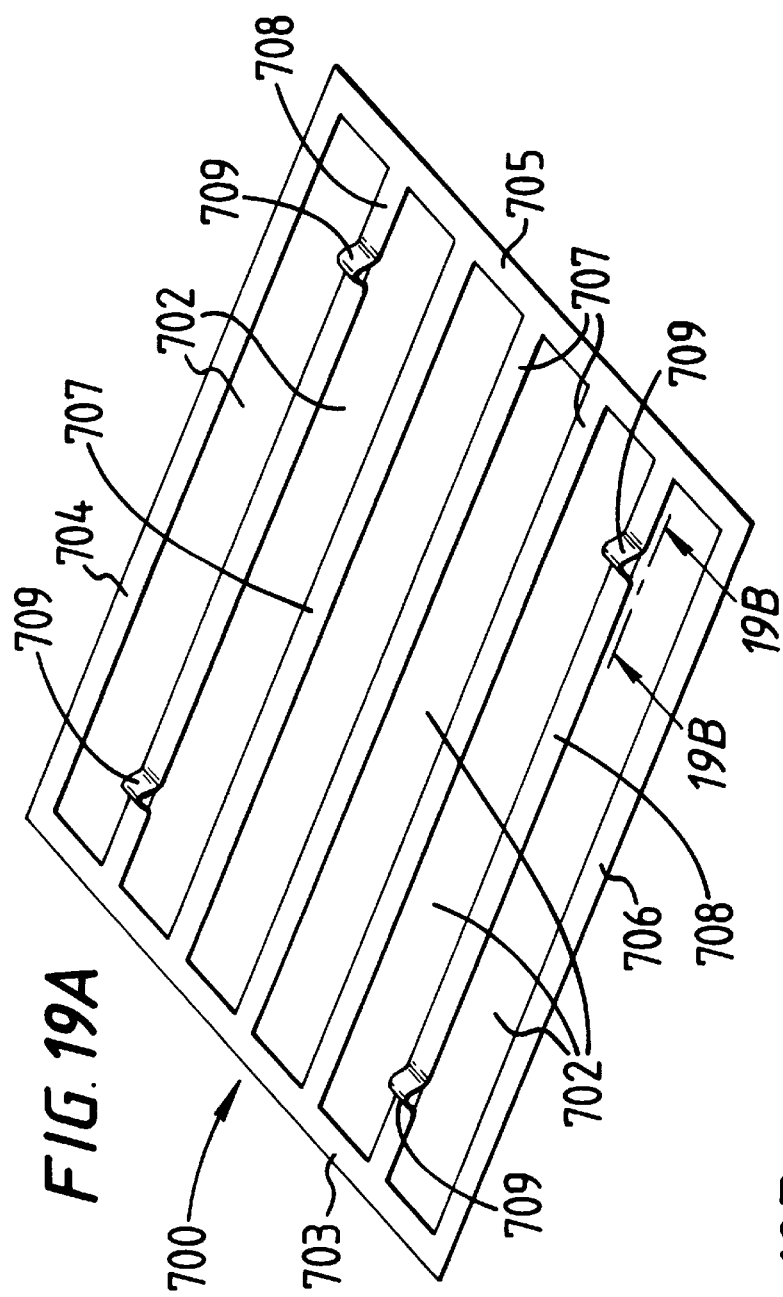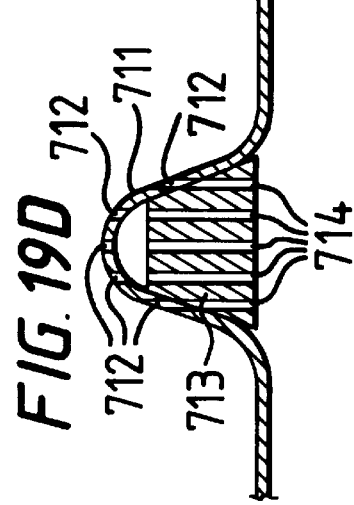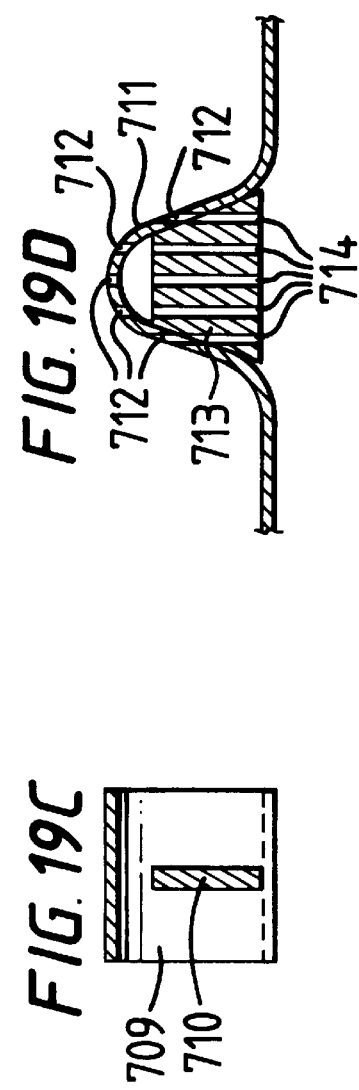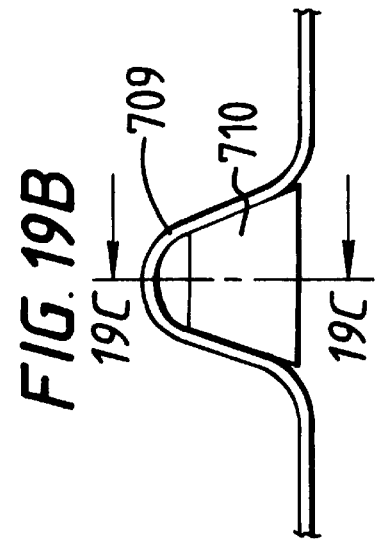

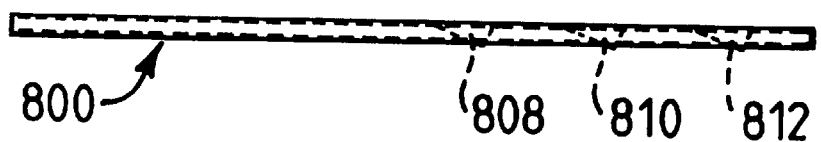
FIG. 24D
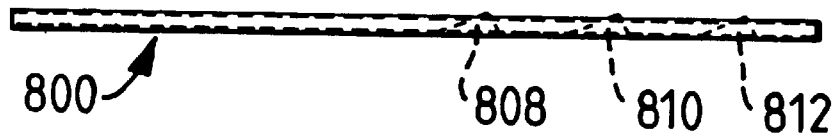
FIG. 24E
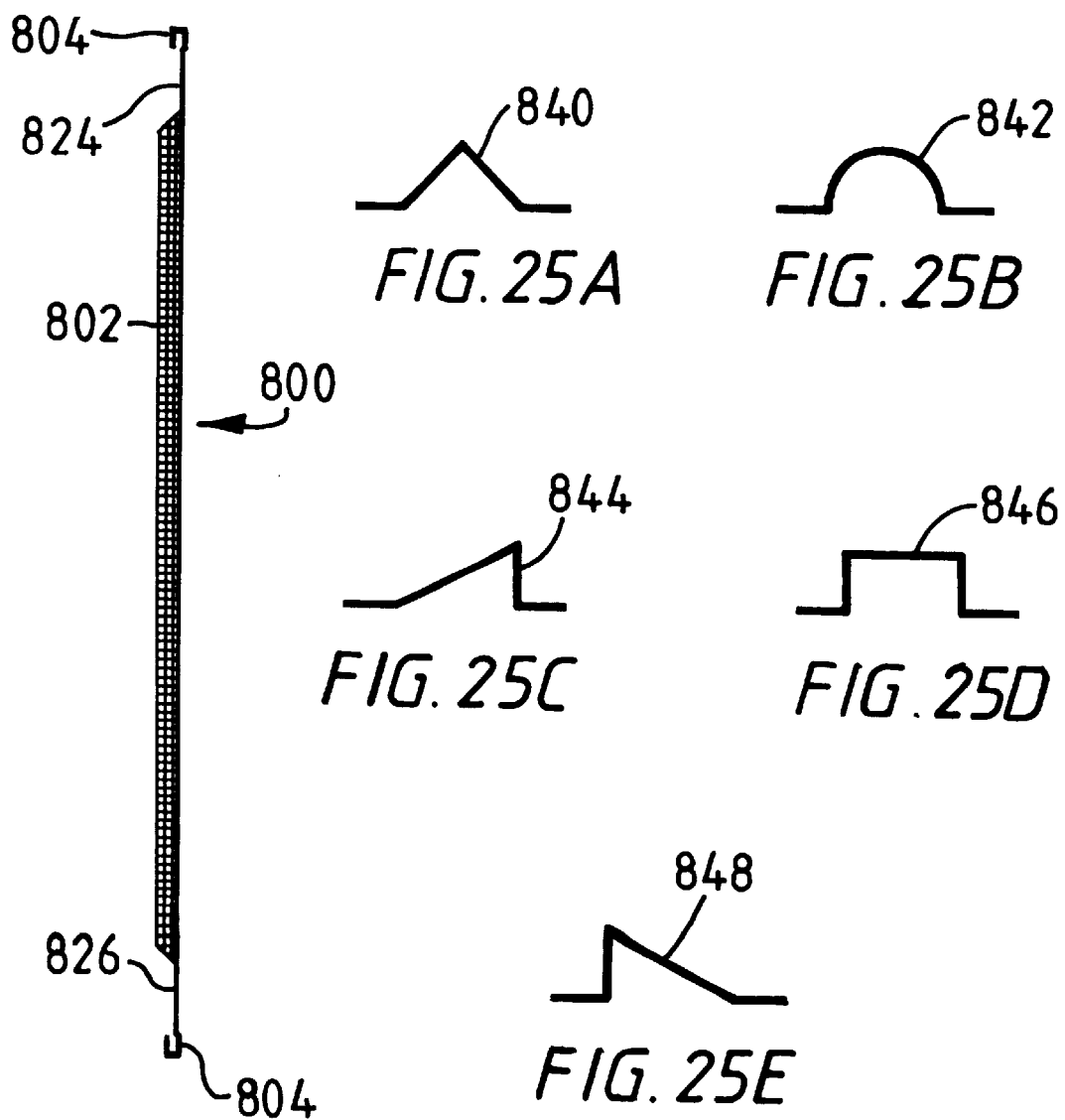
FIG. 24F
FIG. 25A
FIG. 25B
FIG. 25C
FIG. 25D
FIG. 25E

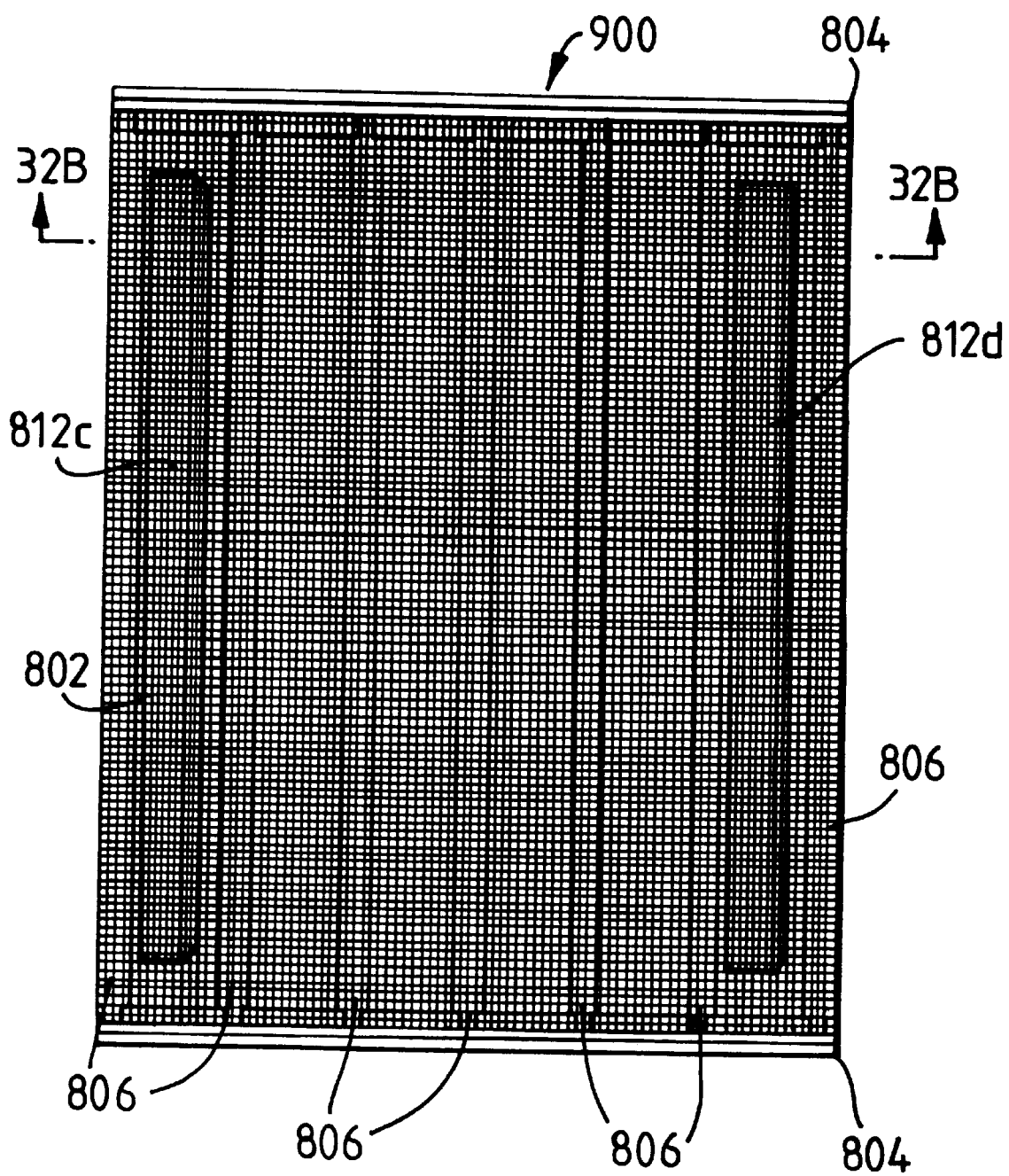

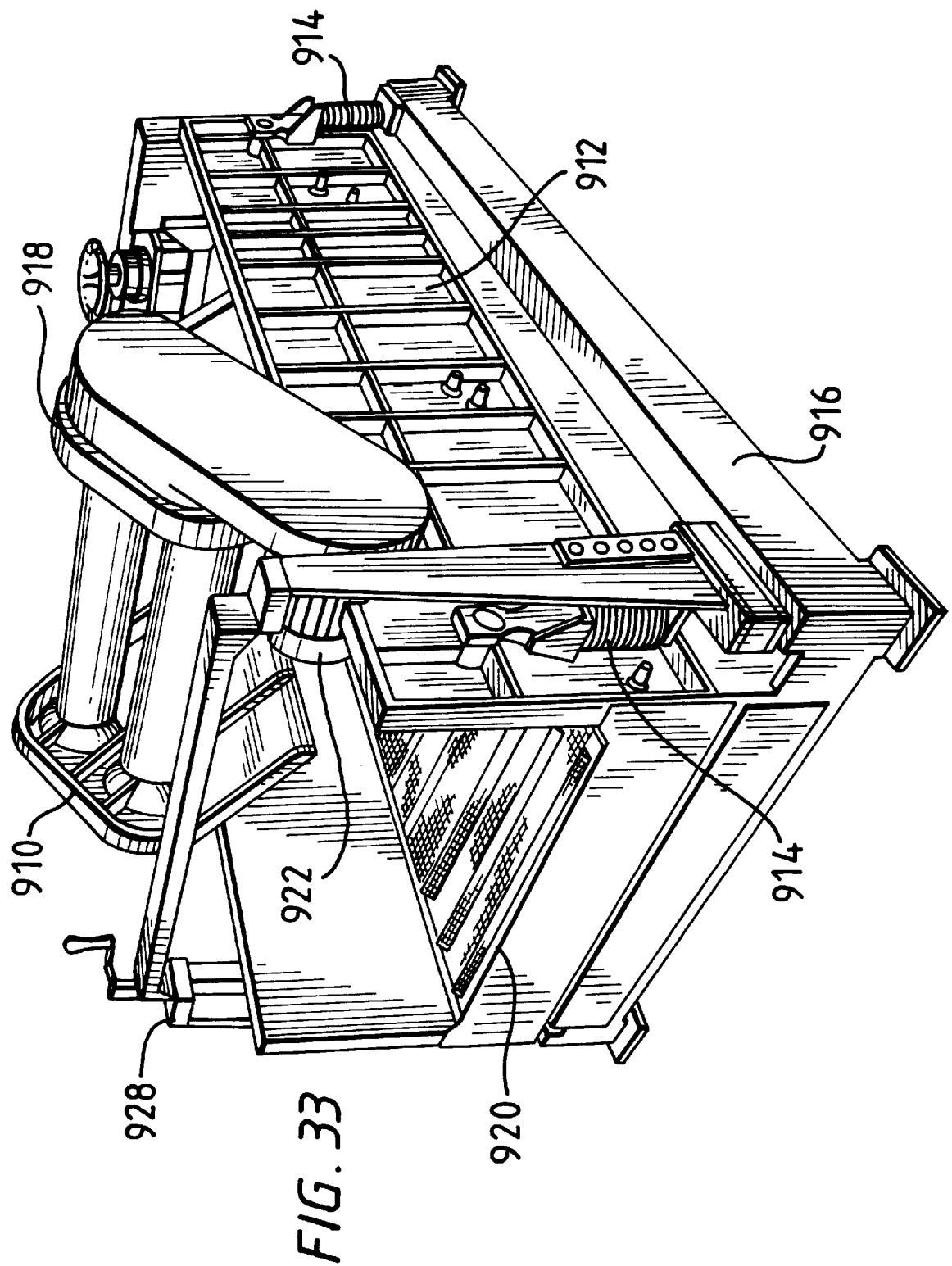

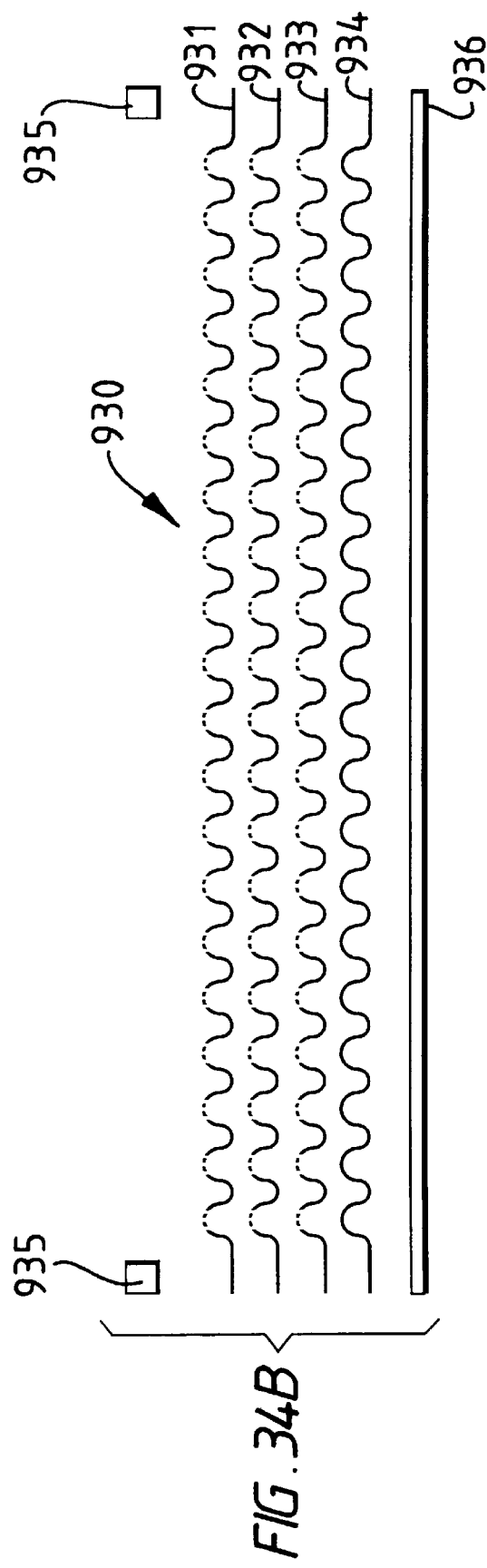
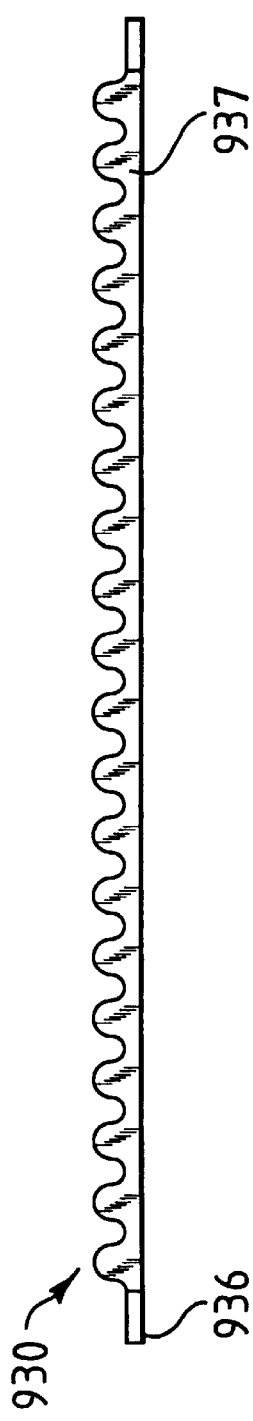
FIG. 34B
FIG. 34C

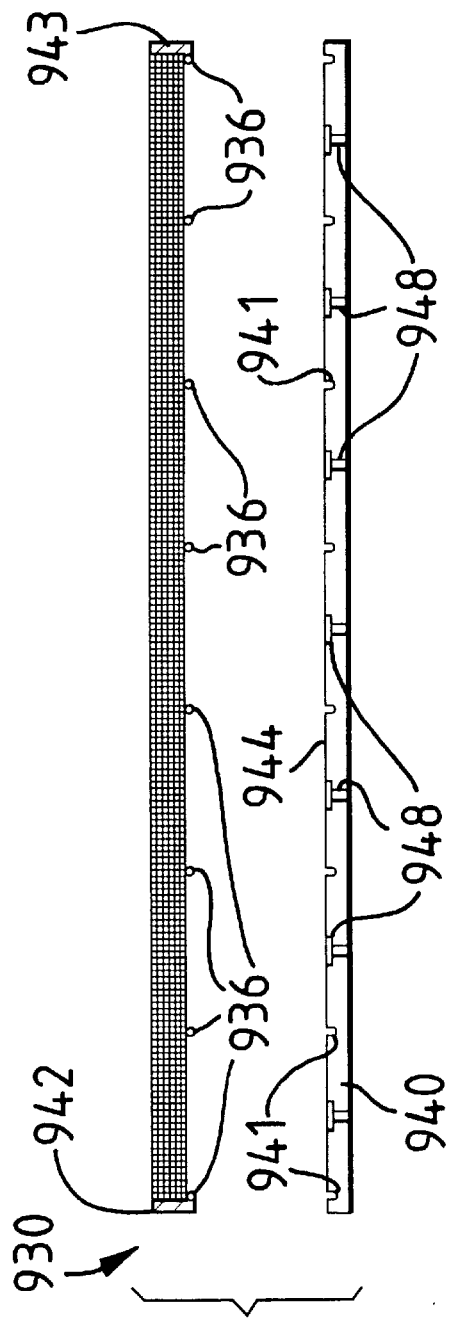
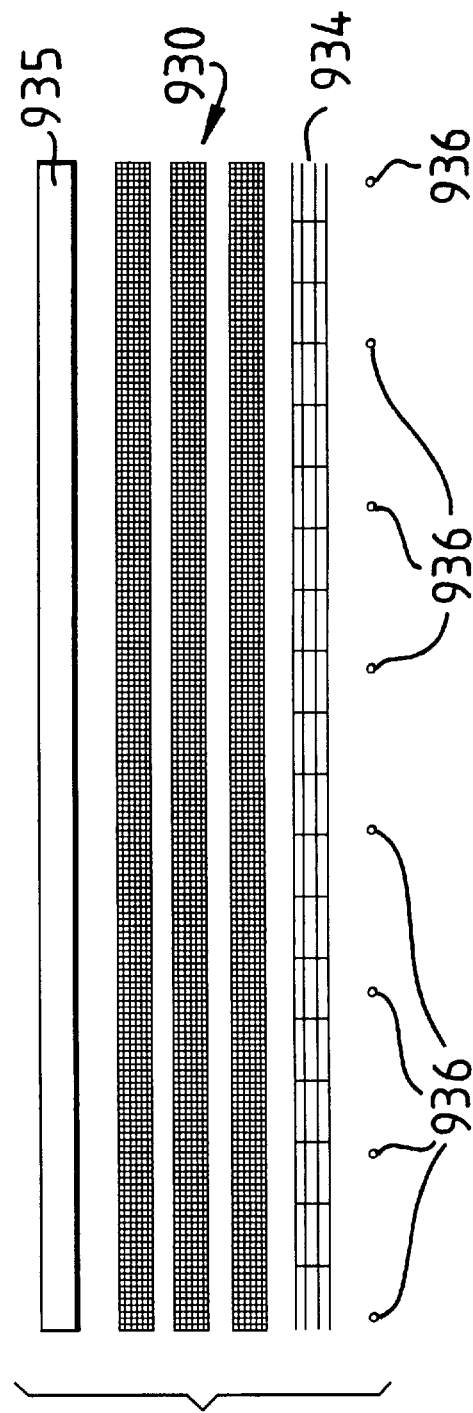
FIG. 34D
FIG. 34E

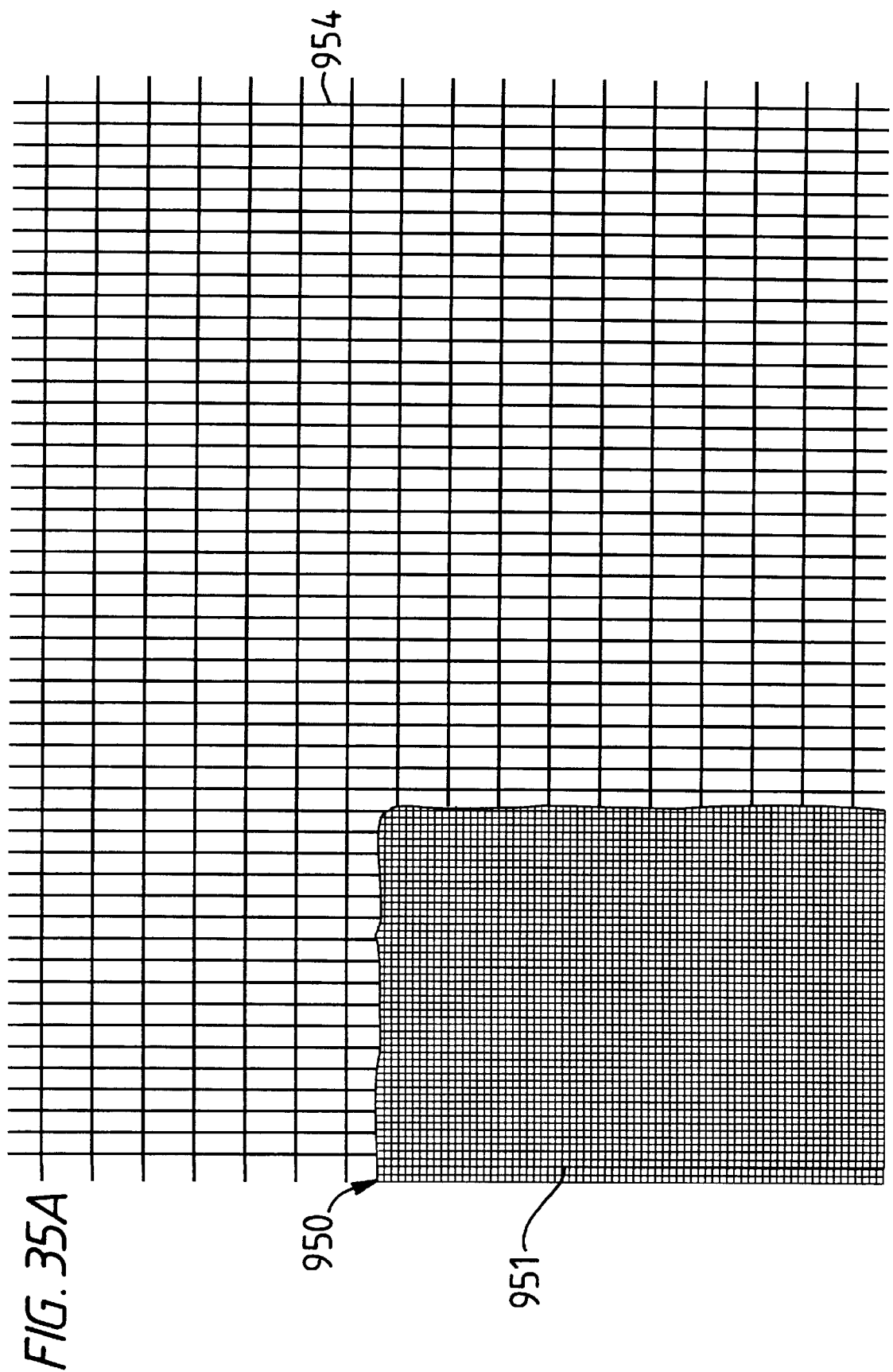

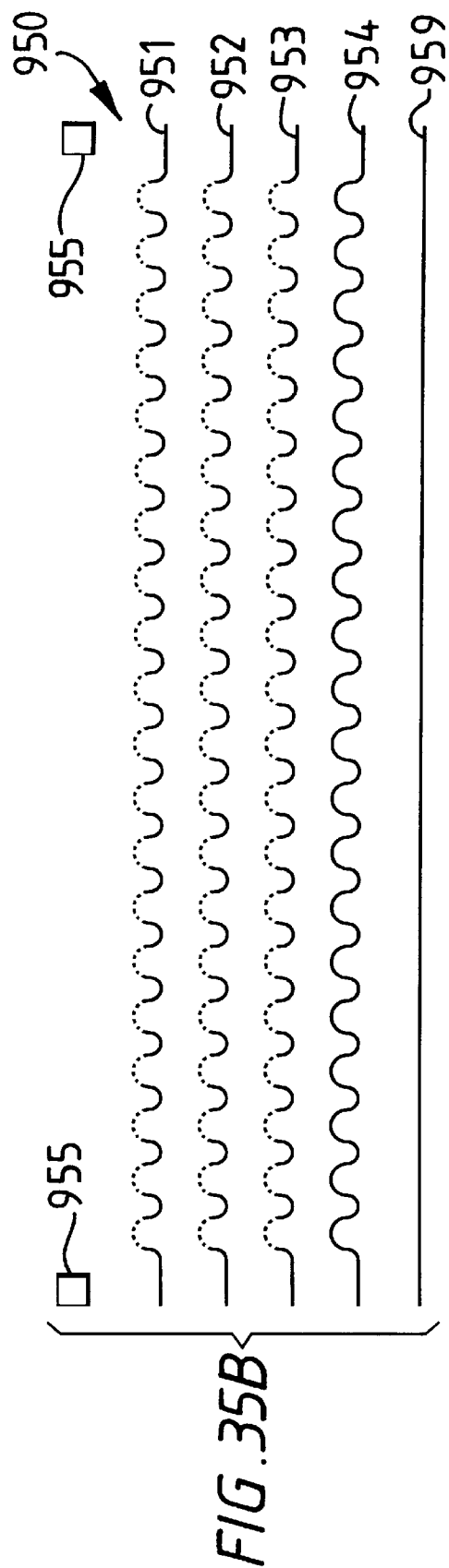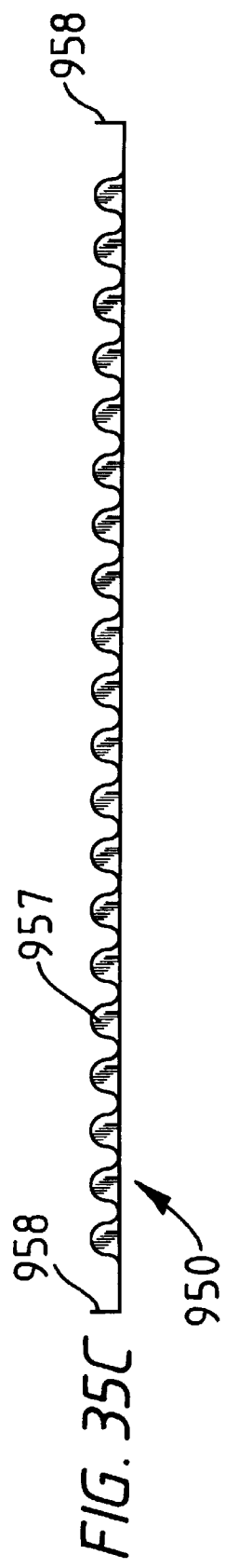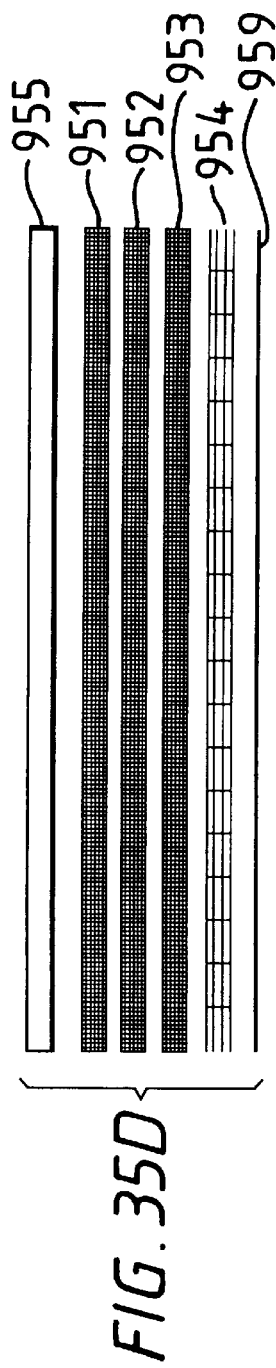

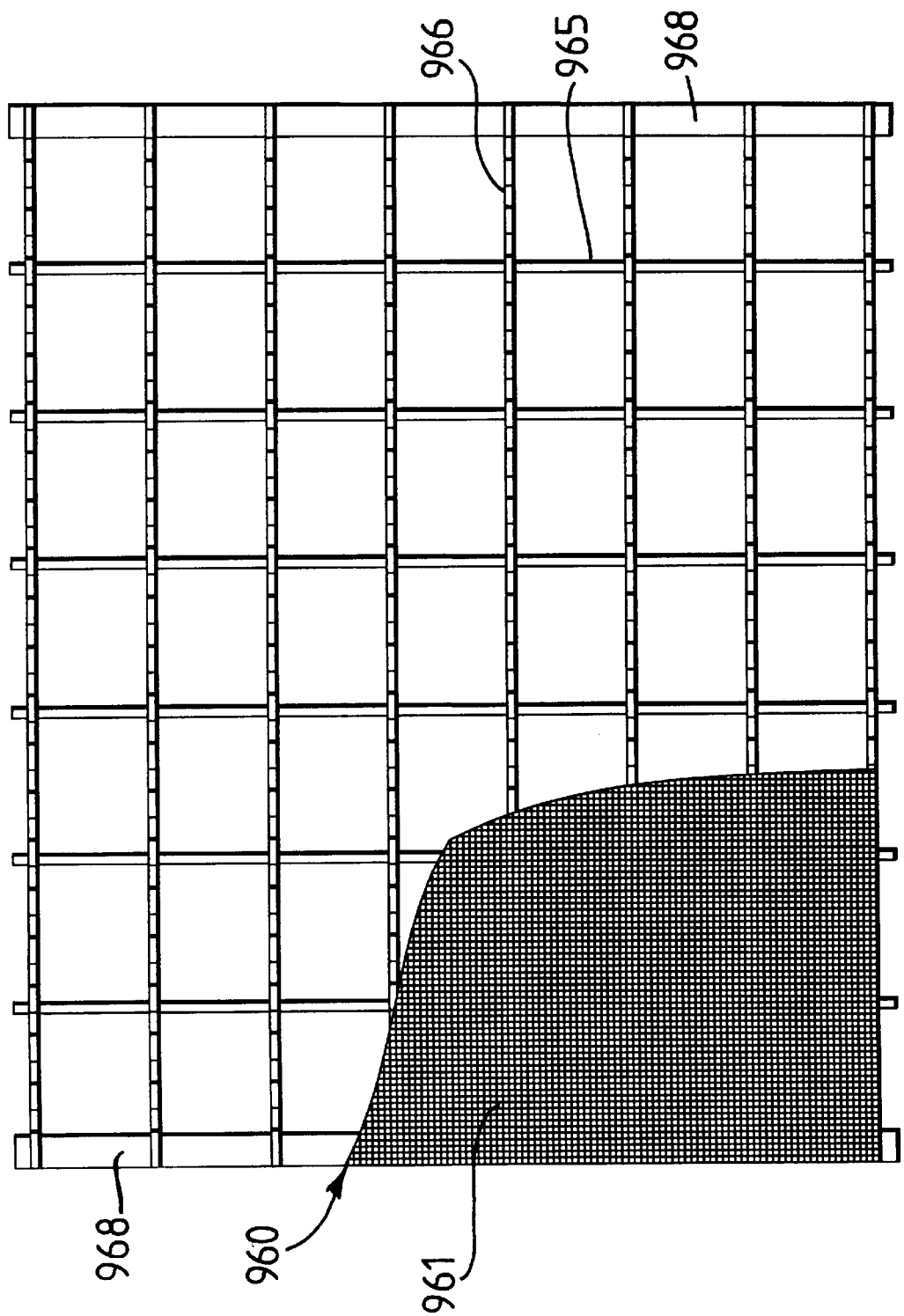

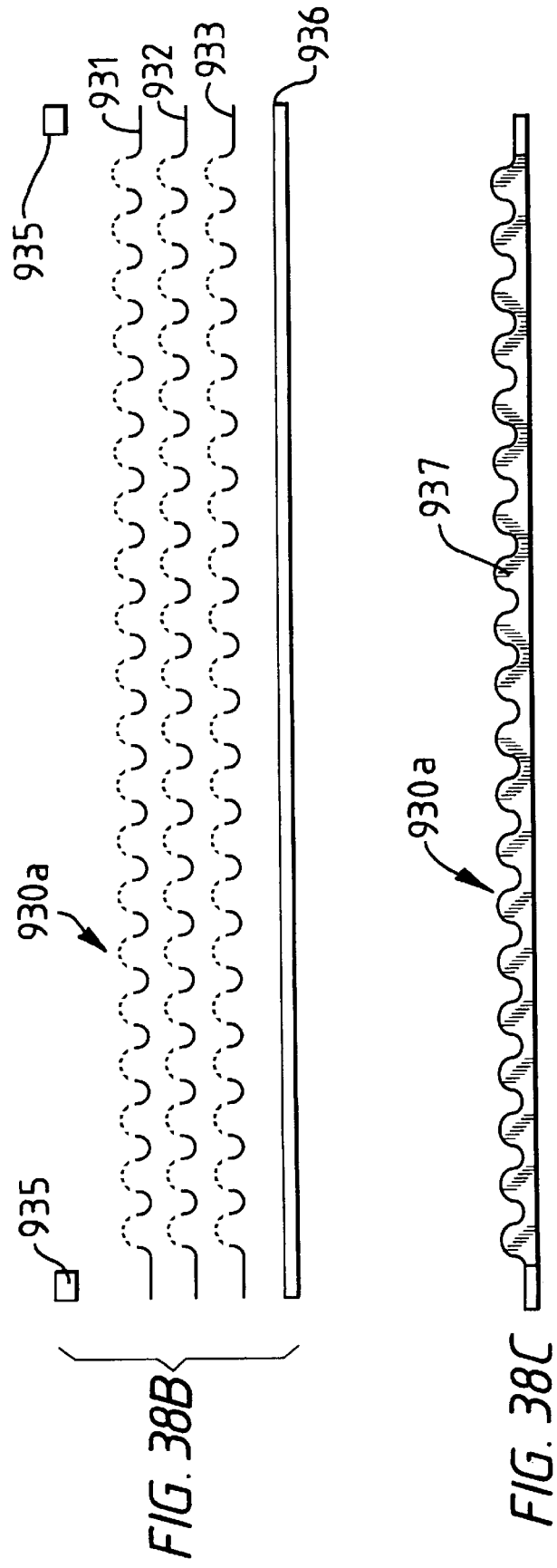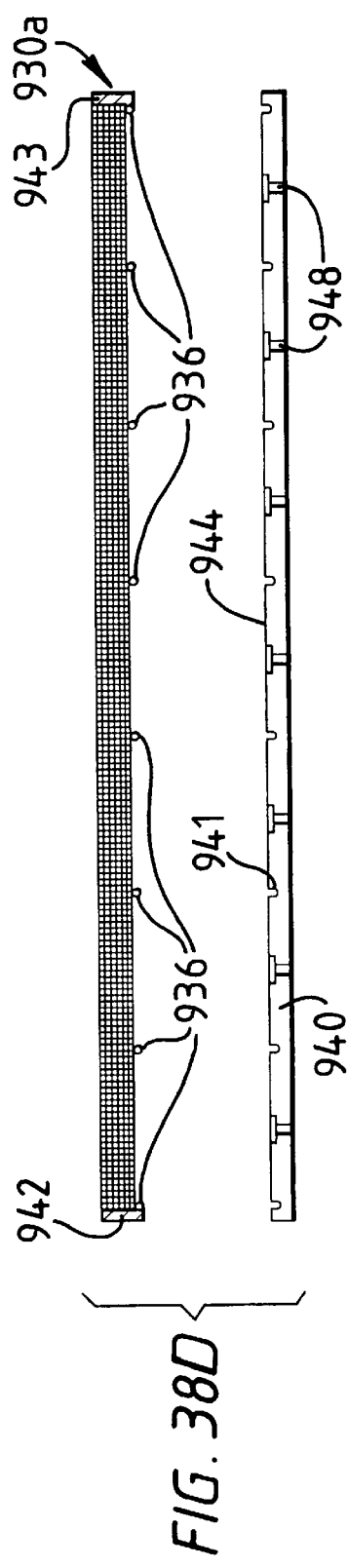

FIG. 44A
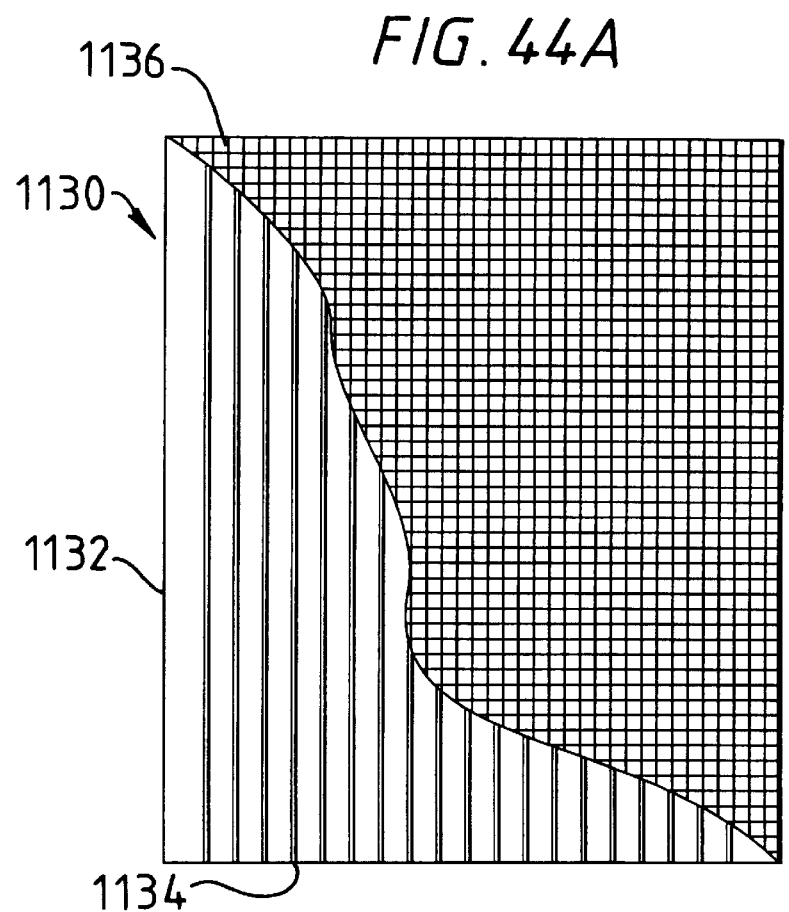
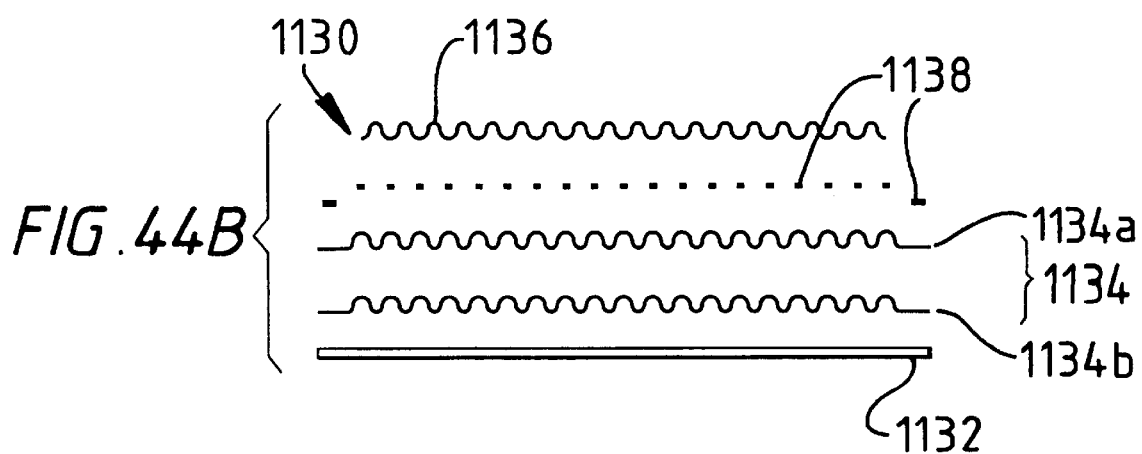
FIG. 44B

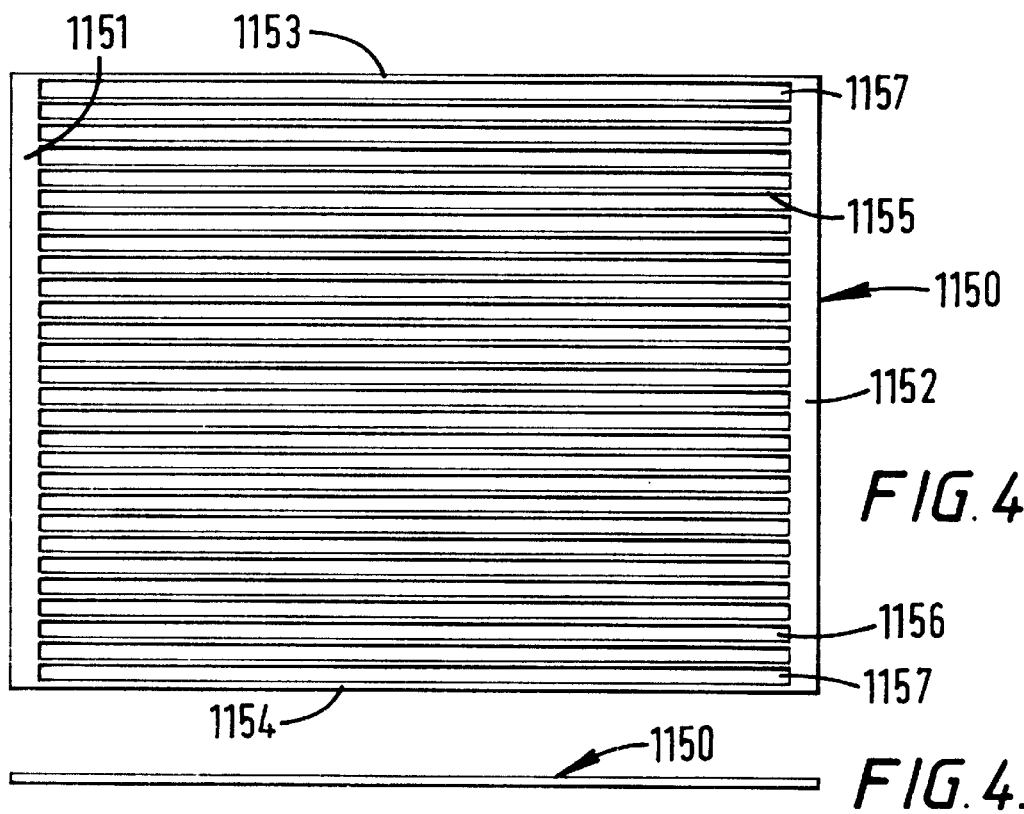
FIG. 45A
FIG. 45B
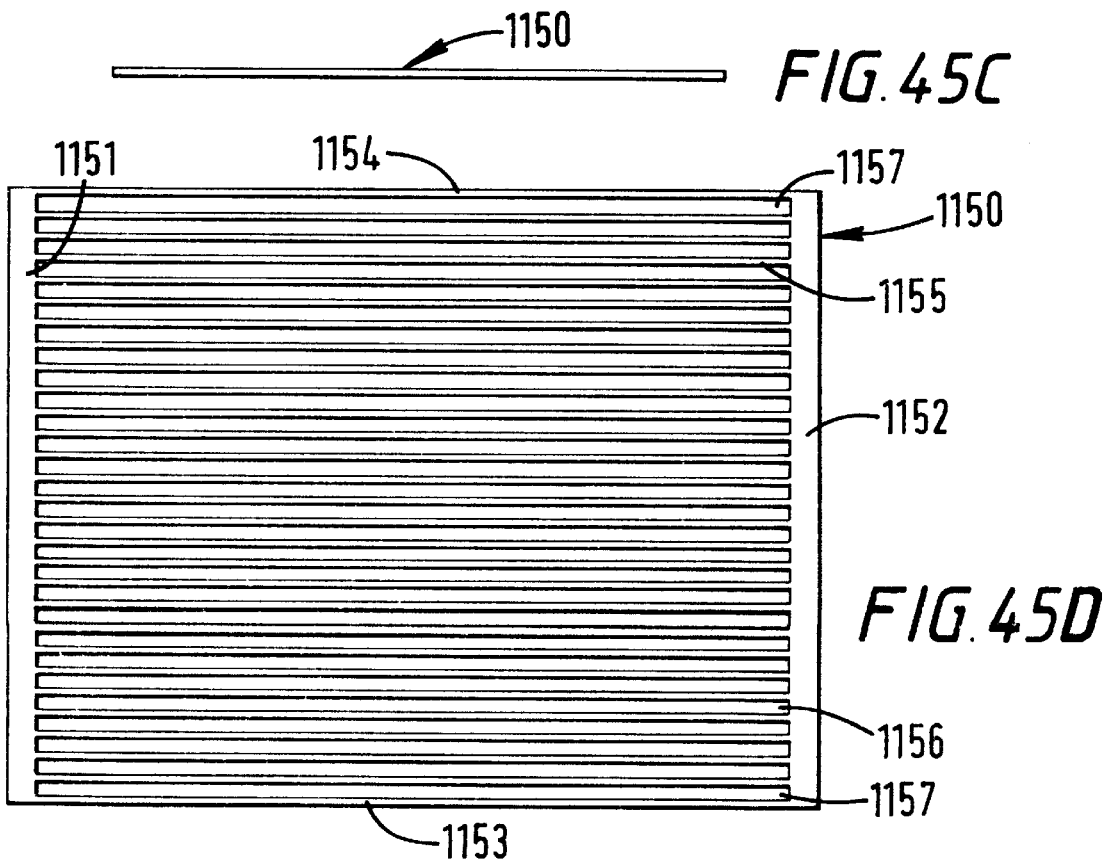
FIG. 45C
FIG. 45D

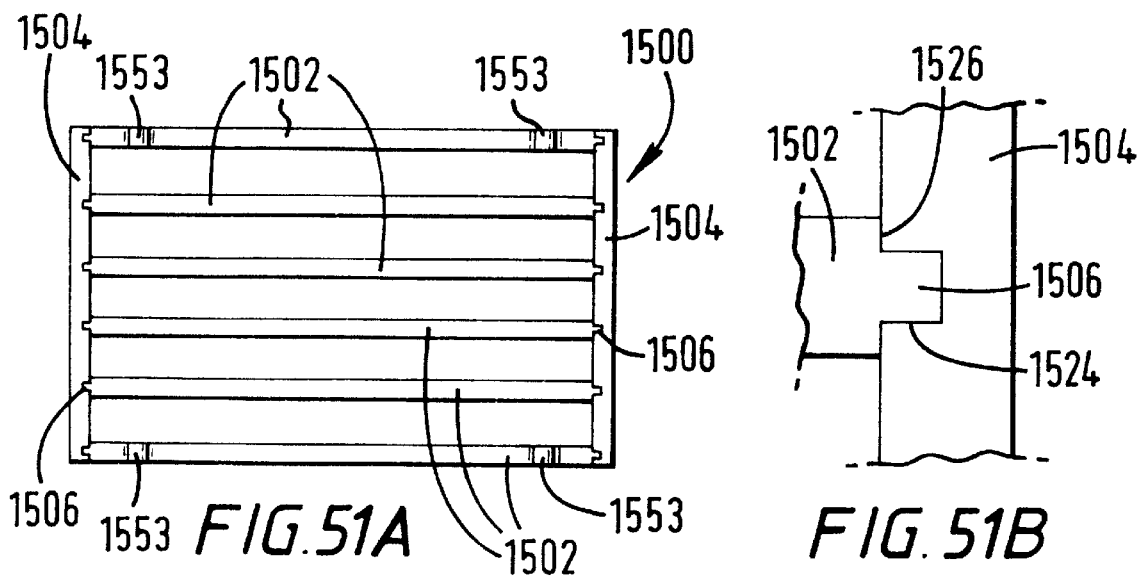
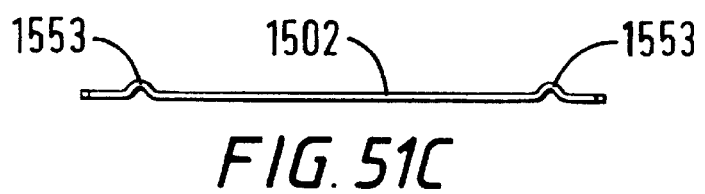
FIG. 51A
FIG. 51B
FIG. 51C
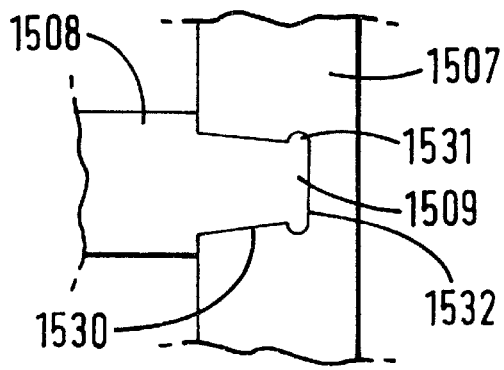
FIG. 52
Prior Art
FIG. 53
Prior Art

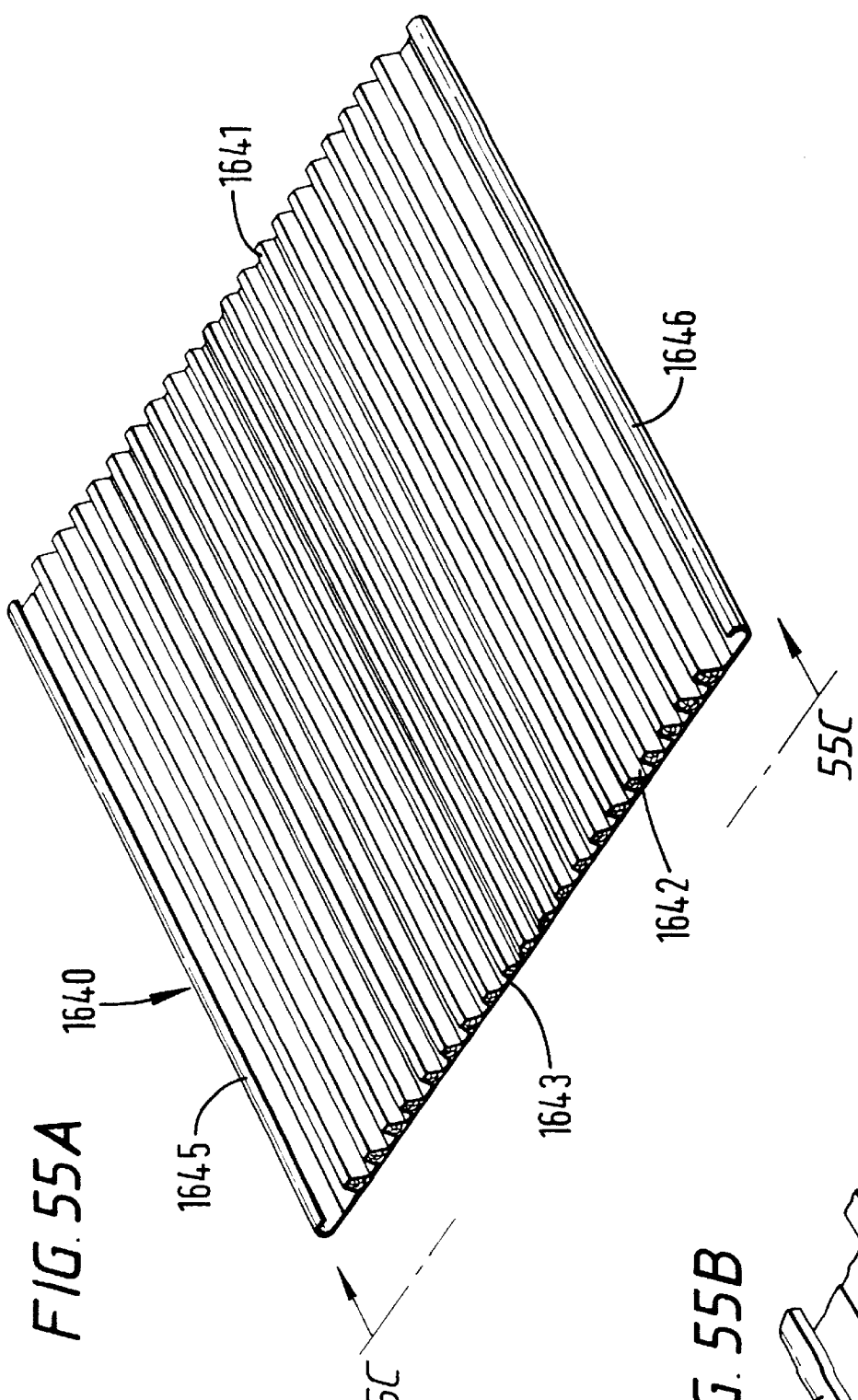

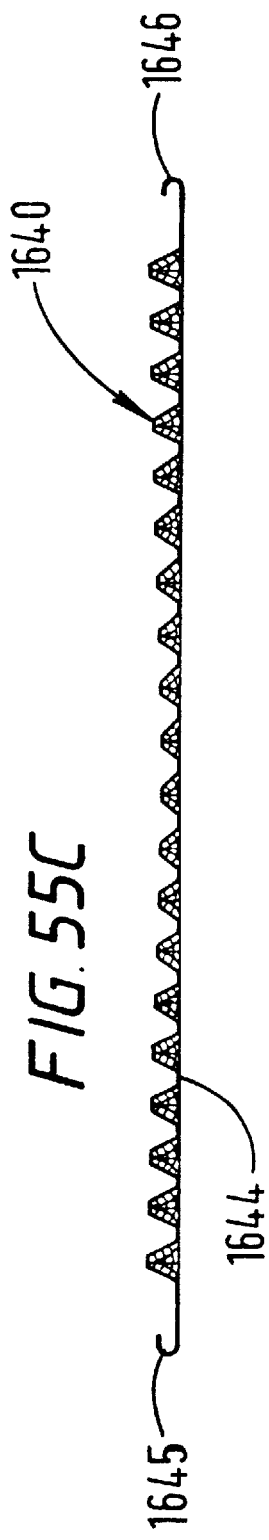
FIG. 55C
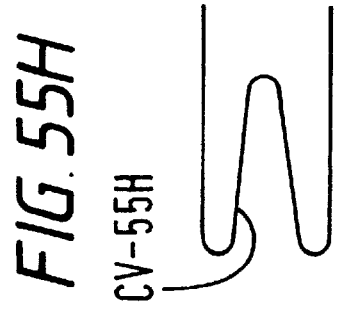
FIG. 55D
CV-55D
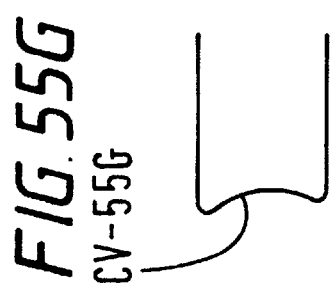
FIG. 55E
CV-55E
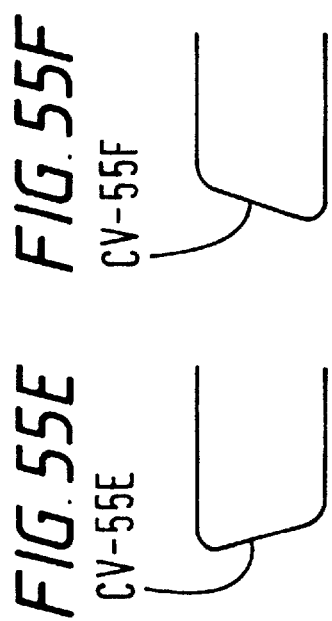
FIG. 55F
CV-55F
FIG. 55G
CV-55G
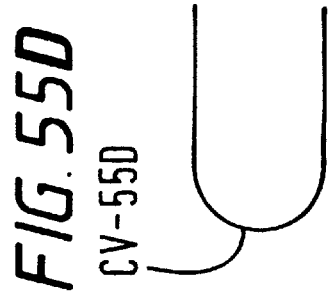
FIG. 55H
CV-55H
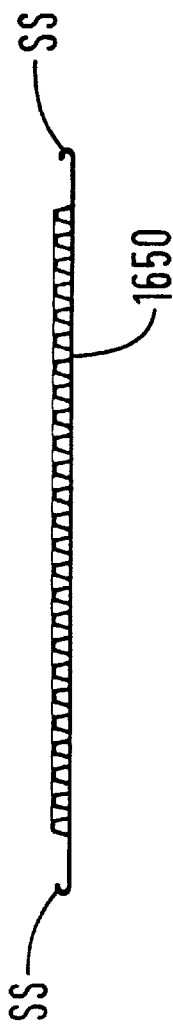
FIG. 56B

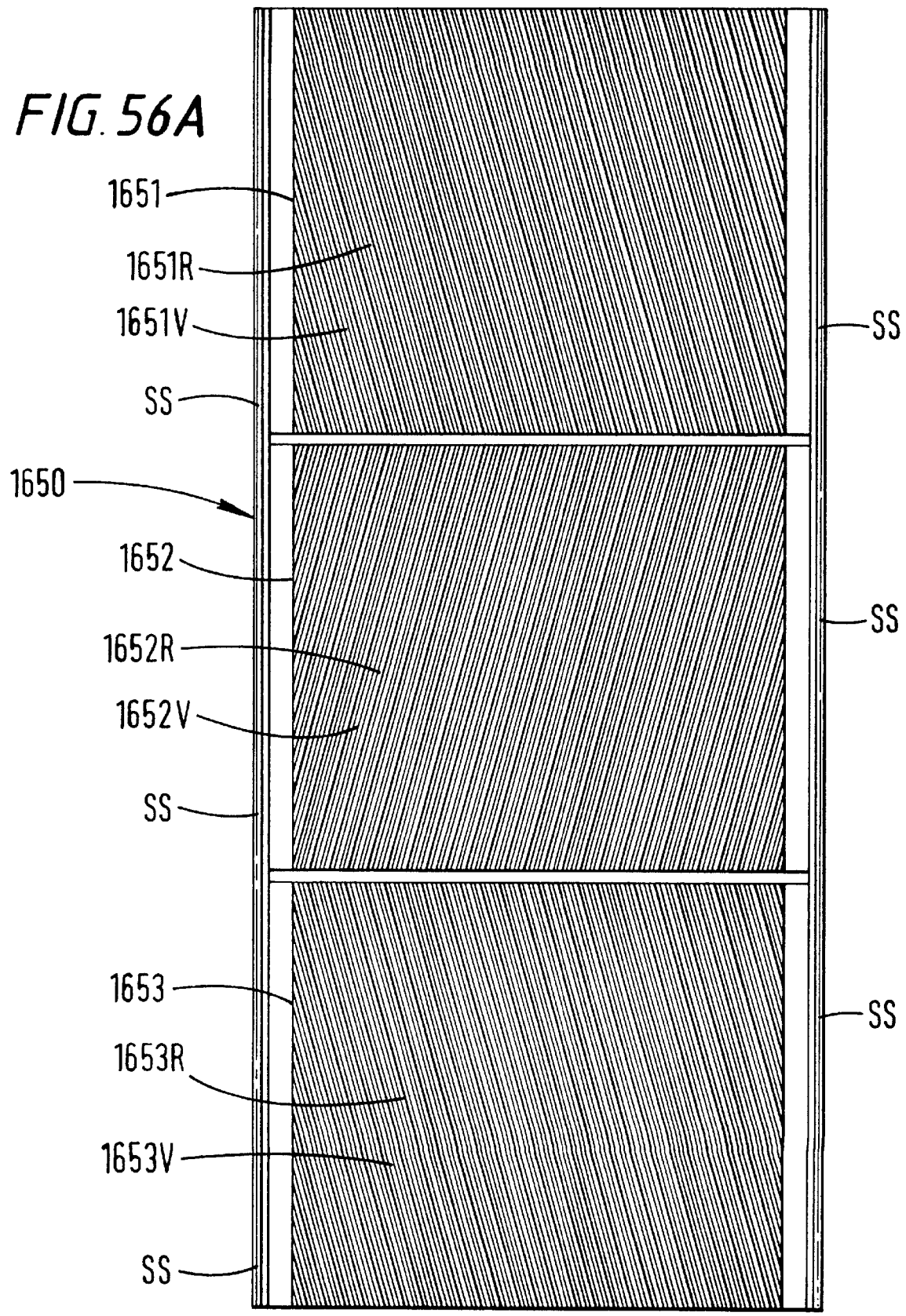

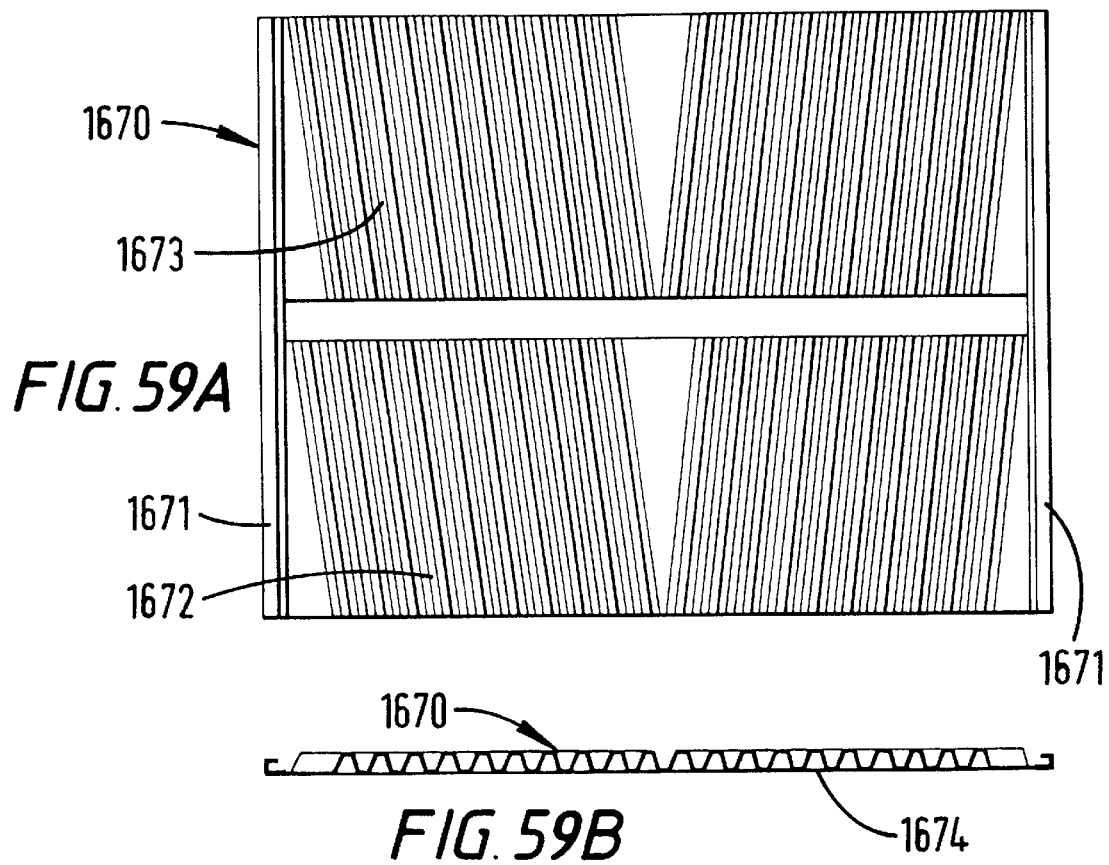
FIG. 59A
FIG. 59B
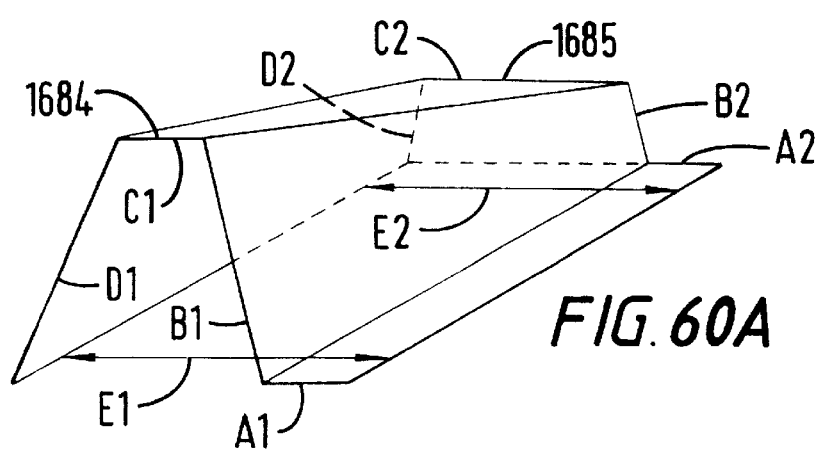
FIG. 60A
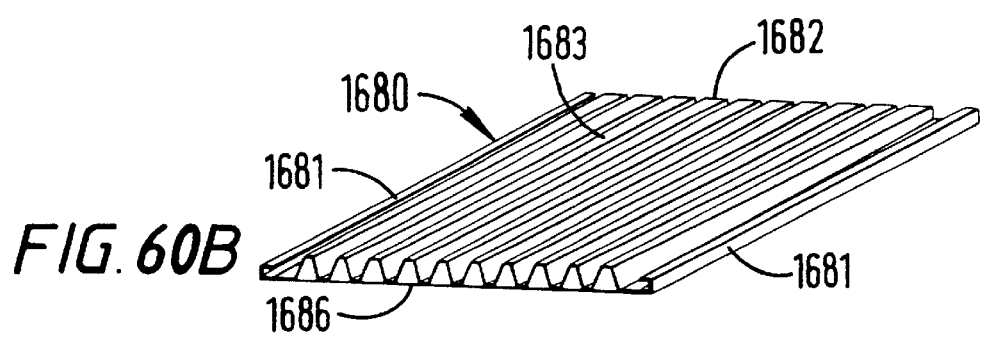
FIG. 60B

SHAKER SCREENS AND METHODS OF USE

RELATED APPLICATIONS

This is a continuation-in-part of U.S. application Ser. No. 09/228,572 filed Jan. 11, 1999 entitled "Vibratory Separator Screens" which is a continuation-in-part of U.S. application Ser. No. 09/183,005 filed Oct. 30, 1998, which is a continuation-in-part of U.S. application Ser. No. 09/090,554 filed Jun. 4, 1998 entitled "Vibratory Separator Screen" which is a continuation-in-part of U.S. application Ser. No. 08/895,976 filed Jul. 17, 1997 entitled "Screen For Vibratory Shaker" which is a continuation-in-part of U.S. application Ser. No. 08/786,515 filed Jan. 21, 1997 entitled "Screen For Shale Shaker" and, of U.S. application Ser. No. 08/598,566 filed Feb. 12, 1996 now abandoned entitled "Screen For Vibrating Separator." U.S. application Ser. No. 08/786,515 is a continuation in part of the following co-owned applications and patents: U.S. Ser. No. 29/048,575 filed Jan. 4, 1996, now U.S. Patent D 377,656 issued Jan. 28, 1997 which is a continuation of U.S. Ser. No. 29/014,571 filed on Oct. 25, 1993, now U.S. Patent D 366,040 issued on Jan. 9, 1996 which is a continuation-in-part of U.S. applications: Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 entitled "Shale Shaker Screen;" U.S. Ser. No. 08/598,566 filed Feb. 12, 1996 entitled "Screen For Vibrating Separator" which is a continuation-in-part of U.S. Ser. No. 08/220,101 filed Mar. 30, 1994 now U.S. Pat. No. 5,490,598 issued Feb. 13, 1996. All of these related applications and patents are incorporated herein in their entirety for all purposes.

BACKGROUND OF THE INVENTION

1. Field of the Invention

The present invention is directed to screens for vibratory shakers, screens for classifying and/or filtering material, such screens with one or more ramped portions, and screens with individual screen modules, ramps, and/or plugs, and methods of screen repair and assembly.

2. Description of Related Art

The related art section of each of the above-identified applications is incorporated here fully by reference.

SUMMARY OF THE PRESENT INVENTION

The present invention discloses, in certain embodiments, a screen for vibrating screen apparatus. The screen has one or more upper layers of screen, screen cloth, and/or mesh. If more than one layer is used, they may be bonded together at discrete points, at discrete areas, or over their entire surface. The layer or layers are mounted on frame apparatus which may include a solid side support on each of two spaced apart sides of the layer(s), or may include a full four sided screen frame. A strip or strips of support material (e.g. flat steel, aluminum or plastic strips—of any width, but in certain preferred embodiments ranging between a half inch to three inches in width; and of any thickness, but in certain preferred embodiments ranging between one-thirty second and one-eighth inches thick, or rods of these materials with a diameter between one-thirty second and one-eighth inches; any screen may use strips made from different materials, e.g. cross-strips of plastic and end strips of steel, or vice versa) are secured across two or more frame sides. With respect to a two sided frame wherein the two sides are parallel and spaced apart, a strip or strips may be, according to this invention, disposed parallel to the two sides; and, if more than one strip is used, spaced apart across the area of the layer or layers. It is also within the scope of this invention to use a strip or strips which are disposed in a manner non-parallel to the two sides. In one aspect such non-parallel strips may extend diagonally from one end of one side of the frame, across the layer or layers, to a diagonally opposite end of the other side. In another aspect such a strip may extend from any point of a frame side to any point on a non-framed side of the layer or layers. Any such strip (or rod) may be bonded, sintered, welded or otherwise secured (herein referred to collectively as "bonded") at any point to the layer or layers; at substantially every point of contact between the strip(s) and the layer(s); or at selected intermediate contact points.

Any strip herein may have holes through it to facilitate fluid flow. In one aspect any strip, combination of strips, or pattern of strips disclosed herein may be used with a generally flat ("two-dimensional") screen. In any screen disclosed herein the screening material may be sintered to itself, individual screen wires may be sintered to each other, one or more layers of screen material, cloth, mesh, or screen may be sintered to each other; and any screen material may be sintered to any strip disclosed herein, either entirely along its length or at selected points or areas therealong.

The present invention, in one embodiment includes a shale shaker with a frame; a "basket" or screen mounting apparatus; one or more screens as described above and below; and basket vibrating apparatus.

It is within the scope of this invention to provide a screen as disclosed in U.S. Pat. Nos. 5,417,793; 5,417,858; and 5,417,859, but to delete the apertured plate required by these patents and to use instead a coarse mesh or a coarse flexible mesh and/or a panel as disclosed herein. In certain preferred embodiments this mesh ranges in size between a 1 mesh to a 3 mesh, with a 2 mesh used in one particular embodiment. It is within the scope of this invention to use any strip, combination of strips, or pattern of strips and/or panel disclosed herein in place of the apertured plate required by the three listed patents. It is within the scope of this invention to use any strip or strips disclosed herein in combination with the apertured plate required by the three listed patents.

New, useful, unique, efficient, non-obvious screens, filtering screens, two- or three-dimensional screens; flat or non-flat screens; mountings for them; such screens with one or more bottom support strips or rods; such screens in which screening material is on a corrugated perforated plate which itself is on strip(s) and/or on a frame; and/or any such screen with a panel as disclosed herein instead of or in addition to an apertured plate; and shale shakers with such items;

The present invention discloses a screen assembly for a vibratory separator or shale shaker, the screen assembly having at least one wire mesh screen formed with undulating mesh material having a series of ridges spaced apart by a series of valleys, an optional perforated plate with an undulating shape corresponding to the undulating mesh material of the at least one wire mesh screen, and a series of spaced apart rods, the corrugated perforated plate mounted on the rods of the series of spaced apart rods. In other aspects, the present invention discloses a screen assembly for a vibratory separator or shale shaker, the screen assembly having at least one wire mesh screen formed with undulating mesh material having a series of ridges spaced apart by a series of valleys, an optional perforated plate with an undulating shape corresponding to the undulating mesh material of the at least one wire mesh screen, the at least one wire mesh screen on the corrugated perforated plate, and a lower layer of wire mesh material, the lower layer of wire mesh material having a mesh size coarser than that of any layer of the at least one wire mesh screen.

The present invention, in certain embodiments, discloses a screen for a vibratory shaker for screening material flowing thereto, the screen having a frame with a plurality of spaced-apart frame openings, and a plurality of screen modules (or in other aspects, plugs) each disposed in a frame opening, each screen module having a module body with a module opening and screen means (e.g. mesh, screen, openings therethrough, etc.) at the module opening for screening material flowing thereto; such a screen wherein at least one or all screen modules is removably disposed in its respective frame opening; such a screen wherein the frame has exterior sides defining a frame space within the frame and wherein the plurality of frame openings extend substantially all across the frame space; such a screen wherein the frame is substantially flat or is corrugated; such a screen wherein the screening means is screening material (e.g. any mesh, screen or combination thereof) disposed over or in or over and in the module opening; such a screen wherein the frame has holding means and the screen modules have releasable attachment means (e.g. but not limited to a recess on one member and a bead on the other) that cooperate with the holding means to releasably mount the screen modules in the frame; such a screen wherein the frame is substantially flat with a top surface and at least one screen module (or all the modules) has a screening portion that projects above the top surface of the frame; such a screen wherein the frame has a bottom and at least one screen module (or all of them) has a screening portion that projects below the bottom surface; such a screen wherein there are projecting plug portions or module portions both above and below a frame, plate or panel and, in one aspect, holes or openings through the frame, plate or panel; such a screen wherein the plurality of screen modules includes a first set of screen modules and a second set of screen modules, the first set of screen modules having screening means having a first mesh (or screen) of a first mesh (or screen) size, and the second set of screen modules having screening means having a second mesh (or screen) of a second mesh (or screen) size, the first mesh size different from the second mesh size; such a screen wherein the first set of screen modules are for dewatering the material flowing to the vibratory shaker and the second set of screen modules are for classifying the material; such a screen wherein the screening means is removably secured to the screen modules; such a screen wherein the screening means comprises a series of openings extending through the module bodies; such a screen wherein each module body has a threaded end extendable through its respective frame opening and the screen includes a threaded nut for each screen module for mating with the threaded end of the module body to secure the screen modules in their frame openings; such a screen wherein the frame has a frame top surface and each screen module has a top surface which does not project above the frame top surface; such a screen wherein the frame (plate, panel, etc.) is corrugated including periodic raised portions and a plurality of support strips underlie and are attached to the frame, each support strip having a support body having spaced-apart ends spaced-apart sides, and a top surface, and at least one upturned finger projecting above the top surface of the support body, the at least one upturned finger configured and sized for contacting and supporting at least a part of a raised portion of the frame; such a screen wherein the at least one upturned finger is a plurality of spaced-apart upturned fingers; such a screen wherein the at least one upturned finger has a curved top with a shape corresponding to a shape of a raised portion of the frame; such a screen wherein the at least one upturned finger extends up from cuts (e.g. cuts in a plastic or metal strip disposed so that upon bending the finger(s) is created) in the support body and the at least one upturned finger is integral with the support body.

The present invention discloses, in certain embodiments a screen for a vibratory shaker for screening material flowing thereto, the screen having a frame with a plurality of spaced-apart frame openings, a plurality of screen modules (or in other aspects, plugs) each disposed in a frame opening, each screen module having a module body with a module opening and screen means at the module opening for screening material (e.g. fluid, slurries, drilling mud, etc.) flowing thereto, wherein all the screen modules are removably disposed in their respective frame openings, wherein the frame has exterior sides defining a frame space within the frame and cross members which with the exterior sides define the frame openings and wherein the plurality of frame openings extend substantially all across the frame space, wherein the frame has holding means and the screen modules have releasable attachment means that cooperate with the holding means to releasably mount the screen modules in the frame, and wherein the plurality of screen modules includes a first set of screen modules and a second set of screen modules, the first set of screen modules having screening means having a first mesh of a first mesh size, or the module body having openings therethrough of a first size, or both, and the second set of screen modules having screening means having a second mesh of a second mesh size, or the module bodies having openings of a second size, or both, the first mesh size (or first opening size) different from the second mesh size (or second opening size);

The present invention discloses, in certain embodiments, a frame for a screen for a vibratory shaker, the frame having a body with sides and cross members defining a plurality of openings (or a plate or panel with such openings) for mounting therein in each opening a screen module, mounting means for securing the screen modules in the openings; and such a frame wherein the mounting means include release means for releasably mounting each screen module in its respective opening.

The present invention discloses, in certain embodiments, a support strip for supporting part of a screen used in a vibratory shaker, the support strip having a support body having spaced-apart ends spaced-apart sides, and a top surface, and at least one upturned finger projecting above the top surface of the support body, the at least one upturned finger configured and sized for contacting and supporting at least a part of a raised portion of the frame; such a support strip wherein the at least one upturned finger is a plurality of spaced-apart upturned fingers; such a support strip wherein the at least one upturned finger has a curved top with a shape corresponding to a shape of a raised portion of the frame; and such a support strip wherein the at least one upturned finger extends up from cuts in the support body and the at least one upturned finger is integral with the support body.

The present invention, in certain embodiments, discloses a plug (or module) for disposition in an opening of a plug (or module) positioning member of a screen assembly for a vibratory separator that receives fluid with material therein for separation therefrom, the plug (or module) having a body, an opening through the body through which fluid is flowable, and screening apparatus at the opening for screening the fluid with material therein; such a plug or module wherein the screening apparatus is a series of holes through the body; such a plug or module wherein the screening apparatus is at least one, two, three or more layers of mesh and/or screen material used with or without a series of holes through the body, the layers of the same or different mesh or opening size; such a plug or module with holding apparatus on the body for securing the plug to the screen assembly; such a plug or module with releasable holding apparatus for releasably securing the plug to the screen assembly; such a plug or module with a top surface and sized and configured so that the top surface will not project above a top surface of the screen assembly, frame, plate, or panel; such a plug or module wherein the screening apparatus is releasably secured to the body; such a plug or module wherein the plug or module has a length and a width and the screen assembly has a length and a width and the opening in the plug or module positioning member (e.g. frame, plate, panel) has a length, and wherein the length of the plug is substantially equal to the length of the opening and the opening extends for substantially the length of the plug or module positioning member; such a plug or module wherein the plug or module positioning member is selected from the group consisting of a frame, a plate, and a panel and wherein the screening apparatus includes screening material; and such a plug or module with a curved, convex, concave, slanted, or horizontal top on the body.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious: screens and vibratory devices with such screens;, plugs and modules for screens for vibratory separators, in one aspect releasably secured to the screen; three-dimensional screens formed with a flat plate, frame, or panel and a plurality of plugs or modules that project beyond the frame, etc. either above, below, or both; screen or frame, panel, or plate, support strips that have one or more upturned fingers formed by cutting the strip member and bending the finger therefrom; and screens with at least dual screening areas, e.g. an area for dewatering and an area for classifying and/or an area for high wear and replaceable modules or plugs with appropriate screening and/or mesh material to effect this; screens that are easily repairable or have areas that are easily replaced; and such screens that are flat or corrugated.

The present invention, in certain embodiments, discloses a method for making a plate mesh combination, the method including securing (e.g., but not limited to, with adhesive and/or heat) at least one, two, three or more meshes and/or screens to a plate, heating the plate, and corrugating the plate with the mesh and/or screen thereon while it remains heated.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1A is a top view of a screen plug according to the present invention. FIG. 1B is a side view of an embodiment of a plug as in FIG. 1A. FIG. 1C is a side view of an embodiment of a plug as in FIG. 1A.

FIG. 2A is a top view of a screen plug according to the present invention. FIG. 2B is a cross-section view along line 2B—2B of FIG. 2A. FIG. 2C, 2D are side views of an embodiment of a plug as in FIG. 2A.

FIG. 3A is a top view of a screen plug according to the present invention. FIG. 3B is a cross-section view along line 3B—3B of FIG. 3A. FIG. 3C is a side view of an embodiment of a plug as in FIG. 3A. FIG. 3D is a side view of an embodiment of a plug as in FIG. 3A. FIG. 3E is a side view of an embodiment of a plug as in FIG. 3A. FIG. 3F is a side view in cross-section of a fastener for the plug of FIG. 3E.

FIG. 4B is an end view of the screen of FIG. 4A.

FIG. 5A is a top view of a screen according to the present invention. FIG. 5B is an end view of the screen of FIG. 5A.

FIGS. 7A, 7E are top views of a strip support according to the present invention.

FIG. 8 is a top schematic view of a screen assembly according to the present invention.

FIG. 9 is a side cross-section view of a screen assembly according to the present invention.

FIG. 10A is a side cross-section view of a screen assembly according to the present invention. FIG. 10B is a side cross-section view of a screen assembly according to the present invention.

FIG. 11A is a side cross-section view of a screen assembly according to the present invention. FIG. 11B is a top view of the screen assembly of claim 11A.

FIG. 12A is a side cross-section view of a screen assembly according to the present invention. FIG. 12B is a top view of the screen assembly of claim 11A.

FIG. 13 is a side cross-section view of a plug according to the present invention.

FIG. 14 is a side cross-section view of a plug according to the present invention.

FIG. 15A is a bottom view of a plug according to the present invention. FIG. 15B is a side view of the plug of FIG. 15A.

FIG. 16A is a bottom view of a plug according to the present invention. FIG. 16B is a side view of the plug of FIG. 16A.

FIG. 17A is a top view of a screen assembly according to the present invention. FIG. 17B is an end view of the screen assembly of FIG. 17A. FIG. 17C is an end view of an elongated plug of the screen assembly of FIG. 17A. FIGS. 17D and 17E are end views of alternative elongated plug embodiments.

FIG. 19A is a perspective view of a strip system according to the present invention. FIG. 19B is a cross-section view along line 19B—19B of FIG. 19A. FIG. 19C is a cross-section view along line 19C—19C of FIG. 19B. FIG. 19D is a cross-section view of a system as in FIG. 19A.

FIGS. 25A–25E are cross-section views of screen ramp portions according to the present invention.

FIG. 32A is a top view of a screen according to the present invention.

FIG. 33 is a perspective view of a system according to the present invention.

FIG. 34B is an end exploded view of the screen of FIG. 34A. FIG. 34C is an end view of the screen of FIG. 34A. FIG. 34E is a side exploded view of the screen of FIG. 34A. FIG. 34D is a side view of the screen of FIG. 34A and an adapter for mounting the screen on a vibratory separator apparatus.

FIG. 35A is a top view, partially cut away, of a screen according to the present invention. FIG. 35B is an end exploded view of the screen of FIG. 35A. FIG. 35C is an end view of the screen of FIG. 35A. FIG. 35D is a side exploded view of the screen of FIG. 35A.

FIG. 36A is a top view, partially cut away, of a screen according to the present invention.

FIG. 38B is an end exploded view of the screen of FIG. 38A. FIG. 38C is an end view of the screen of FIG. 38A. FIG. 38D is a side exploded view of the screen of FIG. 38A.

FIG. 44A is a top view of a screen according to the present invention. FIG. 44B is an exploded view and FIG. 44C is an end view of the screen of FIG. 44A.

FIG. 45A is a top view of a panel according to the present invention for a screen assembly.

FIG. 45B is a front side view of the panel of FIG. 45A. The back side view is like the view of FIG. 45B.

FIG. 45C is a left end view (as in FIG. 45A) of the panel of FIG. 45A. The right end view is like the view of FIG. 45C.

FIG. 45D is a bottom view.

FIG. 51A is a top view of a screen frame according to the present invention. FIG. 51B is an enlargement of a portion of FIG. 51A. FIG. 51C is an end view of a strip of the screen frame of FIG. 51A.

FIG. 52 is an alternative strip interlocking structure for a screen frame as in FIG. 51A.

FIG. 53 is an alternative strip interlocking structure for a screen frame as in FIG. 51A.

FIG. 55A is a perspective view of a screen apparatus according to the present invention. FIG. 55B is an enlarged view of part of the screen apparatus of FIG. 55A. FIG. 55C is a view along line 55C—55C of FIG. 55A.

FIGS. 55D–55H show possible end shapes for ridge end covering according to the present invention.

FIG. 56A is a top view of a screen apparatus according to the present invention. FIG. 56B is an end view of the screen apparatus of FIG. 56A.

FIG. 59A is a top view of a screen according to the present invention. FIG. 59B is an end view of the screen of FIG. 59A.

FIG. 60A is a perspective view of a screen part according to the present invention. FIG. 60B is a perspective view of a screen with parts as in FIG. 60A.

DESCRIPTION OF EMBODIMENTS PREFERRED AT THE TIME OF FILING FOR THIS PATENT

Figure 4A:
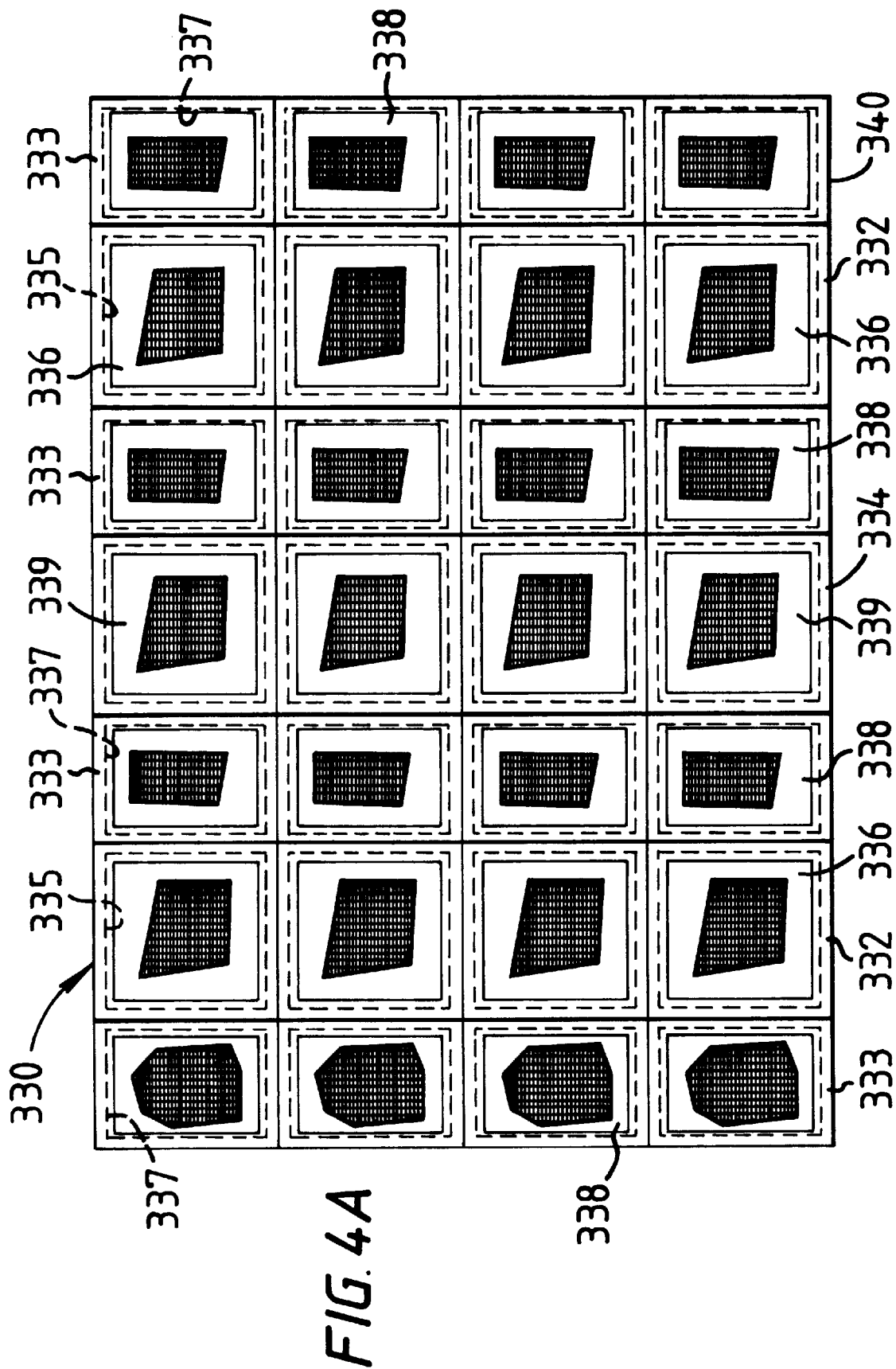
FIG. 4A is a top view of a screen according to the present invention.

As shown in FIG. 1A, a plug 160 according to the present invention has a body 161 and a mesh 162 formed integrally thereof. It is within the scope of this invention for the mesh to be a wire mesh or meshes (or screens) secured to the body 161 or wire mesh over the integral mesh 162. In certain aspects the plug 160 is a single piece member made of plastic or urethane.

In the embodiment of FIG. 1B, the plug 160 has an upper member 163 spaced apart from a lower member 164 by a snap recess 165 which is sized to correspond to an edge of a screen opening so that the plug 160 may be snapped into and then held in the screen opening.

In the embodiment of the plug 160 in FIG. 1C, an upper member 166 is disposed above a lower member 167. The lower member 167 is sized to fit in an opening of a screen. The plug 160 may be held in place in a screen opening by a friction fit and/or with a suitable glue, adhesive, or epoxy. Velcro™ material at plug edges and on opening edges may be used to releasably secure any plug herein at or in an opening. Plugs of different screening material or mesh or mesh size may be used in different screen areas; e.g., but not limited to plugs with a 40 mesh at back edge of a screen and plugs with a 100 mesh at a front end of the screen.

As shown in FIGS. 2A, 2B and 2C, a plug 170 according to the present invention has a body 171 and a mesh 172 formed integrally thereof. It is within the scope of this invention for the mesh to be any known mesh or screen, meshes or screens, or combination thereof, including but not limited to a layer or layers of plastic or synthetic mesh or a piece or pieces of perforated plastic or synthetics (bonded together, unbonded, or bonded at intermittent points) or a wire mesh secured to the body 171. In certain aspects the plug 170 is a single piece member made of plastic or urethane.

In the embodiment of FIG. 2A, the plug 170 has an upper member 173 spaced apart from a lower member 174 by a snap recess 175 which is sized to correspond to an edge of a screen opening so that the plug 170 may be snapped into and then held in the screen opening.

In the embodiment of the plug 170 in FIG. 2D, an upper member 176 is disposed above a lower member 177. The lower member 177 is sized to fit in an opening of a screen. The plug 170 may be held in place in a screen opening by a friction fit and/or with a suitable glue, adhesive, or epoxy.

As shown in FIGS. 3A, 3B and 3C, a plug 180 according to the present invention has a body 181 and a mesh 182 formed integrally thereof. It is within the scope of this invention for the mesh to be a wire mesh secured to the body 181. In certain aspects the plug 180 is a single piece member made of plastic or urethane.

In the embodiment of FIG. 3A, the plug 180 has an upper member 183 spaced apart from a lower member 184 by a snap recess 185 which is sized to correspond to an edge of a screen opening so that the plug 180 may be snapped into and then held in the screen opening.

In the embodiment of the plug 180 in FIG. 3D, an upper member 186 is disposed above a lower member 187. The lower member 187 is sized to fit in an opening of a screen. The plug 180 may be held in place in a screen opening by a friction fit and/or with a suitable glue, adhesive, or epoxy.

FIG. 3E shows an embodiment of the plug 180 with an upper body 188 and a lower body 189 with threads 190 thereon. A fastener 191 (FIG. 3F) with internal threads 192 threadedly mates with the lower body 189 to removably attach the plug 180 in a screen opening. Internal threads may be used on the plug 180 with an externally threaded fastener.

FIG. 4A shows a screen 330 according to the present invention with a plurality of ridges with ridge tops 332 connected to ridge sides 333 with bottom member 334 between adjacent ridge sides 333. The ridge tops 332 have a plurality of openings 335 each with a plug 336 therein according to the present invention. The ridge sides 333 have a plurality of openings 337 each with a plug 338 therein according to the present invention. The bottom member 334 has one or a plurality of at least two or more openings each with a plug 339 therein according to the present invention. A plate 340 has the ridge tops 332, ridge sides 333 and bottom members 334, each with their respective openings. It is within the scope of this invention for some or substantially all (e.g. the total minus one, two, three, four, five, or up to twenty) of the openings in the plate 340 to be covered with screen, screens, mesh or meshes in any combination applied and secured in any known manner or in any manner disclosed herein. It is within the scope of this invention for any opening in the plate 340 to have a plug permanently or removably disposed therein or for such a plug to be emplaced in any opening to repair damaged screen or to replace a previously used plug. Any plug disclosed herein may be used with the screen 330. The plugs 342 are like the plugs of FIGS. 1C, 2D, 3D or 3E. It is within the scope of this invention for the screen 330 to have any number of desired ridges 332 of any suitable dimensions with corresponding ridge sides 333 and bottom members 334, or with interconnected ridges having no bottom member therebetween. Alternatively, pointed corrugations may be used with no flat top and no flat bottom or with a flat bottom and pointed top. Such a screen (and any screen or screen assembly disclosed herein) may be used on a frame; on a flat perforated plate; on one or more braces and/or strip supports (flat and/or corrugated; and corrugated to correspond to the shape of the screen 330's shapes); on a combination thereof; and/or with upturned side edges or other connection apparatus for connection to a vibratory separator or shale shaker.

It is within the scope of this invention for the plugs of FIGS. 2A–2D and 3A–3E (and any plug disclosed herein) to be circular, oval, or square, rectangular, triangular, regular polygonal, polygonal elliptical (as viewed from above) or to be elongated as disclosed below. It is within the scope of this invention for mesh or meshes on or formed integrally of any plug herein (described above or below) to be oriented and emplaced on a screen either parallel to or normal to the direction of flow of material onto the screen for dewatering or classifying as desired. It is within the scope of this invention to provide a plug (described above or below) with both mesh or meshes formed integrally thereof and mesh or meshes applied thereunder or thereover. Upper plug parts may be made of plastic (or urethane) with lower parts made of metal, or vice versa. The plug body may be plastic or metal with plastic and/or wire mesh bonded to it. Different plugs may be used in the same screen. Plugs can be any desired size. In one aspect plugs range from a smallest width of about 0.5 inches to one foot wide, or more and from a length of 0.5 inches to several feet. In one aspect plugs with different mesh or screen than other plugs are used in the same screen to provide a different classification function in one screen. In one aspect plugs of uniform size with similar or dissimilar mesh or screen are used.

FIG. 5A shows a screen 350 according to the present invention with a plurality of openings 351 and 352 in a plate 360. Plugs 353 are secured in some of the openings 351 and a plug 354 is in one of the openings 352. Mesh (shown partially in FIG. 5A) covers substantially all of the tops of the plugs 353 and 354. Screen 355 covers openings that are not plugged. Screen 355 may be any known screen, screens, mesh, or meshes applied to the plate 360 in any known manner or any manner disclosed herein. The plate 360 may be any known plate, flat or corrugated.

Figure 6A:
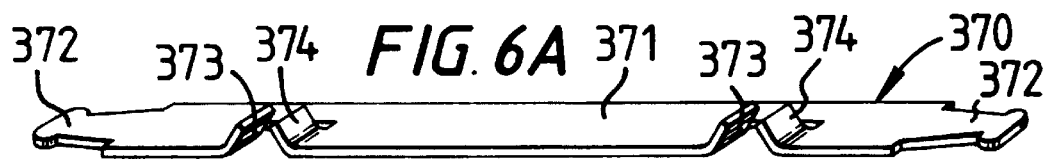
FIG. 6A is a perspective view of a strip support according to the present invention.
Figure 6B:
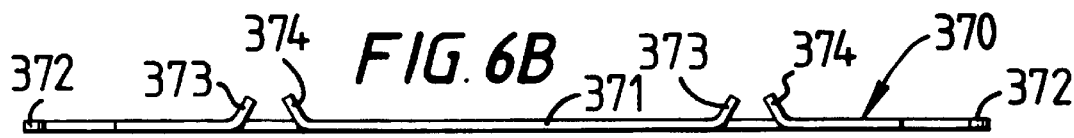
FIGS. 6B, 6D are end views of the strip support of FIG. 6A.
Figure 6C:
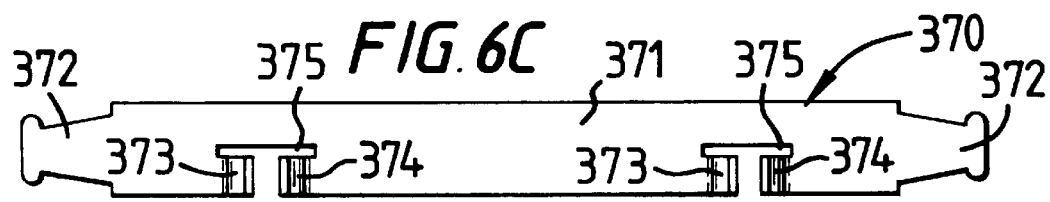
FIG. 6C is a top view of the strip support of FIG. 6A.
Figure 6D:
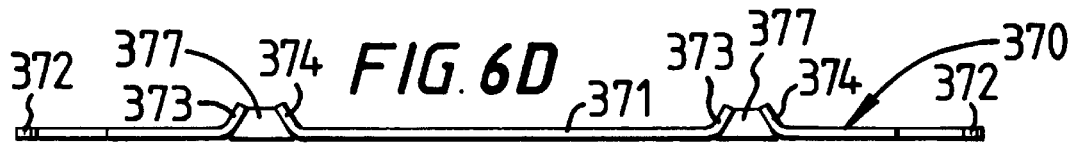

FIG. 6A shows a support strip 370 according to the present invention with a body 371, ends 372 and upturned fingers 373, 374. In one aspect the strip 370 is metal (e.g. but not limited to carbon steel or stainless steel), and the fingers are upturned following a cut 375 in the body 371 and then a cut to separate the fingers. These cuts are made and sized, in one aspect, so that the fingers are sized and positioned to correspond to raised portions of a corrugated screen or of a corrugated plate. The strip 370 can be used as any strip disclosed herein or in pending co-owned application U.S. Ser. No. 08/786,515 filed on Jan. 21, 1997 entitled "Screen For Shale Shaker" incorporated fully herein for all purposes. Alternatively, the strip 370 can be a molded item made as shown in FIGS. 6A–6C. It is within the scope of this invention to have a strip with three, four, five or more sets of upturned fingers and, in one aspect, to have a set of fingers for each raised portion of a plate and/or screen used with the strip. It is within the scope of this invention to use any desired number of strips with a plate and/or screen. One or more sets of fingers 373, 374 may be used on a strip with one or more fingers 385 of the strip of FIG. 7A. FIG. 6D shows an alternative embodiment of the strip 370 with an internal support 377 between fingers 373, 374. Such supports 377 may be glued in place to the interior surfaces of the fingers 373, 374. If the strip 370 is metal and the supports 377 are metal, they may be glued, sintered, or welded in place. The supports 377 (and strip 370) may be made of materials as described below for the supports and strips in FIGS. 19A–23D.

Figure 7A:
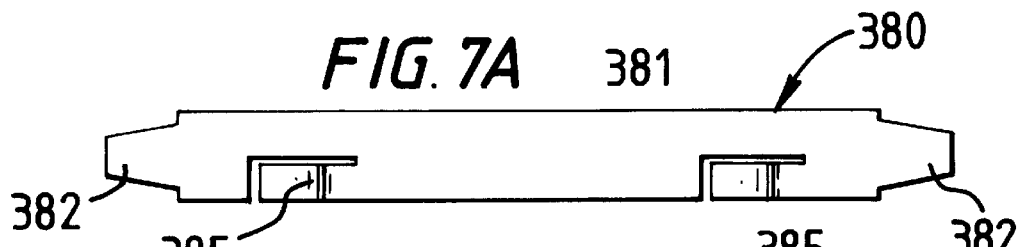
Figure 7B:
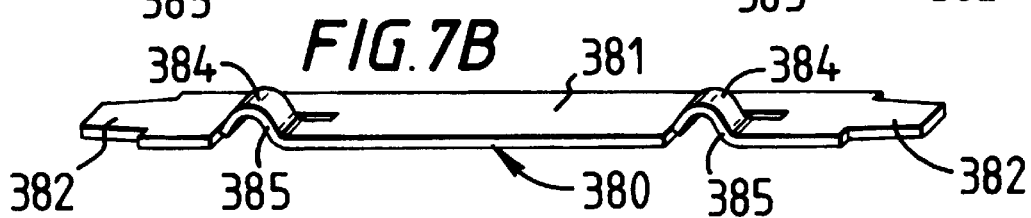
FIG. 7B is a perspective view of the strip support of FIG. 7A.
Figure 7C:
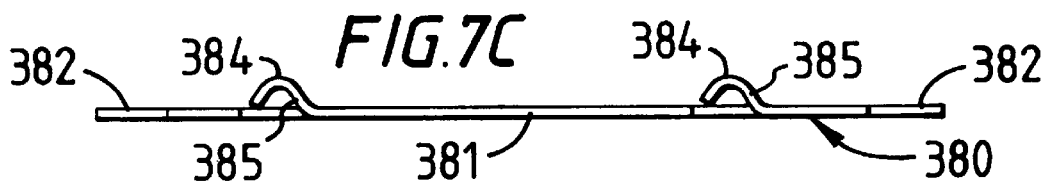
FIGS. 7C, 7D are end views of the strip support of FIG. 7B.
Figure 7D:
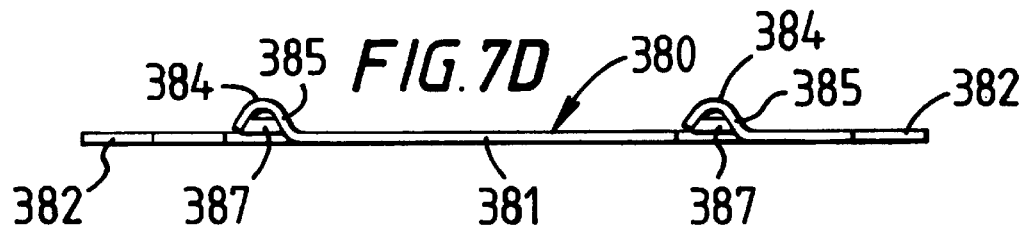
Figure 18A:
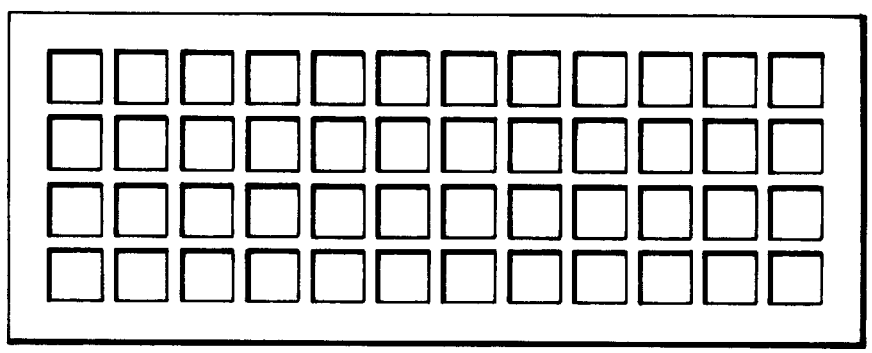
FIGS. 18A–18D are top views of prior art perforated plates.
Figure 18B:
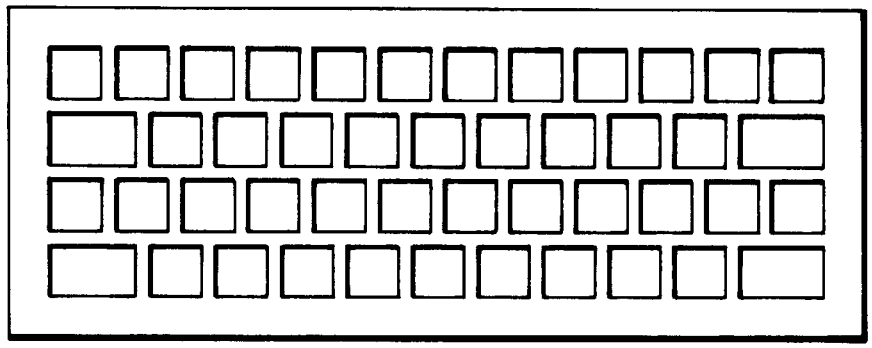
Figure 18C:
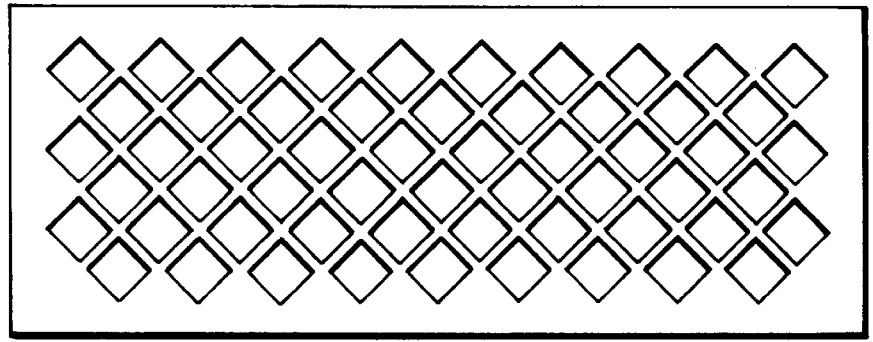
Figure 18D:
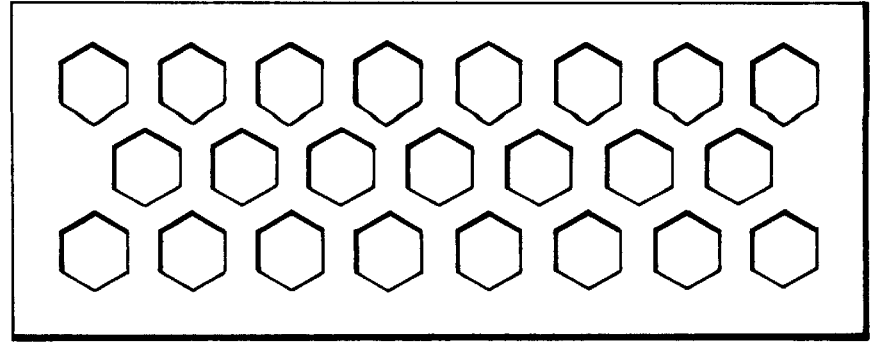

FIGS. 7A–7C disclose a support strip 380 for a screen and/or plate which has a body 381 (in one aspect made of metal) with ends 382 and a cut 383 which has fingers 385. As shown in FIGS. 7B and 7C, the fingers 385 are upturned and have a top curved portion 384. In one aspect the top curved portion 384 corresponds in shape to a curved portion of a corrugated plate and/or screen used with one or more of the strips 380. Alternatively the strip 380 can be made of one integral plastic piece. Any desired number of fingers 385 may be provided. FIGS. 7D and 7E show an alternative embodiment of the strip 380 with an internal support 387 beneath each finger 385. The supports 387 have an end portion 388 extending over a top of the strip 380. The supports 387 may be secured to the interior surface of the fingers 385 and/or secured to or fastened to the strip 380. The supports 387 as shown do not extend downward to the lowest extent of the bottom of the strip 380, although this would be within the scope of the invention. The supports 377, 387 may be one or a series of fluid flow holes therethrough—as may any support in FIGS. 19A–23D. Any support disclosed herein may be fastened to a strip and/or screen and/or plate with one or more fasteners and/or with Velcro material.

The present invention discloses a method for making a screen assembly in which a perforated plate is sandblasted and/or washed with any suitable degreaser and/or soap. Any suitable perforated plate may be used. In one particular embodiment the perforated plate has round holes about ¼ inch in diameter or square holes with a diagonal measurement of about ¼ inch which have centers that are about 0.030 inches apart and that are separated from each other by about 0.050 inches of plate. Alternatively holes with a ⅜ inch, or ½ inch diameter may be used. The plate, in certain aspects, is made of carbon steel, stainless steel, or plastic. The holes, in one aspect, are at a 45° angle to the direction of fluid flow across the plate. If desired, the plate can be sandblasted or sanded.

The plate is heated to about 450° F. (in an oven or heat press) and is then dipped, preferably while positioned horizontally, into a fluidized bed of epoxy, (or other suitable adhesive) to coat the plate with melted epoxy powder in the bed. Heat in the plate permits the epoxy powder to bond to it in a semi-cured state. In another aspect powdered nylon, (or powdered polyester, or any suitable powderized coating) is coated onto the plate using a fluidized bed. In one aspect the epoxy is about 15 to 30 mils thick and in another aspect is about 20 mils thick on top of the plate and about 5 mils thick on the sides and bottom.

One, two, three, four or more layers of wire mesh are then cut to cover the pattern of perforations on the screen plate (in one aspect wider and longer than the coated screen plate), in one aspect mesh of 2 mesh to 500 mesh. The wire mesh and screen plate are placed on top of a non-stick panel (e.g. a panel made of 20 gauge steel with a Teflon (™) coating is applied to the panel; alternatively a 20 gauge steel sheet with a 20 mil thick sheet of Teflon (™) material on it may be used). The now non-stick panel acts as a tray for sliding the plate/mesh combination into an oven and the panel prevents the screen plate coating from sticking to the oven. Due to the Teflon (™) coating the plate surface adjacent to the wire mesh, the screen plate and wire mesh do not bond to the panel. The screen plate, alternatively, may be placed on top of the mesh or meshes. A second non-stick panel is then placed over the first plate/mesh/panel combination. This second panel non-sticking surface is adjacent to the plate. In one aspect this second panel has a sheet of self-adhesive Teflon (™) material on its lower side facing the mesh on the plate. Instead of Teflon (™) material, any material may be used which will prevent the epoxy (nylon, polyester, etc.) from sticking to the panels. The two panels may be fastened together to provide pressure to facilitate encapsulation of the mesh by molten epoxy.

The sandwich of panels, plate, and mesh is placed in an oven, e.g. for 6 to 8 minutes at 340° F. to cure the epoxy. The cured screen plate is removed from the oven and the mesh and epoxy are cut flush with the sides of the screen plate. It is known in the art to thus prepare a plate/mesh combination. However, the inventors are unaware of any prior art teaching: the re-introduction of the plate/mesh back into an oven; the re-heating of the plate/mesh; or corrugating a re-heated combination of plate/mesh.

The plate with the mesh may then be corrugated or, alternatively, it is first placed back in the oven for about 2 minutes at about 450° F. While still hot, the plate is removed from the oven and corrugated (e.g. using a press brake). In one aspect a plate about 36 inches wide and about 47 inches long after corrugations has corrugations with ridges that are about an inch high. In one preferred embodiment the plate with the mesh and cured epoxy is at a temperature of at least about 250° F. until the corrugating operation is finished. With more flexible cured materials, e.g. nylon, it is not critical to maintain the relatively high temperature level of the plate during the corrugation operation. Alternatively, the plate is not corrugated.

The resulting screen assembly may be attached to a frame or it may be provided with upturned opposed edges for connection to a separator or shaker. In one aspect Velcro (™) material on the screen assembly is used with mating Velcro (™) material on a frame or on a separator or shaker to releasably attach the screen assembly thereto. In another aspect the screen assembly is thus connected to one or more support strips (e.g. but not limited to, any support strip described herein).

In one aspect such a screen assembly is placed on a frame coated with epoxy and the two items are held together between Teflon (™) material sheets. This combination is then cooked at about 450° F. for about 8 to 15 minutes to cure the epoxy and secure the screen assembly to the frame.

In one aspect a corrugated screen assembly as described above has the spaces below ridges capped or plugged at each end of the screen assembly.

FIG. 8 shows schematically a screen 450 with a plurality of screening plugs or modules 451, 452, 453 that are removably secured in corresponding openings 454 in a plate 456. Each module may be any size. With modules larger than those shown (e.g. up to a largest dimension of 6, 8, 12 or more inches or several feet; and in one aspect a screen with relatively few modules e.g. as in FIG. 8) there are fewer modules over the plate surface and with smaller modules (e.g. down to a largest dimension of about ½ inch) there are more modules over the plate surface. In one aspect the modules 451 have a relatively coarse metal mesh, e.g. 150 mesh screen; the modules 452 have a coarser mesh, e.g. 80 mesh; and the modules 453 have a fine mesh, e.g. 200 mesh, with the flow of fluid to be treated from the fine to the coarse modules (right to left in FIG. 8). Alternatively this pattern can be reversed; all the modules may have a substantially similar mesh; or any and all modules may have a combination of meshes thereon, including screens in layers of different mesh and/or screens or meshes made of different material, e.g. but not limited to carbon steel, stainless steel, Teflon (™) material, plastic, and/or urethane.

It is within the scope of this invention to provide any plug or module disclosed herein initially with no holes, perforations, or openings therethrough and then, e.g. later at a job site, to perforate the plug or module with the desired number and desired size openings, holes, or perforations or combination thereof. Such openings (and holes or openings for any plug or module disclosed herein) may be normal to the direction of the flow of fluid flowing above the hole, etc. (e.g. for classification) or at an angle other than perpendicular to such direction of flow (e.g. for dewatering to remove a large, preferably maximum, amount of liquid from a product).

With respect to the screen of FIG. 8 (or any other screen disclosed herein) it is within the scope of this invention for any plug or module, or any group thereof, to be fashioned for dewatering and/or for classification. A single screen may, therefore, have an area primarily for dewatering a product flowing thereacross and an area for classifying component materials of the product. Plugs and modules disclosed herein may be made of metal, plastic, fiberglass, cermet, urethane, KYNAR, polymeric material, BUNA N, Teflon (™) material, or polyvinylidene fluoride. In one aspect a screen is provided with plugs or modules made of urethane (or similar material) for a high wear area (e.g. at an area of the initial introduction of a slurry to a first screen, the area which first encounters fluid and/or product to be treated); and a lower wear area with plugs or modules with metal wire mesh.

Square plugs or similar plugs fitted with woven mesh (e.g. rectangular woven mesh) can be fitted to provide a screen for classifying or dewatering. With rectangular openings, in one aspect flow parallel to a long opening is used for dewatering and flow perpendicular to a long opening is used for classification.

FIG. 9 shows a screen assembly 460 with a plate 462 having holes 463 therethrough. A plug 464, 465, or 466 is removably secured in each hole 463. The plugs convert the plate into a 3-D corrugated screen assembly. It is within the scope of this invention for the plugs to have any desired shape and size to make a screen assembly with ridges of any shape and size—the ridges being part of the plugs. The plugs may be discrete separate items with a plurality of them spaced apart or they may be elongated members, e.g. two, four, twelve, twenty four, thirty, thirty six or more inches long and one, two, three, four or more inches wide.

The plug 464 has openings 467. Any number of openings of any desired size may be used. A mesh 468 covers the exposed surface of the plug 464. The plate 462 has optional openings 469 (any desired number and in any desired pattern) which may be sized for dewatering, separation, or classifying.

The plugs 465 have openings 469 and have no mesh thereon. The plug 466 has two mesh layers 470 and 471 and holes 472. Any combination of any mesh made of any material may be used on the plugs 464, 465, 466. Grooves 475 permit the plugs to be snapped into the holes 463. Alternatively the plugs can be permanently or semi-permanently bonded to the plate. Failed or damaged plugs may be replaced with little or no loss of screening area.

FIG. 10A shows a screen assembly 480 according to the present invention with a plate 482 having holes 481 therethrough and thereacross. A groove 484 permits plugs 485 to be snapped into the holes 481. A top perforated plug body 483 projects above the plate surface and a bottom perforated plug body 488 projects below the plate surface. Perforations 486 in the top perforated plug body may be similar to or different from perforations 487 in the bottom perforated plug body in size and disposition and they may be angled differently. Top and bottom plug bodies may be made of similar or different material and they may have one or more meshes (metal or otherwise thereon). As with the plugs of FIG. 9 and others disclosed herein, the plugs 485 may be any desired size, length, width, and cross-sectional shape.

FIG. 10B shows a screen assembly 490 with plugs as in FIG. 9 above a top surface of the plate 462 and bottom plug bodies like those of the plugs 485 (FIG. 10A). Holders 491 hold the bottom plug bodies on the plate 462. The holders 491 use the grooves 484 as is shown in FIG. 10A. The sections of the plate 462 between plugs may have holes or openings therethrough. The holes 463 in the plate 462 may be sized and configured as any opening or hole disclosed herein, including but not limited to an array of adjacent holes or openings (square, hexagonal, circular, triangular, rectangular) extending across the entire surface of the plate 462 or a series of relatively long openings extending from one side of a square or rectangular plate 462 to the other so that a corrugated screen is formed with both upper and lower corrugated surfaces defined by the plugs, the plugs extending for substantially the whole length of the relatively long openings.

FIGS. 11A and 11B show a screen assembly 630 according to the present invention with a plate 631 (shown partially) having a plurality of openings 632 thereacross. The openings 632 may initially be covered by one or more meshes and/or screens (as with all plates disclosed herein) or, alternatively all the openings 632 may have a plug 634 therein (as with all plates disclosed herein). Also, a plug 634 may be used to repair damaged mesh/screen over an opening with little or no loss of screening area. The plug 634 has a tapered body 635 corresponding to a tapered surface of the openings 632 and a lower lip 636 that permits the plug to be snapped into the openings 632 and held in the openings 632. The plug 634 has holes 637 extending therethrough. Alternatively the plugs 634 may be solid or may have more or less holes of larger or smaller diameter than those shown. The plug 634 as shown in FIG. 11B is elliptical as viewed from above; however it is within the scope of this invention to use any suitable shape, including but not limited to square, circular, triangular, hexagonal, polygonal, regular polygonal or rectangular. Also, a mesh, meshes, screen, and/or screens may be applied on the top surface of the plugs 634. It is critical for certain particular embodiments of the screen assembly 630 that the top surface of the plugs 634 is substantially flush with the top surface of the plate 631 (or with mesh etc. on top of the plate). Materials disclosed herein may be used for the plugs and plate.

FIGS. 12A and 12B show a screen assembly 640 according to the present invention with a plate 641 (shown partially) having a plurality of openings 642 thereacross. The openings 642 may initially be covered by one or more meshes and/or screens (as with all plates disclosed herein) or, alternatively all the openings 642 may have a plug 644 therein (as with all plates disclosed herein). Also, a plug 644 may be used to repair damaged mesh/screen over an opening. The plug 644 has a body 645 and a groove 646 that permits the plug to be snapped into the openings 642 and a bead 649 on the plate 641 to enter into the groove 646 to hold the plugs 644. The plug 644 has holes 647 extending therethrough. Alternatively the plugs 644 may be solid or may have more or less holes of larger or smaller diameter than those shown. The plug 644 as shown in FIG. 12B is circular as viewed from above; however it is within the scope of this invention to use any suitable shape, including but not limited to square, circular, elliptical, hexagonal, polygonal, regular polygonal, triangular, or rectangular. Also, a mesh, meshes screen, and/or screens may be applied on the top surface of the plugs 644. It is critical for certain particular embodiments of the screen assembly 640 that the top surface of the plugs 644 is substantially flush with the top surface of the plate 641 (or with mesh etc. on top of the plate). Materials disclosed herein may be used for the plugs and plate.

FIG. 13 shows a plug 650 according to the present invention with a body 651 and a top convex surface 652. A series of holes 653 extend through the plug 650. The plug 650 may be any desired size or shape.

FIG. 14 shows a plug 660 according to the present invention with a body 661, a top convex surface 662, and a mesh 668 thereon. A series of holes 663 extend through the plug 660. The plug 660 may be any desired size or shape. The holes 653 (FIG. 13) and holes 663 (FIG. 14) may be any diameter and there may be any desired number of them.

FIGS. 15A and 15B show a plug 670 according to the present invention with a body 671 and a series of holes 673 extend therethrough. The plug 670 may be any desired size or shape. The plug 670 is made of flexible material and has an expansion ring 675 therein that pushes the plug sides outwardly to facilitate maintenance of the plug 670 in position in a plate opening and/or put the plug's mesh or meshes in tension. A mesh or screen 675 is on top of the plug 670.

FIGS. 16A and 16B show a plug 680 according to the present invention with a body 682. A series of holes 683 extend through the plug 680. The plug 680 may be any desired size or shape. The plug 680 is made of flexible material and has expansion springs 684 and 686 that push the plug sides outwardly to facilitate maintenance of the plug 680 in position in a plate opening and/or put the plug's mesh or meshes in tension. One, two, three or more springs may be used. Meshes 681 and 688 are secured on the plug 680.

FIGS. 17A and 17B show a screen assembly 500 according to the present invention with a perforated plate 502 having perforations 504 extending therethrough from top to bottom. Any number and size perforations may be employed in any desirable pattern or positioning on the plate 502. Dovetail recesses 506 extend across the plate 502. Holes 505 extend from the recesses through the plate 502. A corresponding dovetail base of an elongated hollow plug 510 is held in each dovetail recess 506. Each plug 510 has a series of perforations or holes 508 therethrough and one or more bottom holes 509. Any number and size holes may be employed in any desired pattern or positioning on the plugs 510. The plugs 510 may be held tightly in the recesses 506 with a tight friction fit and/or with welding or epoxy. In one aspect the plugs 510 are removably inserted into the dovetail recesses 506 for easy replacement and/or repair. Any hole in a plug 510 may be repaired with a plug as previously described above for repairing damaged or torn mesh or screen. The perforations 504 and/or the holes 508 may be covered with any known mesh, meshes, screen or screens, bonded or unbonded, in any combination or layers.

FIG. 17C shows one of the plugs 510.

FIG. 17D shows an alternative embodiment of an elongated hollow plug 520 according to the present invention that has a body 522, holes 524 therethrough, a base 526 with holes 528 therethrough and a dovetail portion 529 through which the holes 528 also extend. To enhance sealing of the plug/plate interface, a seal bead 521 is provided along each side of the plug along its entire length. Alternatively such a seal member may be formed of or secured to the plate with which the plug 520 is used. The seal bead or member may be plastic, rubber, or any known suitable sealing material. Such a bead may also serve to stabilize the plug in place on the plate.

FIG. 17E shows an alternative elongated solid plug 530 with a body 532 having a series of holes 534 therethrough and a dovetail base 536. A mesh or screen 538 is secured over the plug body 532 covering the plug on its top surface. Fluid to be treated flows through the screen 538 and through the holes 534. Two or more meshes and/or screens may be used.

FIGS. 18A–18D show known perforation patterns for plates used with screens which may be used with plates and/or screen assemblies according to the present invention. The direction of fluid flow on the plates of FIGS. 18A—18D may be from top to bottom (as viewed in the Figures) or side to side (as viewed in the Figures).

Pending U.S. applications Ser. Nos. 08/598,566 and 08/786,515, identified above, are incorporated herein in their entirety for all purposes and copies of which are attached hereto as an Appendix.

FIG. 19A shows a screen frame 700 according to the present invention. In one aspect the frame 700 is made from a single sheet or frame piece from which areas 702 are removed, e.g. but not limited to by an appropriate saw or laser, to form outer sides 703, 704, 705, 706 and cross strips 707 and cross strips 708. Each cross strip 708 has two raised portions or humps 709. It is within the scope of this invention for any of the strips 707, 708 to have one, two, three, four five or more humps 709.

As shown each hump 709 has an internal support 710 therebeneath. The supports 710 are secured to a strip's underside by any suitable means, including, but not limited to, glue, adhesives, epoxy, sintering, and welding. The strips 707, 708 and the supports 710 may be made of any suitable metal, plastic, fiberglass, or composite material.

As shown in FIGS. 19B and 19C the inner surface of a top of the raised portion or hump 709 is spaced apart from a top surface of the supports 710 to facilitate fluid flow over and around the supports 710.

As discussed below, the strips 707, 708 and/or supports 710 may have a series of fluid flow holes therethrough. As shown in FIG. 19D a hump 711 (like the humps 709, FIG. 19B) has a series of fluid flow holes 712 therethrough and a support 713 (like the supports 710, FIG. 19B) has a series of fluid flow holes 714 therethrough.

Figure 20A:
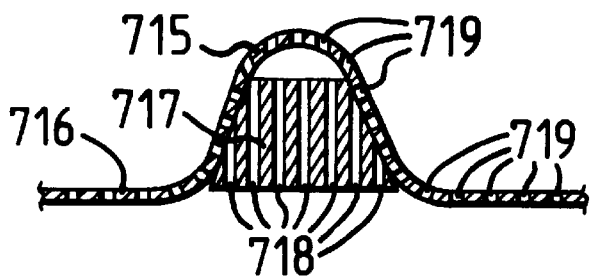
FIG. 20A is a cross-section view of a screen support member according to the present invention.
Figure 20B:
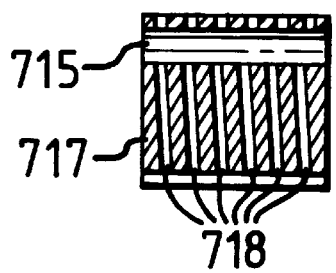
FIG. 20B shows a side cross-section view of the support of FIG. 20A.

FIGS. 20A and 20B shows a hump 715 (like the humps 709, 711) on a strip 716. The strip 716 has a series of fluid flow holes 719 therethrough, including holes through the hump 715. An internal support 717 with a series of fluid flow holes 718 therethrough is substantially as wide as the strip 716.

Figure 21A:
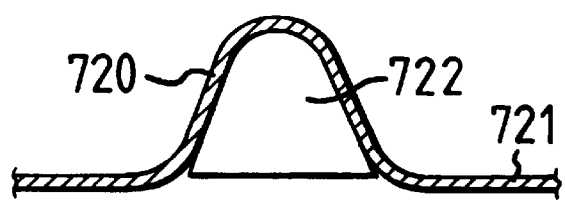
FIG. 21A is a cross-section view of a screen support member according to the present invention.
Figure 21B:
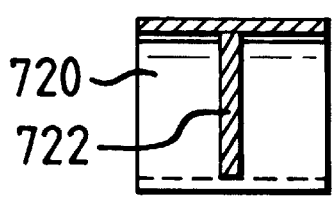
FIG. 21B shows a side cross-section view of the support of FIG. 21A.

FIG. 21A shows a hump 720 (like the humps in FIGS. 19B, 19D, 20A) of a strip 721 (like the strips 708, 716) has an internal support 722; but the support 722 viewed in cross-section as in FIG. 21A, occupies substantially all of the space under the hump 720 when viewed this way. The support 722 and/or hump 720 may have a series of fluid flow holes therethrough. The support 722, as is true of the supports in FIGS. 19D, 20A, 22A, 22C, 23B, and 23D, may be secured to a strip's underside as is a support 710 (FIG. 19B) and the strips in these figures and the supports may be made of any of the materials listed above regarding the strips 707, 708 and supports 710.

Figure 22A:
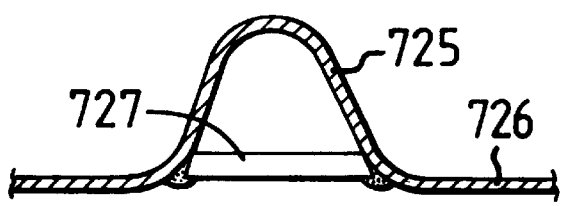
FIG. 22A is a cross-section view of a screen support member according to the present invention.
Figure 22B:
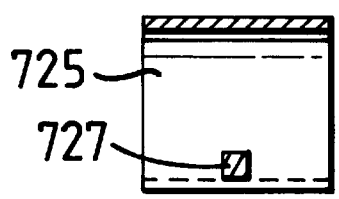
FIG. 22B shows a side cross-section view of the support of FIG. 22A.
Figure 22C:
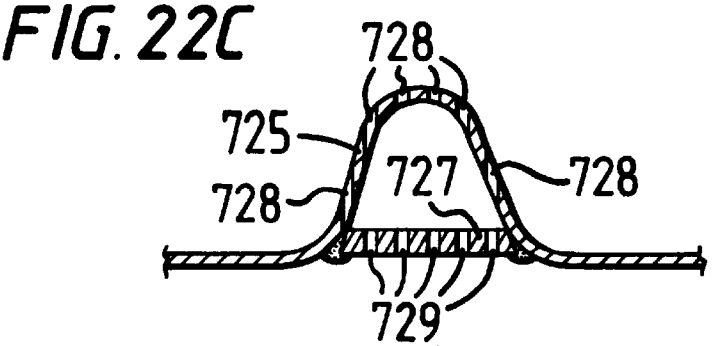
FIG. 22C is a cross-section view of a screen support member according to the present invention.

FIGS. 22A and 22B show a hump 725 of a strip 726 with an internal support 727 adhesively secured to the strip 726 with epoxy. Alternatively, the support 727 may be welded to the strip 726. Preferably when viewed as in FIG. 22B the support 727 occupies less than 10% of the area beneath the hump 725 and most preferably less than 5%. As with any other internal support and hump disclosed herein, the hump 725 and/or support 727 may have one or a series of fluid flow holes therethrough, as shown with the holes 728, 729 in FIG. 22C.

Figure 23A:
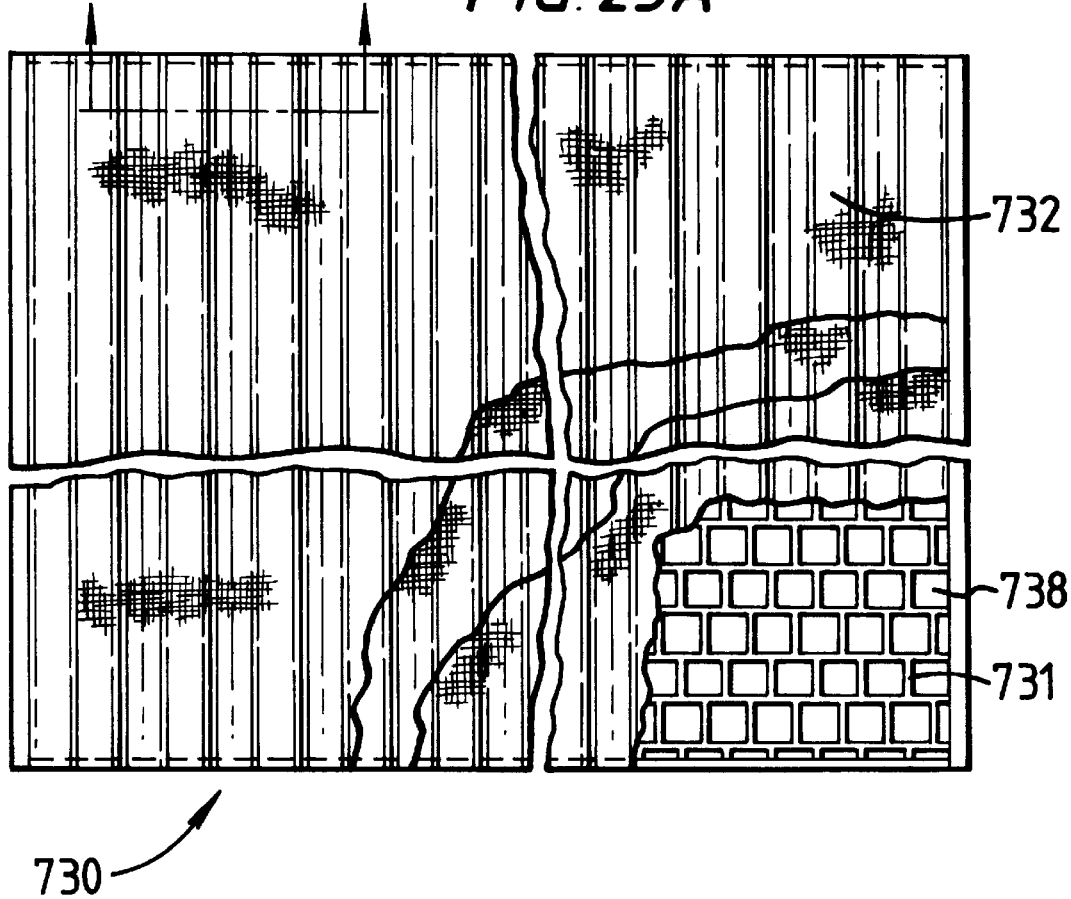
FIG. 23A is a top view of a screen according to the present invention.
Figure 23B:
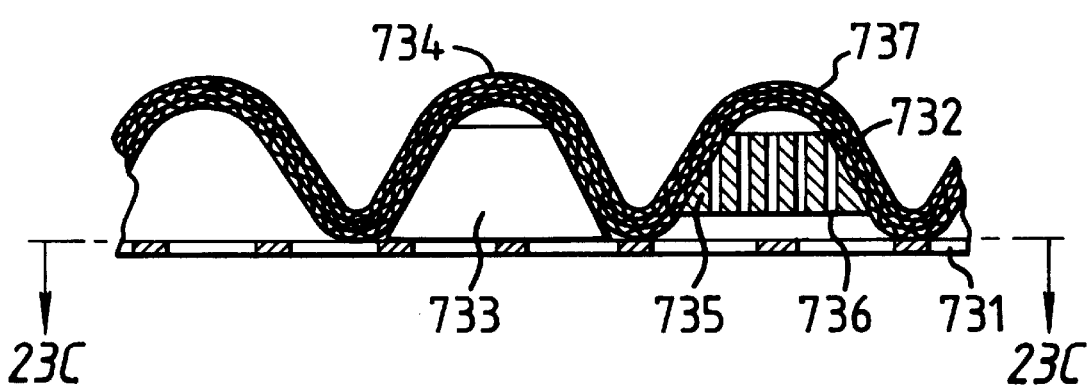
FIG. 23B is a view along line 23B—23B of FIG. 23A.
Figure 23C:
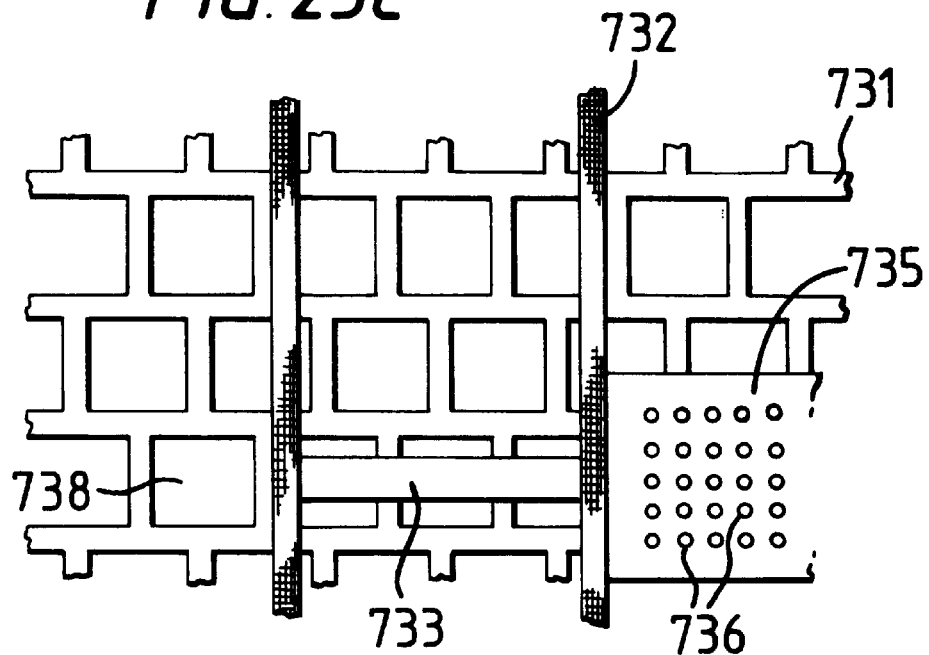
FIG. 23C is a view along line 23C—23C of FIG. 23B.

FIG. 23A–23C illustrate changes to a screen assembly 730 disclosed in U.S. Pat. No. 5,720,881 which is incorporated fully herein. The screen assembly 730 has a plate 731 with holes 738 therethrough and a multi-layer screen 732 epoxied together and bonded to the plate 731.

As shown in FIG. 23B, support 733 underlies a ridge 734 of the screen 732 and support 735 with a series of fluid flow holes 736 therethrough underlies a ridge 737.

It is within the scope of this invention to use one or more supports 733 and/or 735 (and/or one or more of any of the supports disclosed herein) under one, two, three, more than three, or all of the ridges of the screen 732 (or of any screen or screen assembly disclosed in U.S. Pat. No. 5,720,881). In one aspect each ridge may have a series of spaced apart supports and, in another aspect, supports under one ridge are offset from those under another ridge.

Although it is not preferred, in certain embodiments the support(s) may be loose under the ridges. As shown in FIG. 23B the support 733 is secured to the screen 732 and to the plate 731 and the support 735 is secured to the screen 732.

As shown in FIG. 23C the width of a support may be such that, as viewed from above, it does not block off the openings 738 (support 733) or, alternatively it does block off openings 738 (support 736).

Figure 23D:
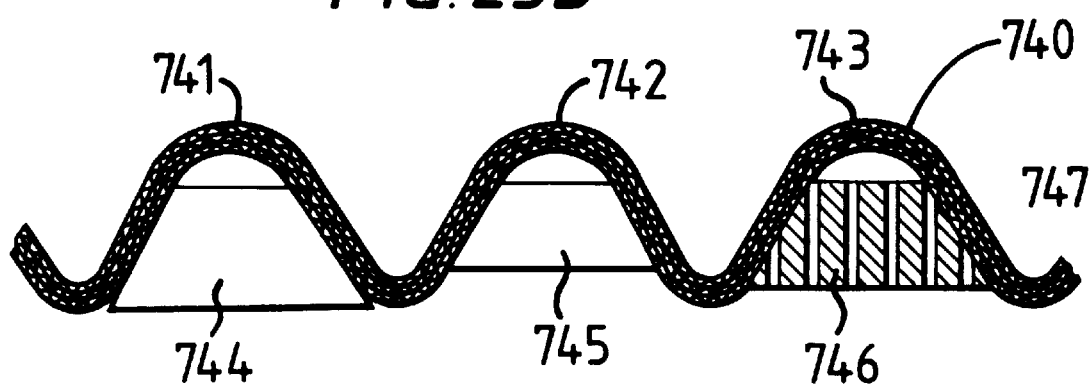
FIG. 23D is a cross-section view of a screen according to the present invention.

FIG. 23D shows a screen 740 like the screen assembly 730's screen 732, but with no lower plate 731. It is to be understood that the screens 732 and 740 represent any known single or multi-layer screen or screen assembly with screen(s) bonded together or unbonded. It is within the scope of this invention to use one or more supports (any disclosed herein) with each of the various screen assemblies disclosed in U.S. Pat. No. 5,720,881 including but not limited to those of this patent's FIGS. 2, 4, 8 and 9.

Ridges 741, 742, 743 of the screen 740 each has an internal support 744, 745, 746, respectively secured thereto and thereunder. It is within the scope of this invention for the screen 740 to have only supports 744, 745, or 746, to have them under each ridge, for such supports to extend along and under the entire length of a ridge, or for there to be a plurality of spaced apart supports beneath each ridge. The support 746 is shown with a series of fluid flow holes 747 therethrough, but it may be solid and either or both of the supports 744, 745 may have a series of fluid flow holes therethrough.

Figure 24A:
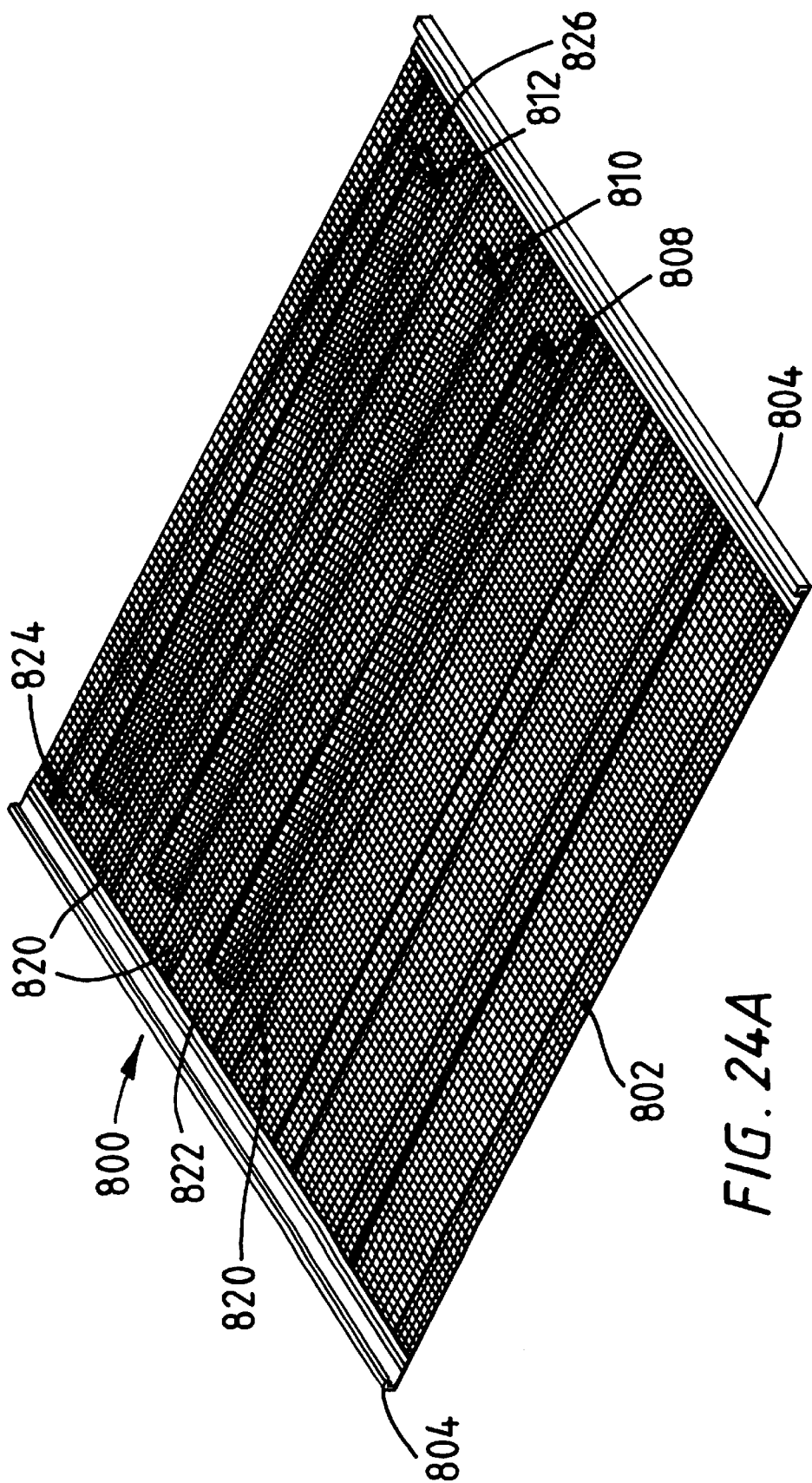
FIG. 24A is a perspective view of a screen according to the present invention.
Figure 24B:
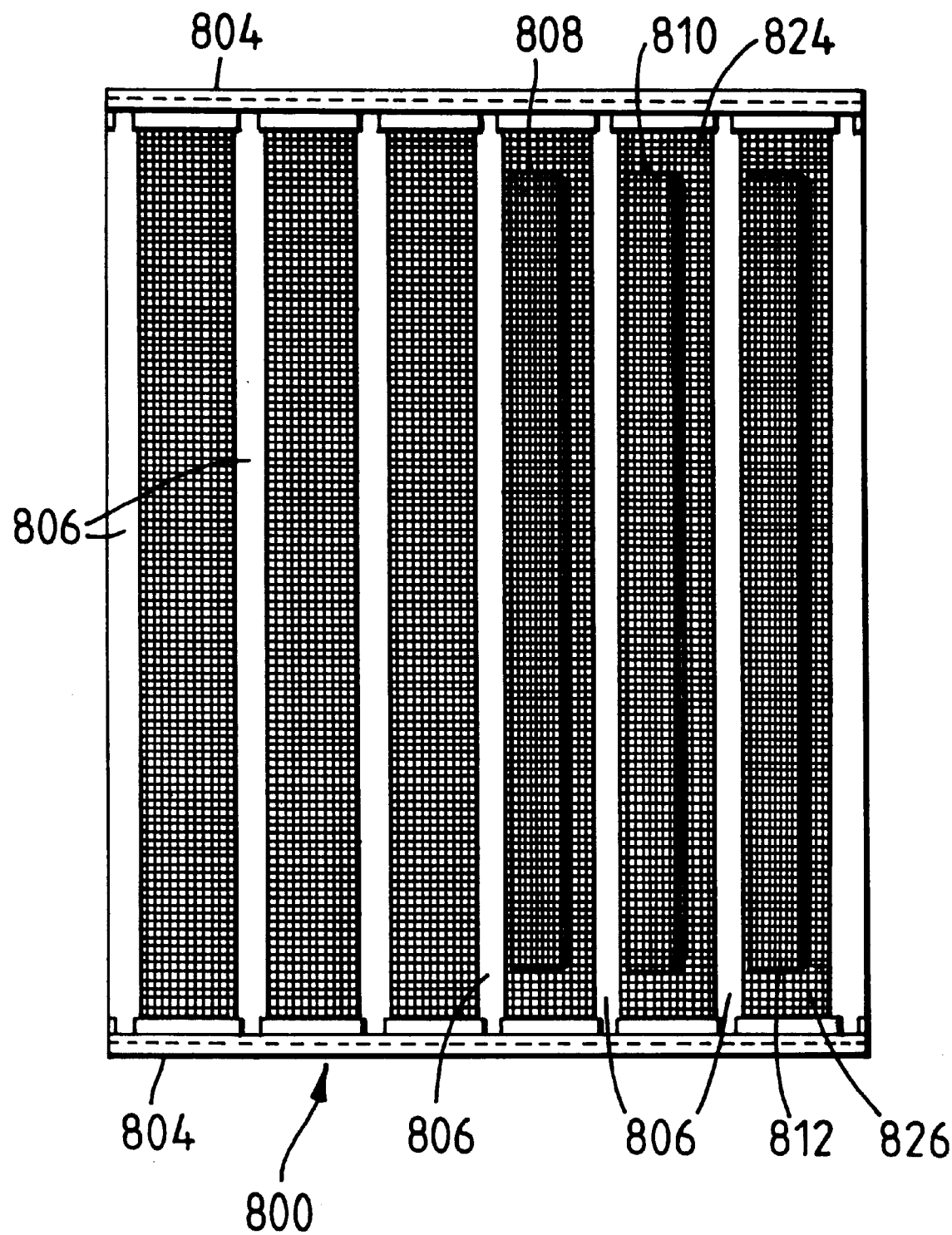
FIG. 24B is a bottom view, FIG. 24C a top view, FIG. 24D a side view, FIG. 24E a side view, and FIG. 24F an end view of the screen of FIG. 24A.

FIG. 24A shows a screen 800 according to the present invention with mesh 802 supported on spaced-apart straps 806. The mesh 802 may be any suitable known mesh, screen, meshes, screens, or combination thereof, secured together or lying on each other and/or partially bonded or sintered together, or so connected to each other over substantially all of their area. In the screen 800, the mesh 802 is, in one aspect, a wire mesh that is bonded to the straps 806.

The straps 806 are secured to hookstrips 804, e.g. as previously described for straps herein.

As shown, the screen 800 has three spaced-apart ramps 808, 810, 812. A dewatering area or pool 822 is defined between the two ramps 808, 810 and a dewatering area or pool 820 is defined between the two ramps 810, 812. Side flow paths 824, 826 are positioned between ends of the ramps 808, 810, 812 and the hookstrips 804.

Figure 24C:
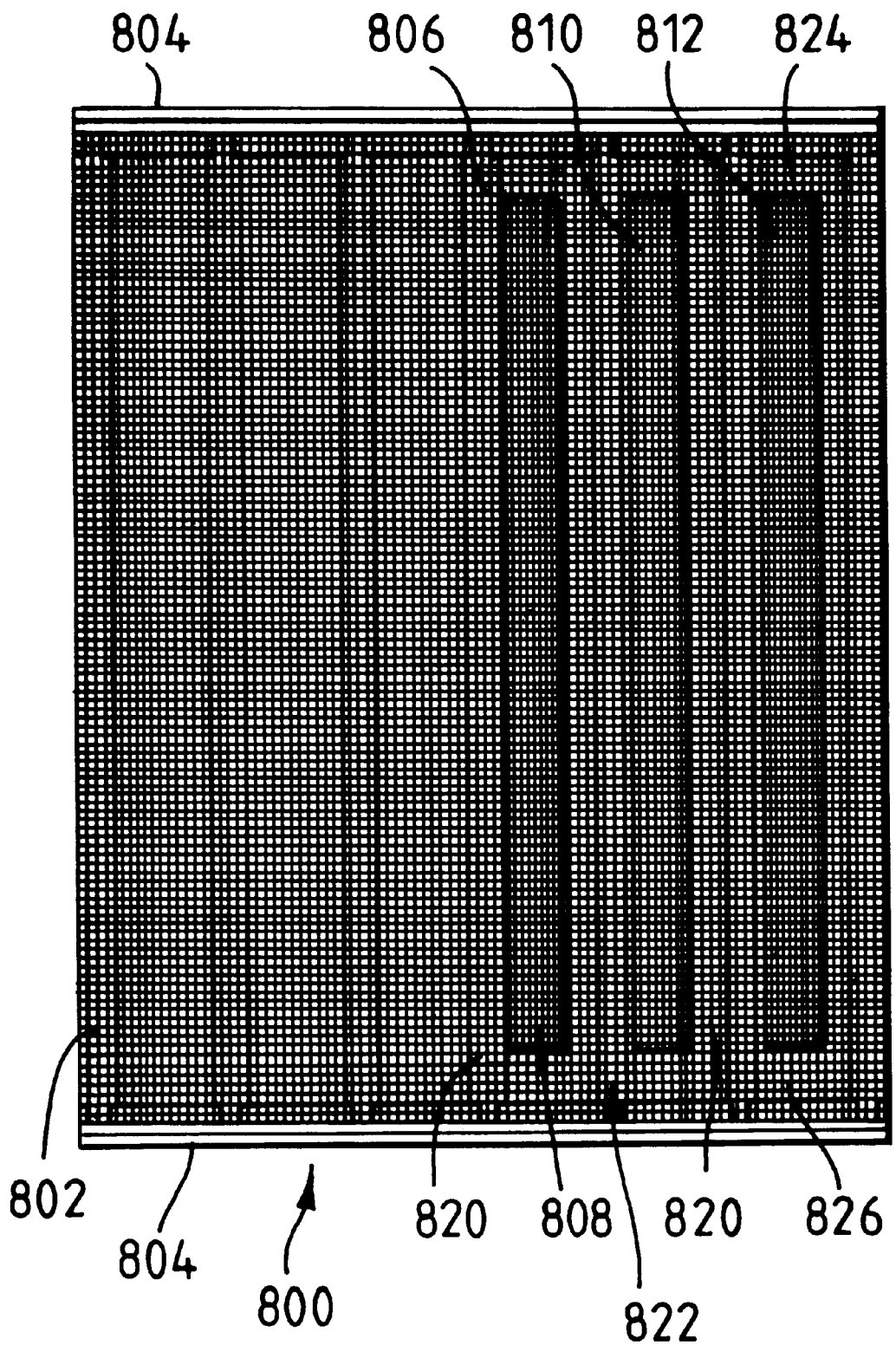

In one aspect the ramp 808 is located so that fluid material is introduced onto the screen 800 in an area behind (to the left in FIG. 24C) the ramp 808 and which includes one of the straps 806 therebeneath to counter effects of the impact of the fluid material on the wire mesh 802 in this area. Also such a location of the ramp 808 with respect to the strap 806 facilitates dewatering of solids in this area while inhibiting screen wear. Liquid rising to the top can exit through the screen ramp. Similarly a strap 806 traverses the areas 822 and 826.

Alternatively, the ramp portions and straps may be positioned so that any or part of the ramp portions overlie a strap or a portion of a strap. The ramp portions may be spaced apart any desired distance. In one aspect the screen 800 is about 36 inches by 45½ inches; the right-hand edge (as viewed in FIG. 24C) of the ramp 808 is between about three to about five inches or more from the left-hand edge of the ramp 810; the right-hand edge of the ramp 810 is between about three to about five inches or more from the left-hand edge of the ramp 812; the right-hand edge of the ramp 812 is between about three to about five inches or more from the right edge of the screen 800; and the ramps are between about three to about five inches wide (horizontal dimension as viewed in FIG. 24E) and about ½ inch high (as in FIG. 24E). Each ramp 808, 810, 812 has a ramped surface 808a, 810a, 812a, respectively at an angle, preferably, between about twenty to about forty degrees from the horizontal, more preferably between about twenty-five to about thirty degrees, and in one particular aspect about twenty seven-degrees. Each ramp also has a rear face at between about eighty to about one hundred twenty-five degrees to the horizontal, more preferably between ninety and one hundred twenty degrees, and in one particular aspect about one hundred fifteen degrees.

FIGS. 25A–25E show cross-section views for a variety of ramp profiles 840–848 according to the present invention. In certain preferred embodiments ramp heights range between ¼ inch and 1½ inches and ramp widths range between about one inch and about five inches.

Figure 26:
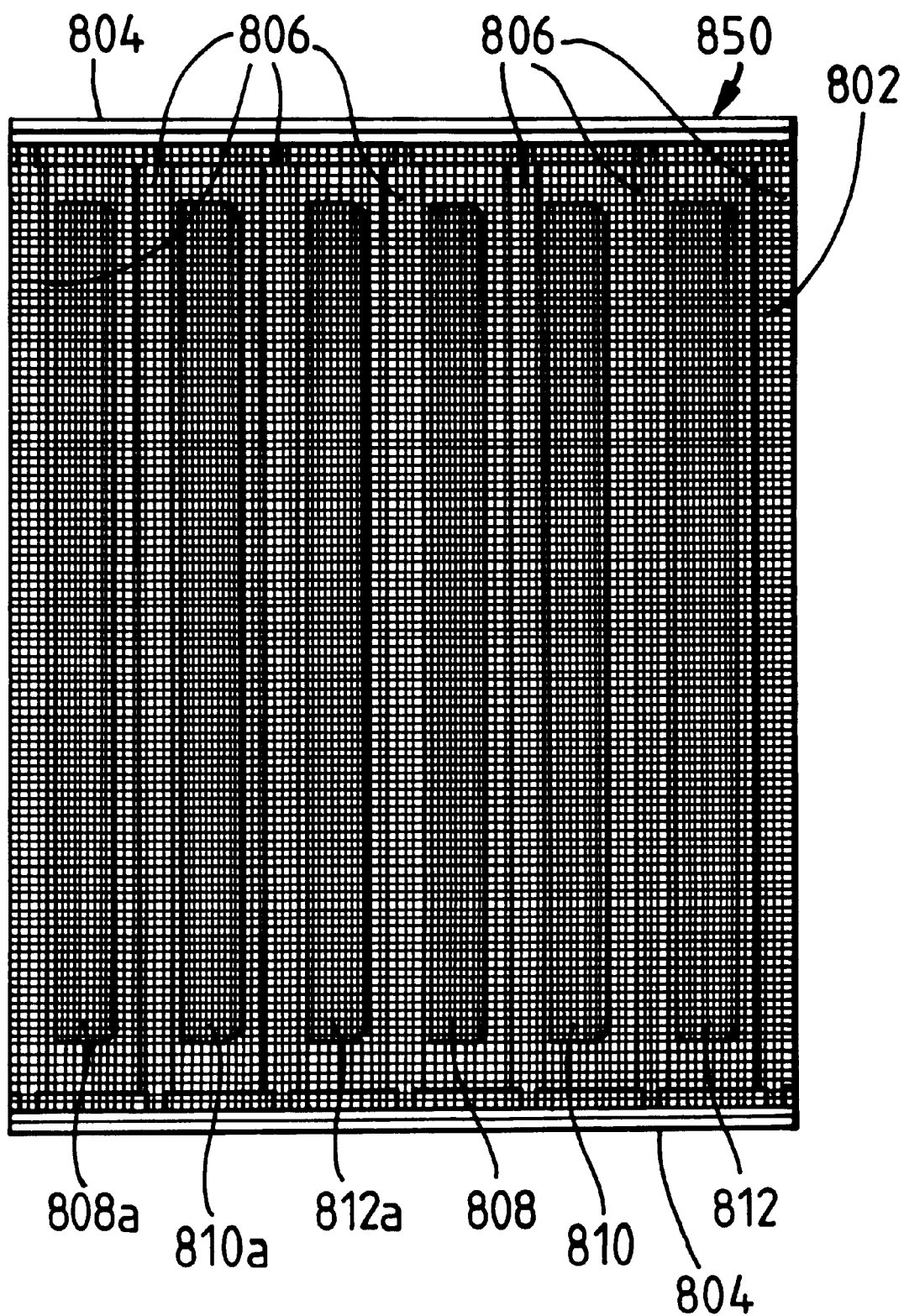
FIGS. 26–28 are top views of screens according to the present invention.

It is within the scope of this invention to provide a screen with one, two, three, four, five, six or more ramps and the ramps may be the same or different on a multi-ramp screen—and may be any ramp with any profile disclosed herein. FIG. 26 shows a screen 850 like the screen 800 (and like numerals indicate the same parts), but with an additional series of ramps 808a, 810a, 812a.

Figure 27:
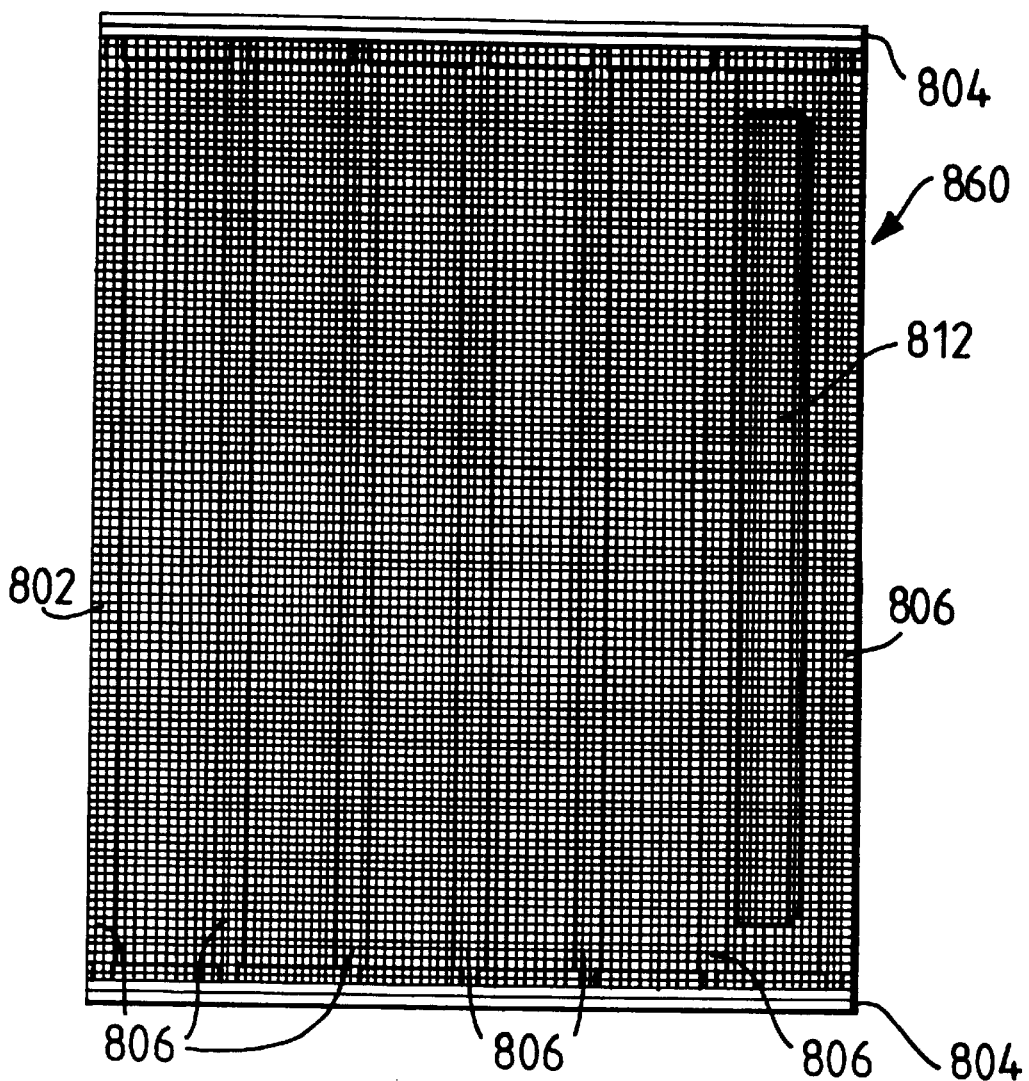

FIG. 27 shows a screen 860 like the screen 800 (and like numerals indicate the same parts), but with only one ramp 812.

Figure 28:
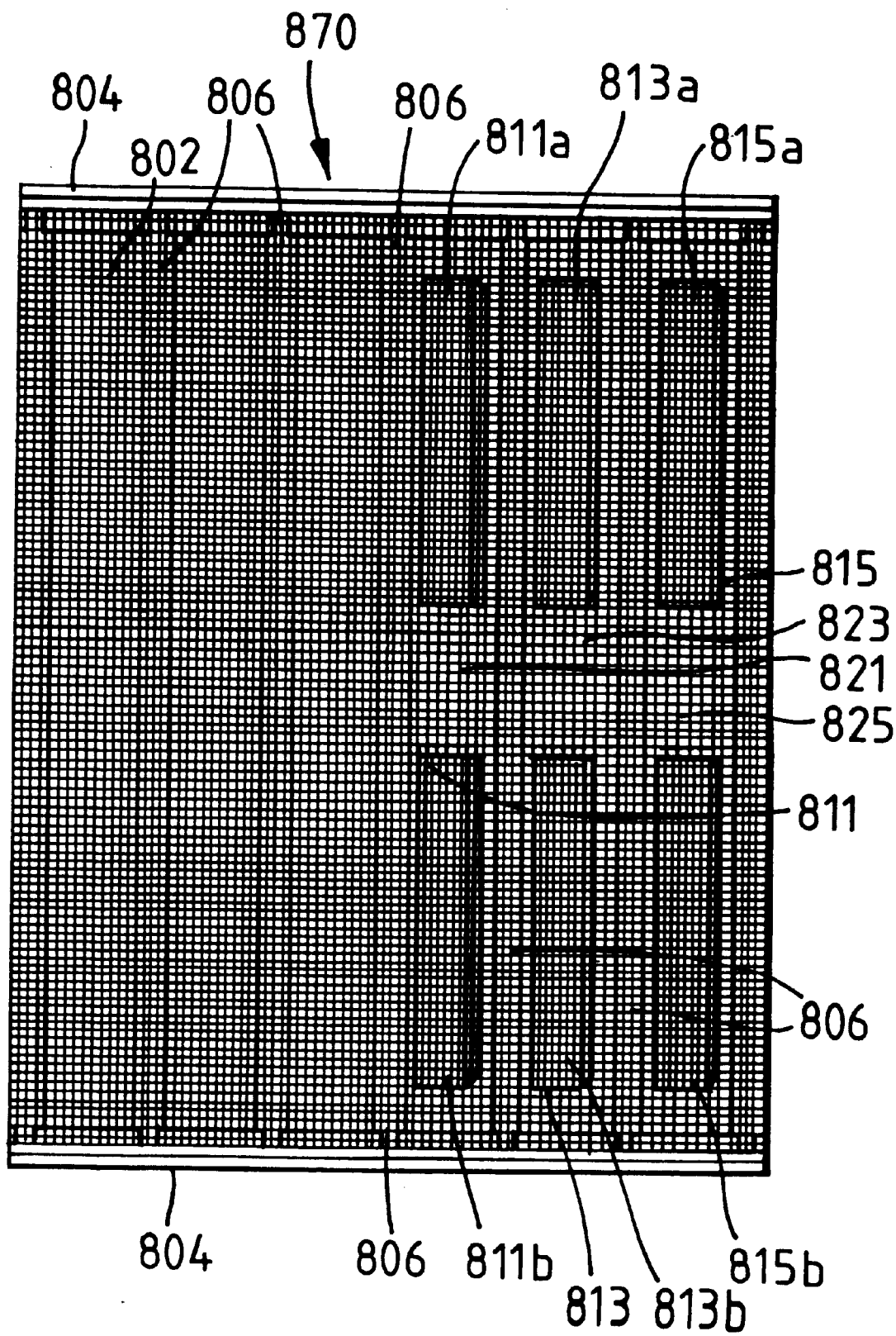

FIG. 28 shows a screen 870 like the screen 800 (and like numerals indicate the same parts), but with divided ramps 811, 813, 815 (each with ramp portions 811a, 811b; 813a, 813b; 815a, 815b, respectively) each having a flow path 821, 823, 825 between ramp portions. It is within the scope of this invention to provide: a full undivided ramp for any of the ramps 811, 813 or 815; a flow path between ramp portions of any desired width, including, but not limited to, between about three inches and about five inches; and to provide additional flow paths (one, two, or more) through the ramp portions themselves. In one aspect, ramp portions are offset to provide a more tortuous path for wet solids. Any one or two of the paths 821, 823, 825 may be deleted by providing an undivided ramp across the screen 870.

In any screen disclosed herein with one, two or three ramps on one side of the screen (as viewed from above), e.g. as in FIGS. 24D, 27 and 28, it is within the scope of this invention to provide one, two or more ramps on the other side of the screen.

Figure 29A:
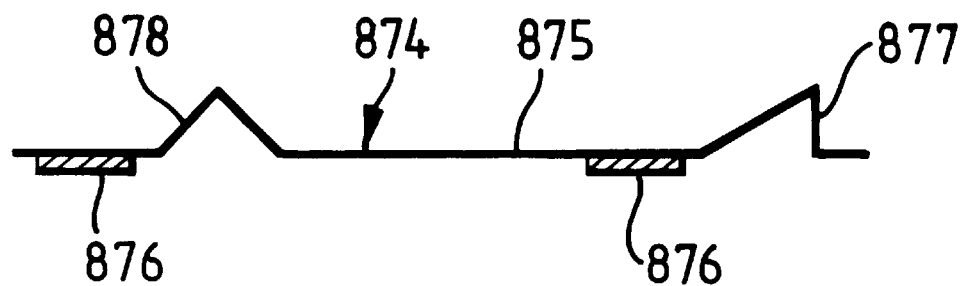
FIGS. 29A and 29B are cross-section views of screen ramp portions according to the present invention.
Figure 29B:
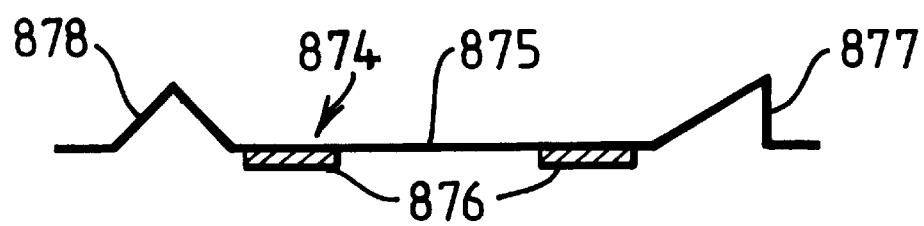

Different ramp profiles may be used on the same screen. FIG. 29A shows part of a screen 874 according to the present invention (like the screen 800) with mesh 875 and spaced-apart ramps 877, 878. Straps 876 (like the straps 806) are beneath the mesh 875. FIG. 29B shows a different location for the straps 876.

Figure 30A:
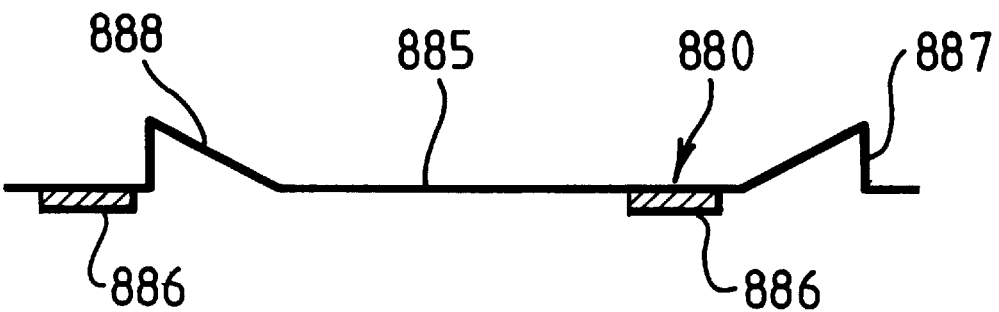
FIGS. 30A and 30B are cross-section views of screen ramp portions according to the present invention.
Figure 30B:
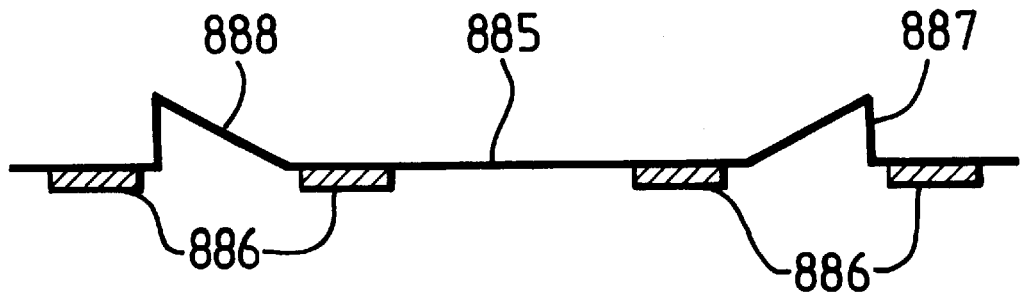

FIG. 30A shows a screen 880 according to the present invention (like the screen 800) with mesh 885 in straps 886 (like the straps 806) and ramps 887, 888. FIG. 30B shows the screen 880 with additional straps 886. The screens of FIGS. 29A–30B may have hookstrips and straps like the screens 800, 850, 860 and/or 870.

Figure 31:
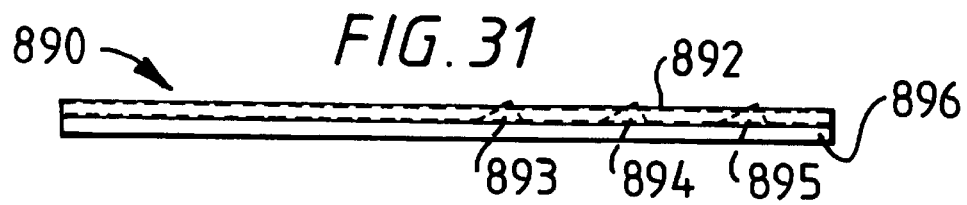
FIG. 31 is a side view of a screen according to the present invention.

Although a series of spaced-apart parallel straps is not the legal equivalent of a perforated plate, a screen as described herein (FIGS. 24D–30B) and/or any ramp or ramp portion as described herein may be used on a perforated plate and, in particular aspects, on a perforated plate of any prior art screen instead of the prior art mesh(es) and/or screen(s) used thereon, including, but not limited to, with flat and/or three-dimensional screens and/or with the plates of the screens of previous U.S. Pat. Nos. 4,575,421; 5,720,881; 5,417,858; 5,783,077; 5,417,859; 5,417,793; 5,636,749; 4,033,865; 5,221,008; 4,819,809; 4,065,382; 3,929,642; and 5,211,291. Such a screen is illustrated by the screen 890 of FIG. 31 which has mesh 892; ramps 893, 894, 895; and a perforated plate 896 (side view shown without showing perforations that do extend through the plate). It is also within the scope of this invention to use a perforated plate under a portion of the screen mesh and one or more straps under the remaining portions of the screen mesh, with one or more ramped screen portions over the perforated plate and/or over the strap(s).

Figure 32B:
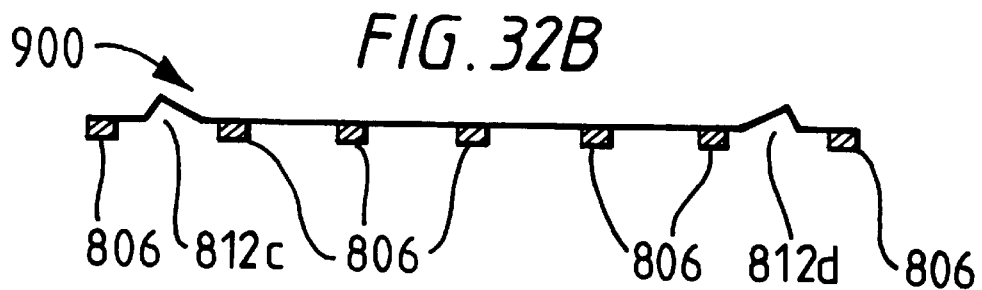
FIG. 32B is a cross-section view along line 32B—32B of FIG. 32A.

FIGS. 32A and 32B show a screen 900 like the screen 860 (like numerals indicate the same parts) but with an additional ramp 812c at the side of the screen opposite the side with the ramp 812d. Such a ramp 812c may be used with the screens 800 or 870. Flow paths may be used through the ramp 812c and/or through the ramp 812d. The ramps 812c and 812d are separate pieces that are bonded to, sintered to, and/or secured to the mesh 802 and/or to a strap 806, e.g. by any structure or securement apparatus or method disclosed herein (e.g., but not limited to as in FIGS. 1A, 3D, 9–17E). Any ramp or ramp portion herein may also be so connected to a mesh, screen, plate, and/or strap and/or secured to the mesh (screen, strap, and/or plate), e.g. by any structure or securement.

Referring now to FIG. 33, a vibratory separator system 910 according to the present invention has a screen 920 (with screen or screening cloth or mesh as desired) according to the present invention mounted on vibratable screen mounting apparatus or "basket" 912. The screen 920 may be any screen disclosed herein or have any combination of any feature or features of any screen or screen part disclosed herein; and any such screen may be used with any appropriate shaker or screening apparatus. The basket 912 is mounted on springs 914 (only two shown; two as shown are on the opposite side) which are supported from a frame 916. The basket 912 is vibrated by a motor 922 and interconnected vibrating apparatus 918 which is mounted on the basket 912 for vibrating the basket and the screens. Elevator apparatus 928 provides for raising and lowering of the basket end. The screen 920 may be any screen disclosed herein, including, but not limited, those of FIGS. 24D–32A. As shown the screen 920 is like the screen 800 of FIG. 24D. In certain aspects using a ramped screen as in FIG. 24A produces processed cuttings with an oil content of 3% or less and a water content of 20% or less when the screen is used in a multi-screen BRANDT LCM2D shaker beneath two standard DX 210 screens; and in a particular embodiment of such a screen, the oil content is less than 2% with a water content less than 15%. Any ramp disclosed herein may have a curved or undulating shape as viewed from above instead of the straight shape, e.g. as disclosed in FIG. 26. One or more ramps and/or divided ramps as described above may be used on any screen disclosed herein having one or more screens formed with an undulating shape.

FIGS. 34A–34E shows a screen 930 according to the present invention with wire mesh layers 931, 932, 933 (any or any two of which are optional) on a perforated corrugated plate 934 which is mounted over rods 936. Optionally, the layer(s) may be adhered (adhesively, by sintering, and/or bonding) to the plate. The plate 934 is optional. [FIGS. 38A–38D show a screen 930a without the plate 934 (like numerals indicate the same parts).] The rods may be made of metal (e.g. steel, stainless steel, zinc, zinc alloys, aluminum, aluminum alloys, copper, copper alloys) plastic, composite or fiberglass. Top bars 935 extend along two sides of the screen 930. Open ends of the screen 930 on two sides thereof are plugged with plugs 937 which are made of any suitable metal, plastic (e.g. urethane), wood, fiberglass, or composite material and are held in place by a friction fit and/or suitable adhesive including but not limited to epoxy or glue (e.g. but not limited to commercially available 3M Jet Melt or 3M TS230). Also, preferably, front and rear edges 942, 943 of the screen and the plate are encapsulated by the adhesive or glue (e.g. but not limited to urethane). A bottom bar 940 has recesses 941 for receiving the rods 936 and a plurality of bolt holes 948 for attaching the bottom bar 940 to a typical part or wear or seal strip of known shakers. Optionally, the rods may be adhered to the recesses. Alternatively, bolts through a shaker basket may extend into the side of the bottom bar 940. Seal material (e.g. rubber, plastic BUNA-N, etc.) 944 may be used on top of the bottom bar 940.

In one aspect the wire mesh layers 931 and 932 are either 1, 2, or 3 mesh and the layer 933 is of a coarser mesh, e.g. 12×12 down to 8×8 (or between 8×12 and 12×8). It is also within the scope of this invention for the layers 931, 932, 933 to be any mesh size. The plate 934 is, in certain aspects, made of metal, e.g. but not limited to 20 gauge carbon steel. In one aspect a screen 930 is made by bonding the layers 931 and 932 into a sheet with epoxy across substantially the entire surfaces of the layers; then the resulting sheet is corrugated and the layer 933 is bonded to the sheet.

Figure 34A:
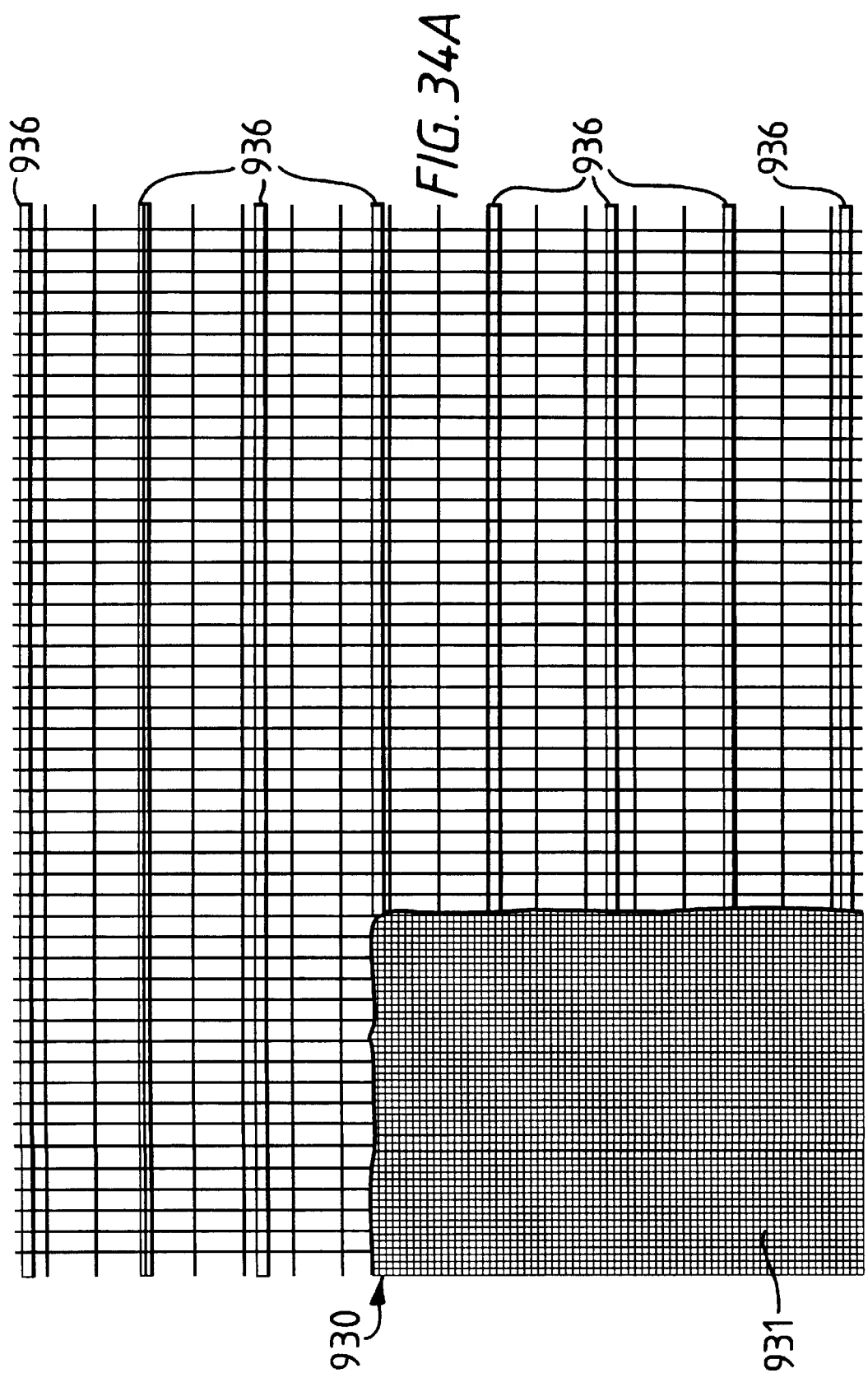
FIG. 34A is a top view, partially cut away, of a screen according to the present invention.
Figure 34F:
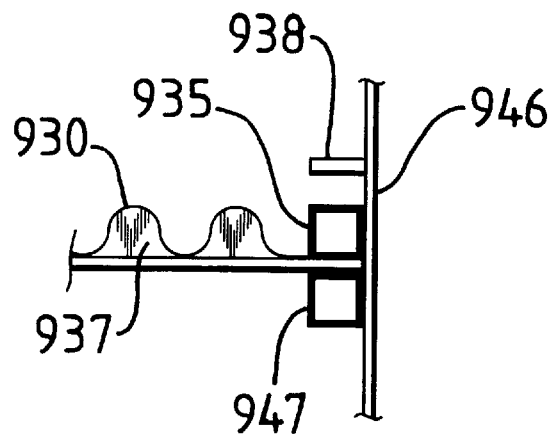
FIG. 34F is an end view of a screen, shown partially, on a mounting structure of a vibratory shaker apparatus.
Figure 34G:
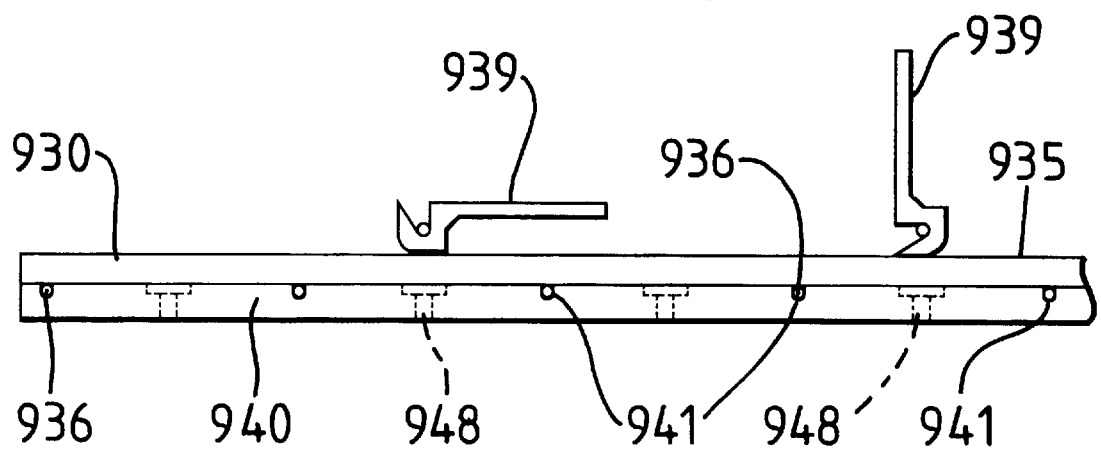
FIG. 34G is a side view of screen locking apparatus.
Figure 34H:
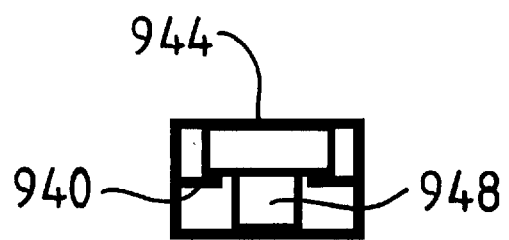
FIG. 34H is an end view of a bottom bar of the apparatus of FIG. 34G.
Figure 36B:
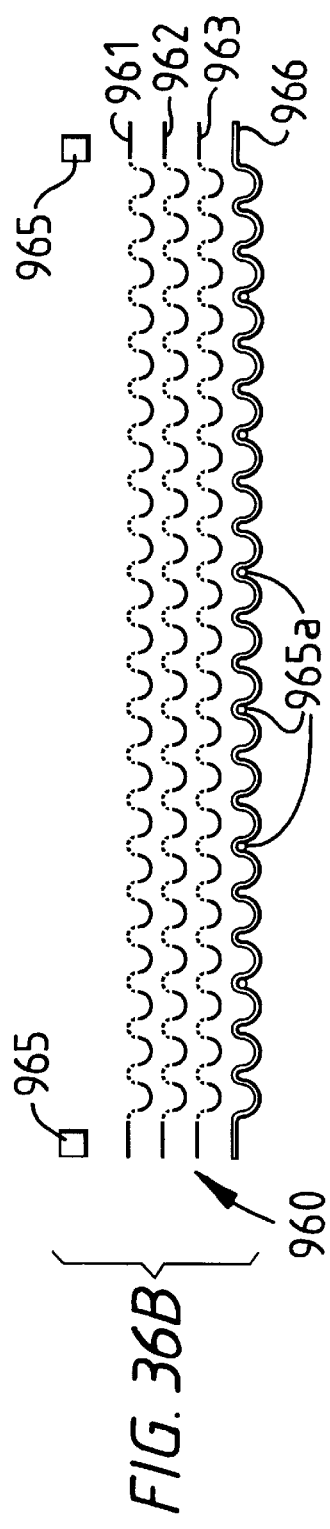
FIG. 36B is an end exploded view of the screen of FIG. 36A.
Figure 36C:
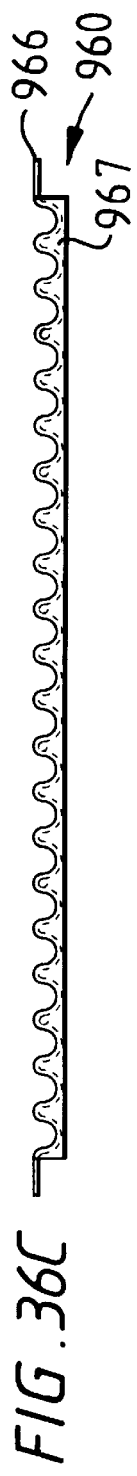
FIG. 36C is an end view of the screen of FIG. 36A.
Figure 36D:
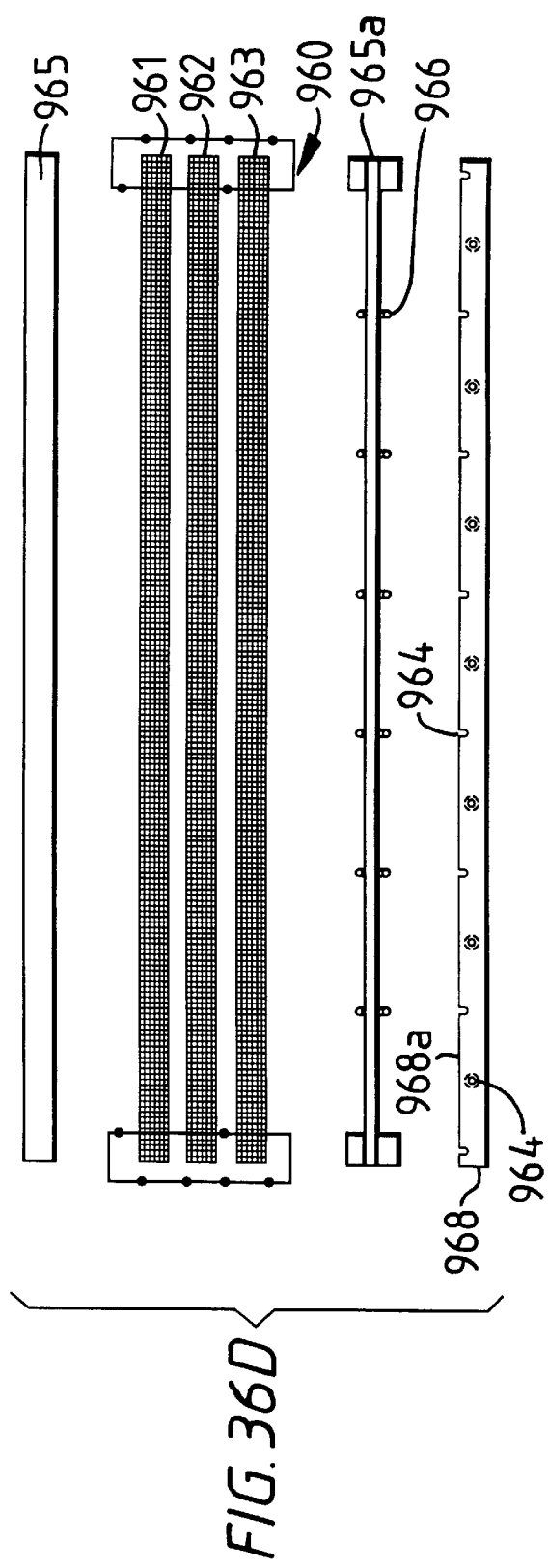
FIG. 36D is a side exploded view of the screen of FIG. 36A.

FIG. 34F shows a screen 930 in place on a ledge 947 of a shaker basket 946 below a locking bar 938. FIG. 34G shows free latch levers 939 one in a "down" locking position (the one to the right in FIG. 34G) locking a screen 930 to the shaker basket and one in an "up" position from which it is releasable to release the screen from the basket.

Figure 39A:
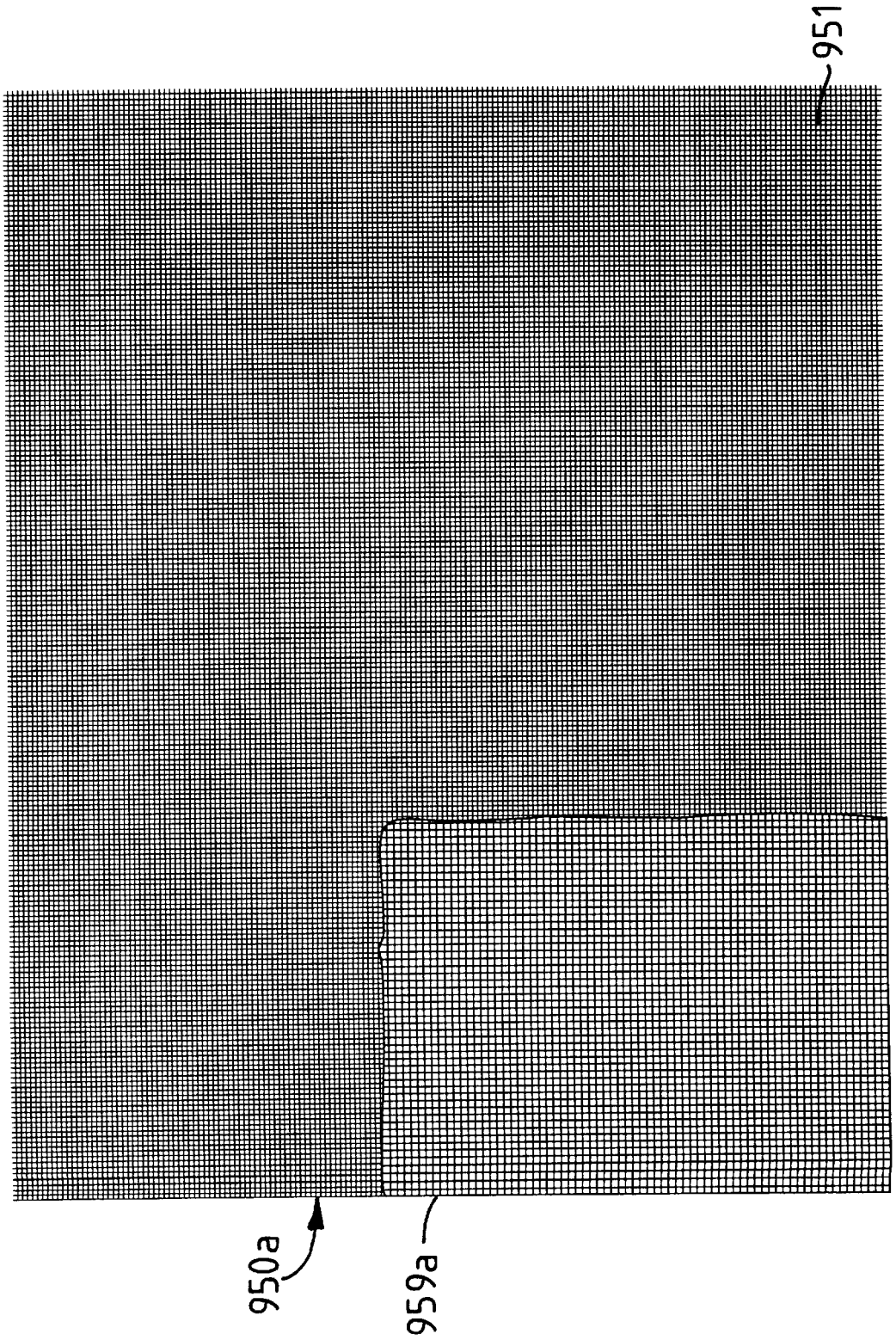
FIG. 39A is a top view, partially cut away, of a screen according to the present invention.
Figures 39B, 39C:
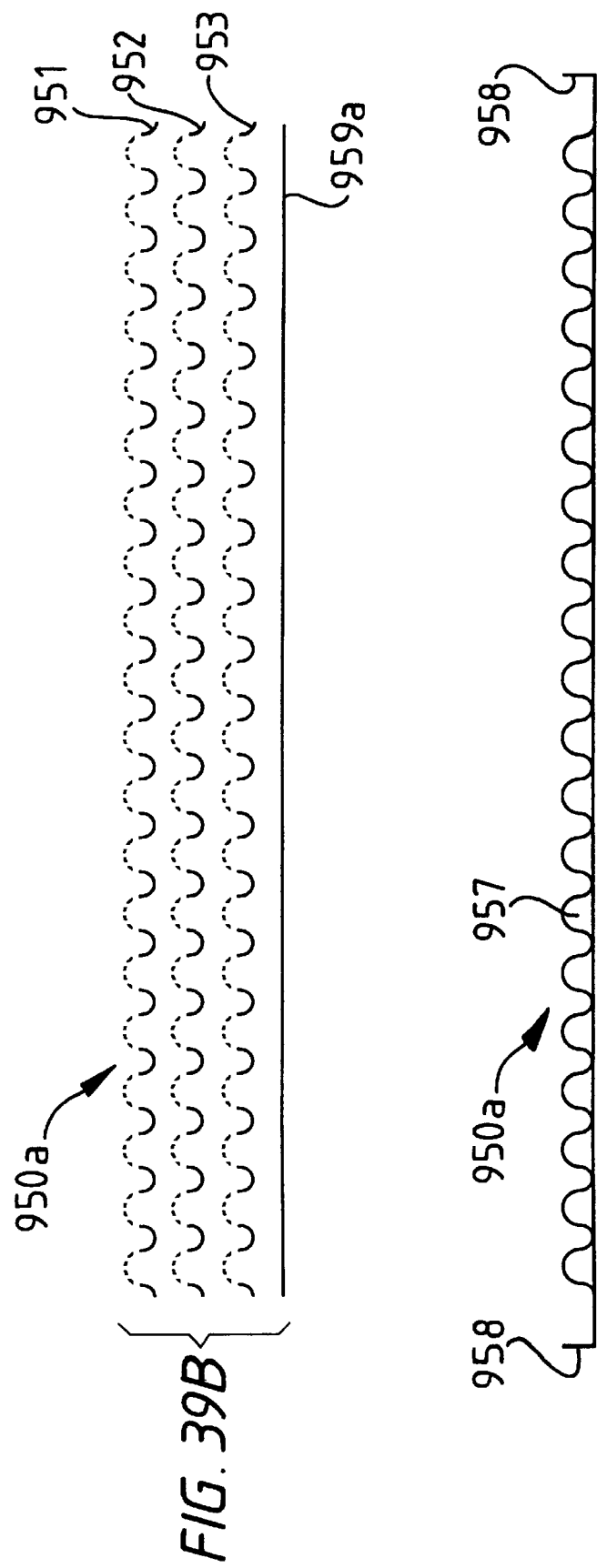
FIG. 39B is an end exploded view of the screen of FIG. 39A.
FIG. 39C is an end view of the screen of FIG. 39A.

FIGS. 35A–35D show a screen 950 according to the present invention with wire mesh layers 951, 952, 953 (any or any two of which may be deleted), a perforated corrugated plate 954 (which is optional), and a layer of wire mesh 959 which may be any desired mesh size but which is, in certain embodiments a coarser mesh than any of the meshes 951–953. In one particular aspect the wire mesh layer 959 is between 1×1 and 4×4 mesh (including between 1×4 and 4×1 mesh). In particular embodiments the layer 959 is 12×12, 8×8 or 4×4 mesh, and may include meshes between 8×12 to 12×8. The layers may have upturned ends 958 so that the screen 950 may be used with any standard clamp/hookstrip arrangement. These layers may be bonded together as a unit. The upturned ends may be formed before or after bonding. Preferably the front and rear edges of the screen 950 are encapsulated by adhesive or glue as in the screen 930 and plugs 957 plug screen ends as do the plugs 937. FIGS. 39A–39C show a screen 950a like the screen 950, but without the plate 954 and with a wire mesh lower layer 959a like the layer 959 (like numerals indicate the same parts). As with any screen herein, multiple wire meshes may be bonded and/or secured together prior to corrugating.

FIGS. 36A–36D show a screen 960 according to the present invention with wire mesh layers 961, 962, 963 (any or any two of which may be deleted), grid 969 of corrugated rods 966, a plurality of rods 965 underlying parts of the rods 966, and encapsulation material 967 (like that of the screen 930) which encapsulates front and rear edges of the wire meshes and rod grid. Alternatively, some of the internal bars may be included in the encapsulation material. Top bars 965 are like the top bars 935 of the screen 930 and the screen 960 may be used with the locking apparatus shown in FIG. 34G. A bottom bar 968 is like the bar 938 with side bolt holes 964 for bolting the bar 968 and a screen attached thereto to a shaker basket. The bar 968 has rod recesses 964 and a top seal layer 968a (like the material 944 of screen 930).

Figure 37A:
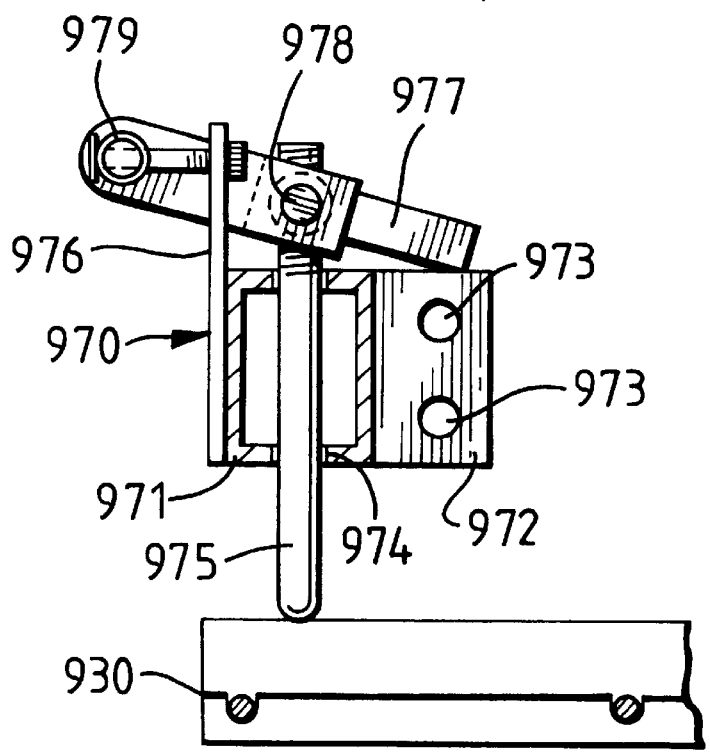
FIG. 37A is a side view of a screen locking apparatus according to the present invention.
Figure 37B:
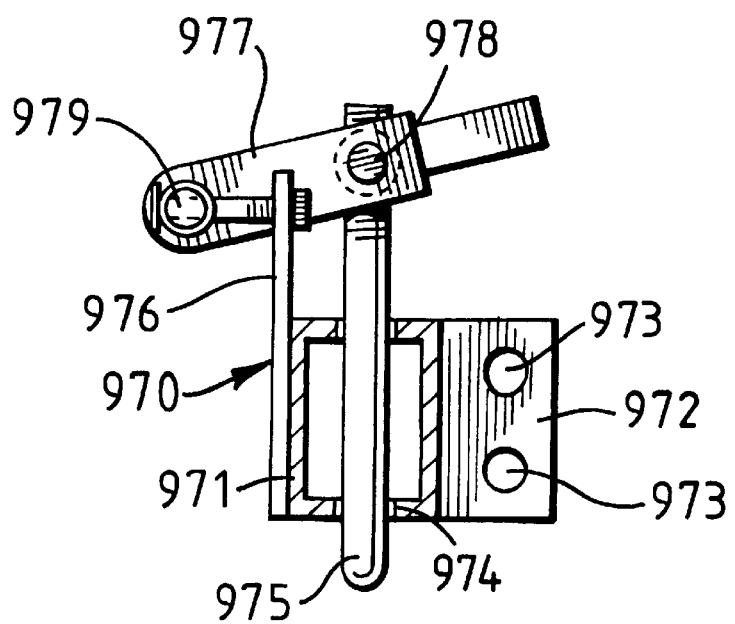
FIG. 37B shows the apparatus of FIG. 37A in an unlocked position.
Figure 37C:
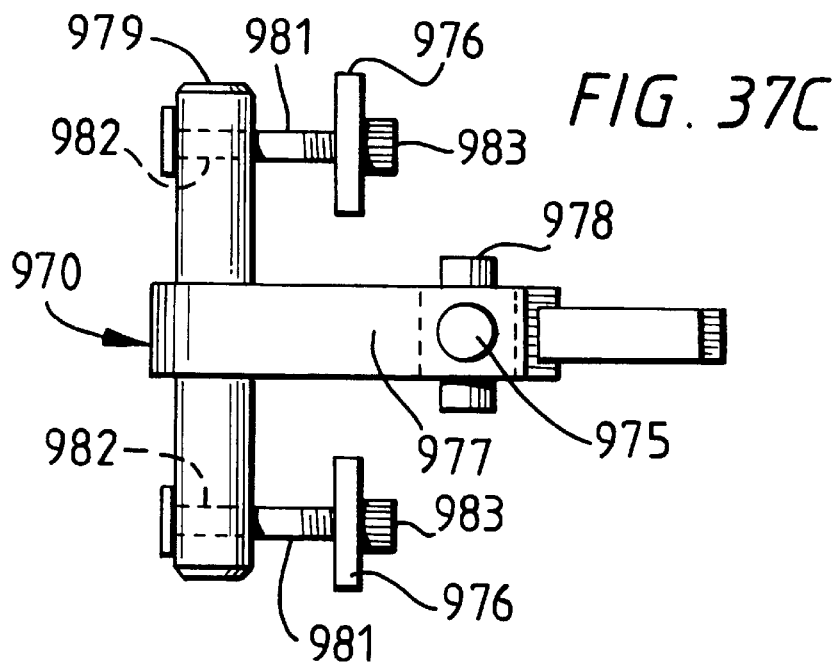
FIG. 37C is a top view of the apparatus of FIG. 37B.

FIG. 37A–37D illustrate another screen locking mechanism 970 for releasably holding a screen to a basket of a vibratory separator. E.g., a screen 930 with its adapter bar 940 is positioned on a basket ledge (not shown). As shown in FIG. 37A the mechanism 970 releasably holds the screen 930 in place. As shown in FIG. 37B, the mechanism 970 is in an "unlock" or release position permitting the screen 930 to be removed from the shaker basket.

A body 971 has a bracket 972 bolted to a shaker basket wall with bolts through holes 973 or appropriately secured to another part of a shaker. The body 971 has a hole 974 through which movably extends a rod 975. Leaf spring 976 are secured to the body 971. The rod 975 is pivotally mounted to a bar 977 with a pin 978. A distal end of the bar 977 is pivotally mounted around a pin or pivot member 979 mounted to the leaf springs. Bolts 981 secured to the pivot member 979 movably extend through holes 982 in leaf springs 976 and nuts 983 prevent the bolts from escaping from the holes 982 in the leaf springs. The member 979 fits through the bar 977. In both over and under center positions, the bar 977 is releasably locked in place. A "locked" position is shown in FIG. 37A. In a locked position, a lower end of the rod 975 bears against a top bar of the screen 930 to releasably hold the screen 930 in a shaker basket.

Figure 37D:
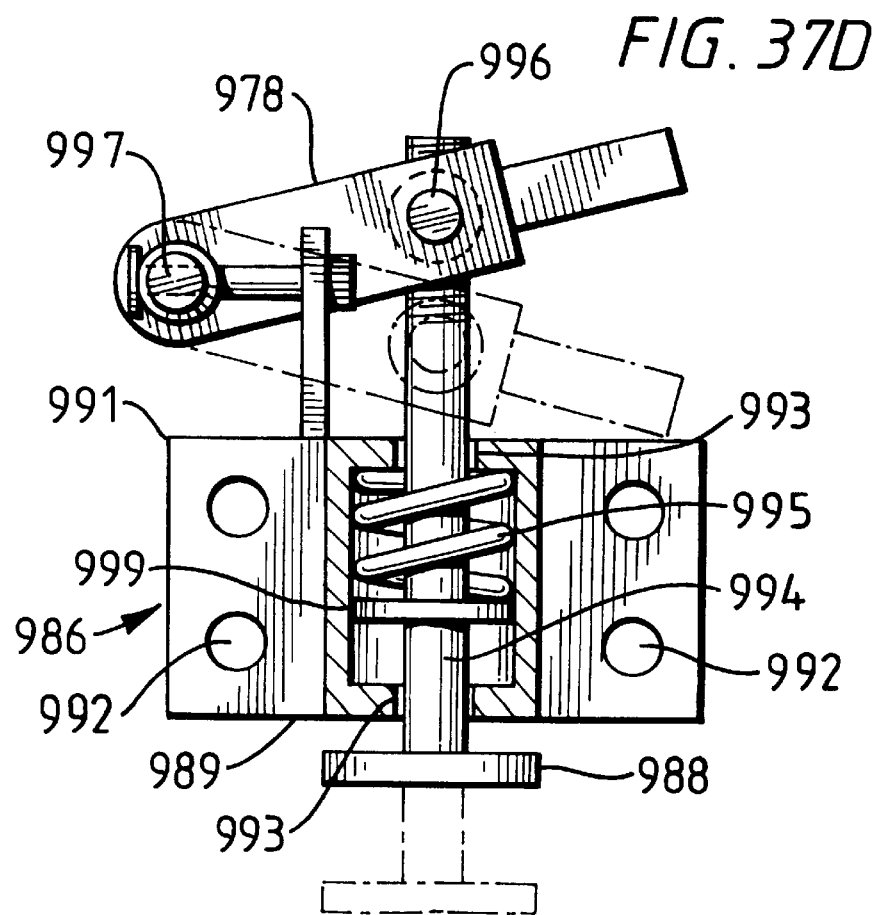
FIG. 37D is a side view of a screen locking apparatus according to the present invention.
Figure 38A:
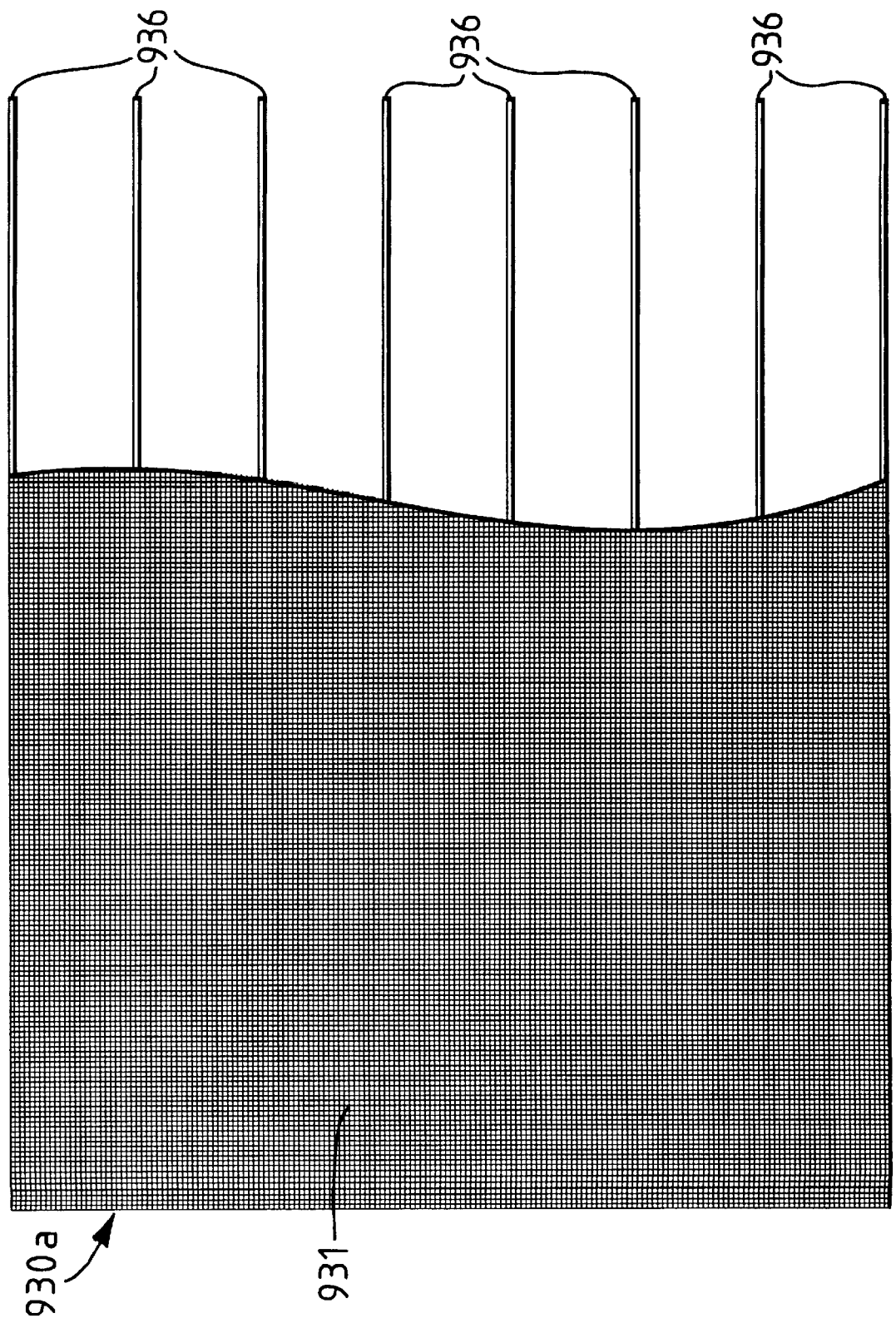
FIG. 38A is a top view, partially cut away, of a screen according to the present invention.

FIG. 37D shows another releasable locking mechanism 986 for releasably holding a screen to a shaker basket with a bar 987 and plunger 988 in an unlocked position, with a locked position indicated by the bar 987 and plunger 988 in dotted line. A body 989 includes a shaker basket mounting bracket 991 with bolt holes 992 and holes 993 through which movably extends a rod 994 of the plunger 988. The rod 994 is pivotably secured to the bar 987 with a pin 995 and a distal end of the bar 987 is pivotably mounted about a pivot member 997. A spring 995 urges the plunger downwardly and is biased to help maintain the apparatus in a releasable locked position. A spring stop 999 is on the rod 994.

Figure 41A:
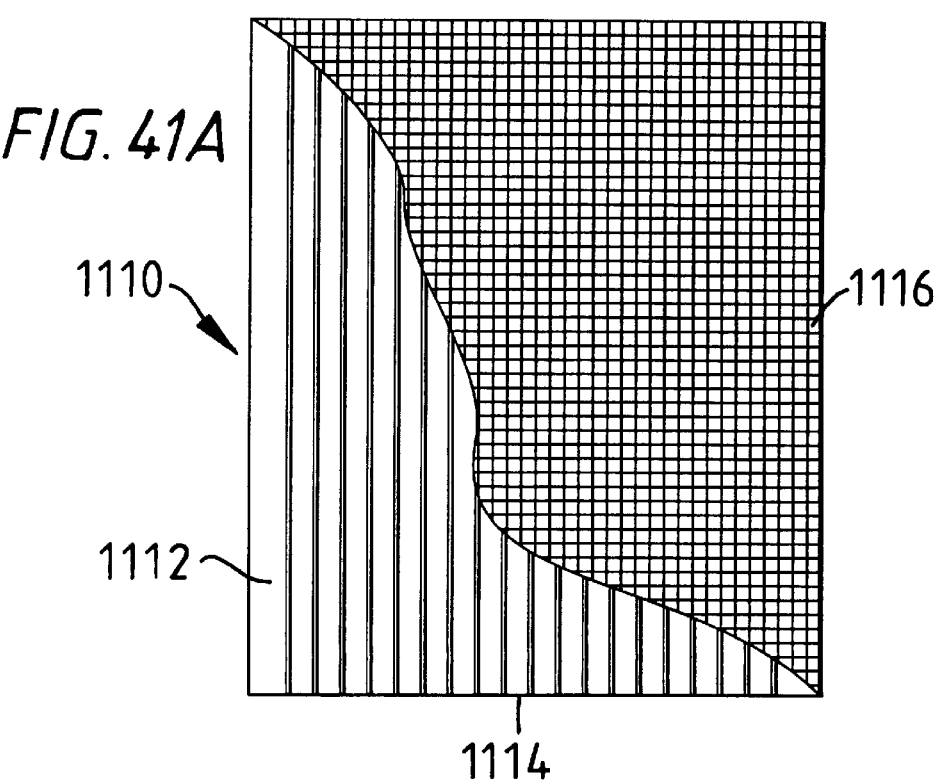
FIG. 41A is a top view partially cut-away of a screen according to the present invention.

FIG. 41A shows a screen 1110 according to the present invention with a lower base, support or frame 1112, three undulating mesh screens 1114 on and/or bonded to the frame 1112, and an upper mesh or screen 1116. The screens 1114 may themselves be bonded together, e.g. with epoxy, welding, and/or sintering. Rubber strips, plastic strips tape, cushion or cushions 1118 are positioned between the screen 1114 and the upper screen 1116. The strip(s) or cushion(s) 1118 are optional. As shown the strip(s), tape(s), or cushion (s) 1118 are secured to the screen 1114 (or to crests thereof), but it is within the scope of this invention to secure them (or some of them) to the screen 1116. To effect such securement any suitable glue, epoxy, weld, and/or sintering may be employed. The frame 1112 may be any suitable known base, frame or support.

Figure 41B:
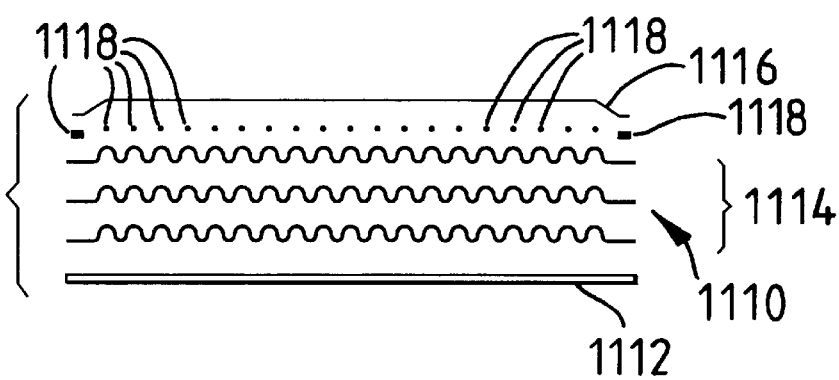
FIG. 41B is an exploded view of the screen of FIG. 41C.
Figure 41C:
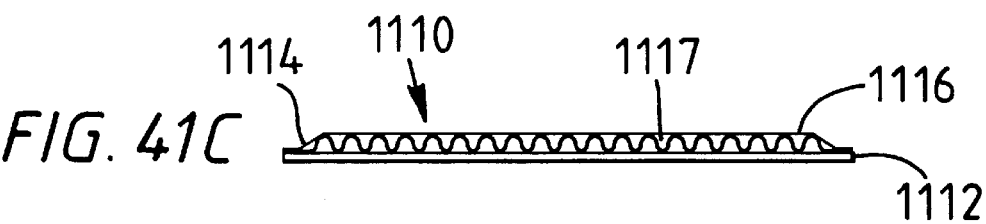
FIG. 41C is an end view of the screen of FIG. 41A.

It is within the scope of this invention for the screen 1114 to be any known screen, mesh, screens, meshes, or combination thereof, bonded together, unbonded, or bonded at only certain locations and with any known shape as viewed either from above or on end (as in FIG. 41A). It is within the scope of this invention for the upper screen 1116 to be any known screen, mesh, screens, meshes, or combination thereof, bonded together or unbonded, and with any known shape. As shown in FIG. 41B, the screen 1114 is three mesh screens bonded together with coarser mesh on the bottom, medium mesh in the middle, and finer mesh on top. The screen 1116 as shown may be a scalping screen of a mesh coarser than the finest mesh of the screen 1114 or of a multi-layer coarser mesh. In another aspect the screen 1114 is a single screen of closely woven mesh made of any suitable material, e.g. stainless steel and/or plastic material and the screen 1116 is a single screen of coarser mesh made of any suitable material (e.g. but not limited to stainless steel and/or plastic), with the screen 1114 on a metal or plastic frame or support. Alternatively or additionally, instead of the frame 1112 any known perforated plate, strip, or series of straps or strips may be used. A series of strips is not legally equivalent to a perforated plate.

In one aspect the strips 1118 are fused plastic strips aligned with peaks of the undulating fine mesh. Such strips may be made of rubber (e.g. nitrile) or plastic, e.g. polypropylene, to inhibit or prevent abrasion of the finer meshes. Such strips can be glued to the bottom of the screen 1116 and/or the screen 1114. Also the screen 1116 can be glued to the screen 1114.

Figure 41D:
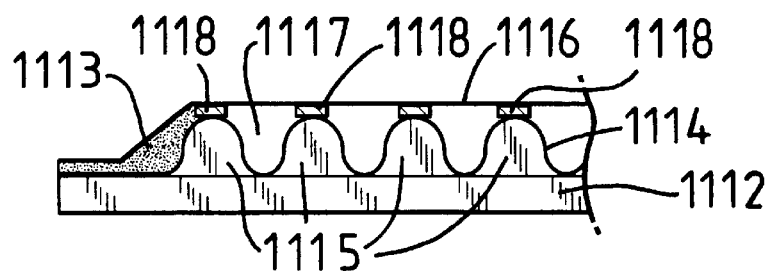
FIG. 41D is an enlargement of part of the screen of FIG. 41C.

End plugs 1113 and 1115 (FIG. 41D) sealingly close off open ends of the screen 1110. These end plugs may be made of rubber, metal, wood, plastic, Teflon™ material, or urethane. The plugs 1113 extend along two sides of the screen along crests of the screening material to completely seal the sides. The plugs are held in place by friction fit, glue, epoxy, welding and/or sintering. Alternatively, the ends may be covered with screen material.

Fluid flow on the screen 1110 from either end may be from top-to-bottom as viewed in FIG. 41A, bottom-to-top, or from one side to the other.

In one aspect the screen 1116 is a scalping screen of woven steel mesh. In another aspect, it is woven plastic or synthetic or composite mesh; and in another aspect it is a combination of woven steel and woven plastic or synthetic or composite mesh. The screen 1116 may be the same mesh or coarser mesh than that of the screen 1114 or of any layer thereof.

In this embodiment the areas 1117 between the screen 1116 and the screen 1114 are open. The screen 1116 protects the mesh of the screen 1114 from abrasive particles. When the screen 1116 is of a coarser mesh than that of the screen 1114, relatively larger particles retained on the screen 1116 are prevented from damaging and/or hindering flow through the screen 1114.

With the screen 1110 as shown liquid flow through the screen is increased by reducing the thickness of the solids bed of the finer mesh screens by the separation of larger particles with the screen 1116.

Use of the upper screen 1116 increases stability and rigidity of the screen 1110, improving solids conveyance across and off, rather than through the screen 1116 thereby facilitating liquid flow through the screen. Solids that do not flow through the screen 1116 do not encounter the lower finer mesh screens and do not reduce flow through the finer mesh screens. Use of the upper screen 1116 also reduces the initial impact load of flow onto the screen 1114 at a feed entrance to the screen, thereby extending screen life.

Figure 42:
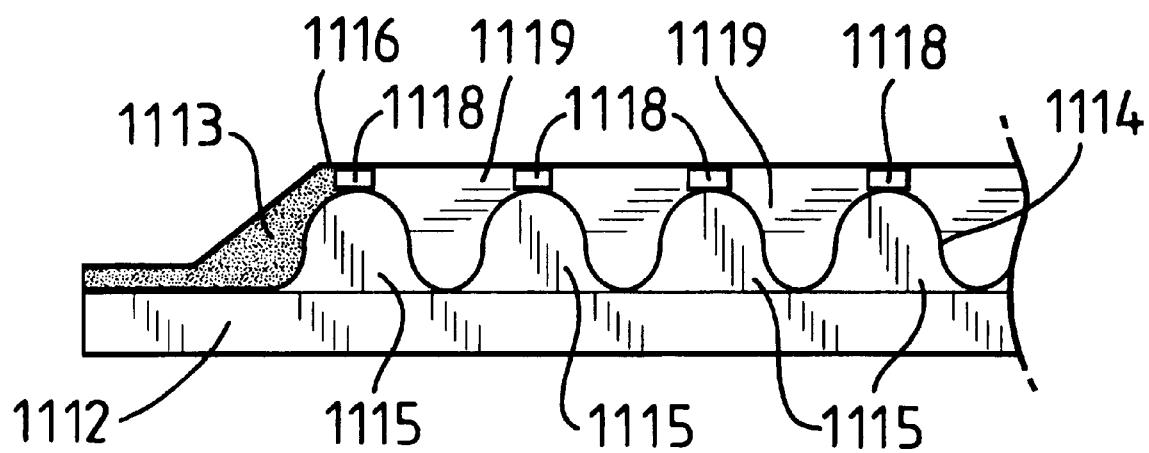
FIG. 42 is an end view in cross section of an alternative embodiment of the screen of FIG. 41A.

FIG. 42 shows an alternative embodiment of the screen 1110 with identical parts (indicated by the same numerals) but with additional end plugs 1119 between the upper screen 1116 and the screen 1114. Such "double plugging" may be used on either or both screen ends. A fluid and/or particles introduced to the screen 1110 first encounters the screen 1116 and then material flowing through the screen 1116 flows to the screen 1114. The plugs 1119 may be made of the materials described for the plugs 1113, 1115 and the plugs 1119 may be similarly installed and/or secured in place. Any of the plugs 1113, 1115, 1119 may be deleted in certain embodiments.

Figure 43:
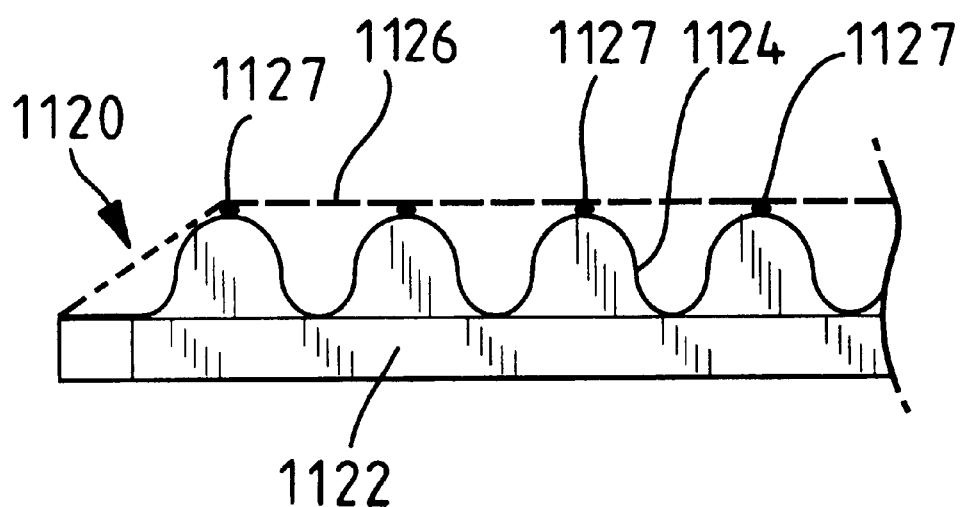
FIG. 43 is an end view of a screen according to the present invention.

FIG. 43 shows a screen 1120 like the screen 1110, but without the cushion members 1118. A scalping screen 1126 is secured at points 1127 to a screen 1124 on a base, frame, or support 1122. The screens 1124, 1126 may be in any of the forms discussed above for the screens 1114, 1116, respectively and the base, frame, or support 1122 may have any of the forms or alternatives discussed above for the base, frame, or support 1112. The screen 1126 may be secured to the screen 1124 in any suitable way, including but not limited to with glue, epoxy, fused plastic and/or by welding and/or sintering.

Figure 44C:
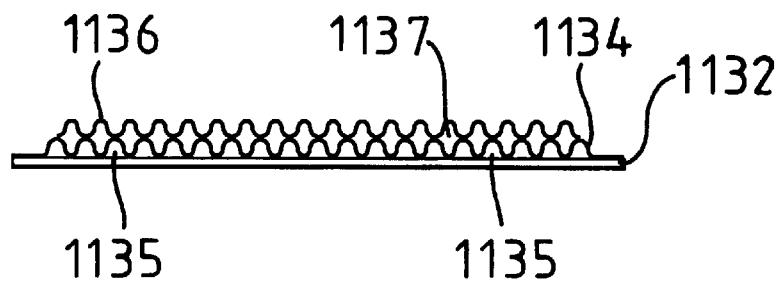

FIG. 44A shows a screen 130 with a base, frame, or support 1132 on which is a screen 1134 to which is secured a corrugated upper screen 1136 with optional items 1138 (like the tape, cushion, strips 1118, above). In one aspect the screens 1134 and 1136 are of different mesh; in one aspect with coarser mesh in the screen 1136; and in another aspect the two screens are of a similar mesh. The screens 1134, 1136 may be like the screens 1114, 1116 and 1124, 1126 respectively with respect to mesh size and materials. The base, frame, or support 1132 may be like the items 1112, 1122 and their alternatives described above. As shown the screen 1134 includes a fine mesh screen 1134a on top of a coarser mesh screen 1134b. A third screen (not shown) of medium mesh (e.g. as in FIG. 41B) may be used. If used, the upper screen 1136 may be secured to or simply rest on the items 1138 and the lower screen 1134 may be secured to or simply rest beneath the items 1138. It is to be understood that the items 1138 represent any of the strip(s), tape, etc. described above regarding the items 1118.

Figure 44D:
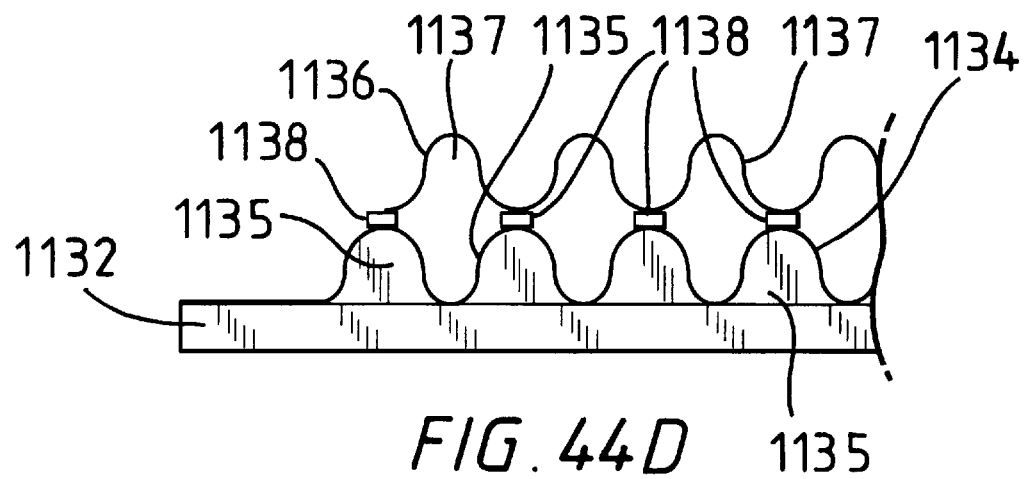
FIG. 44D is an enlargement of a portion of the screen shown in FIG. 44C.

End plugs 1135 (FIGS. 44C, 44D) sealingly shut off the end openings beneath corrugations of the screen 1134. Open areas 1137 extend between the screens 1134, 1136. Fluid flow on the screen 1130 may be top-to-bottom as viewed in FIG. 44A, bottom-to-top, or from one side to another.

Figure 44E:
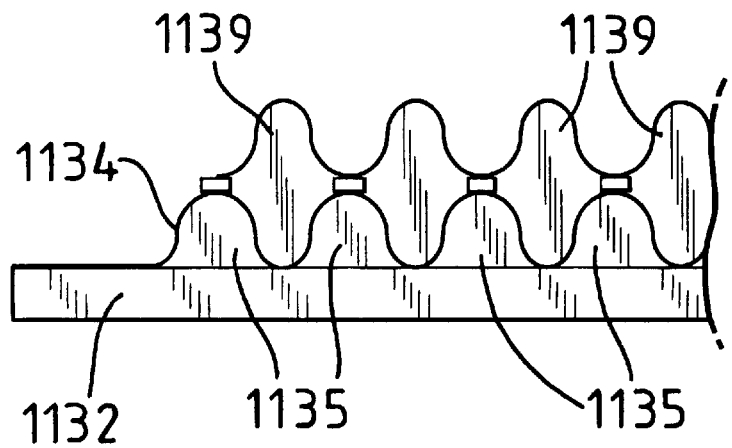
FIG. 44E is an end view that shows an alternative structure for the screen of FIG. 44A.

FIG. 44E shows an alternative embodiment of the screen 1130 with plugs 1139 sealingly closing off the ends of the areas 1137 to fluid flow. The plugs 1135, 1139 may be like, and installed as, any of the plugs described above.

The screens in FIGS. 41A–44E have the advantages of an upper screen as described for the screen 1110.

Figure 40A:
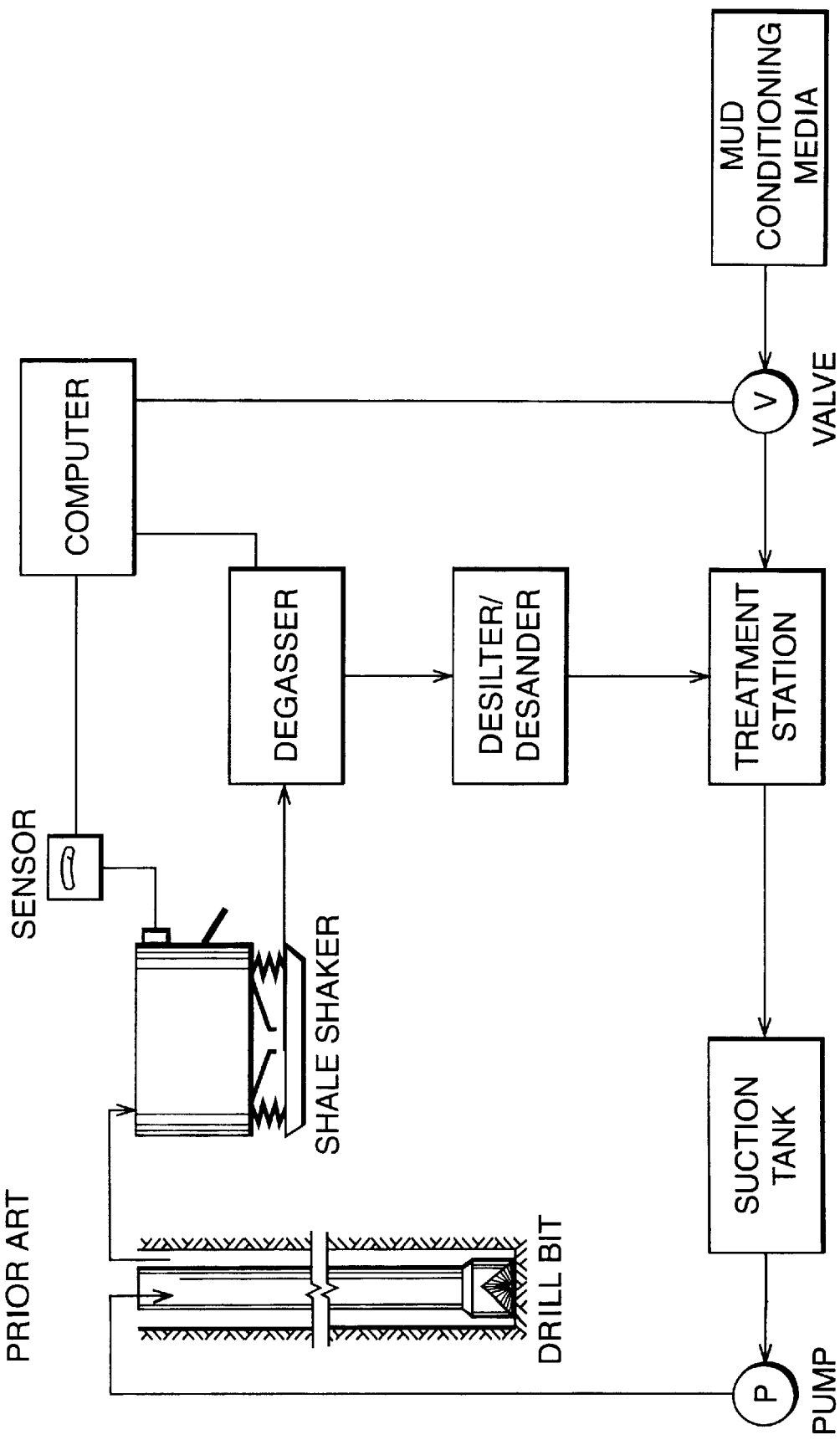
FIG. 40A is a schematic view of a prior art system.
Figure 40B:
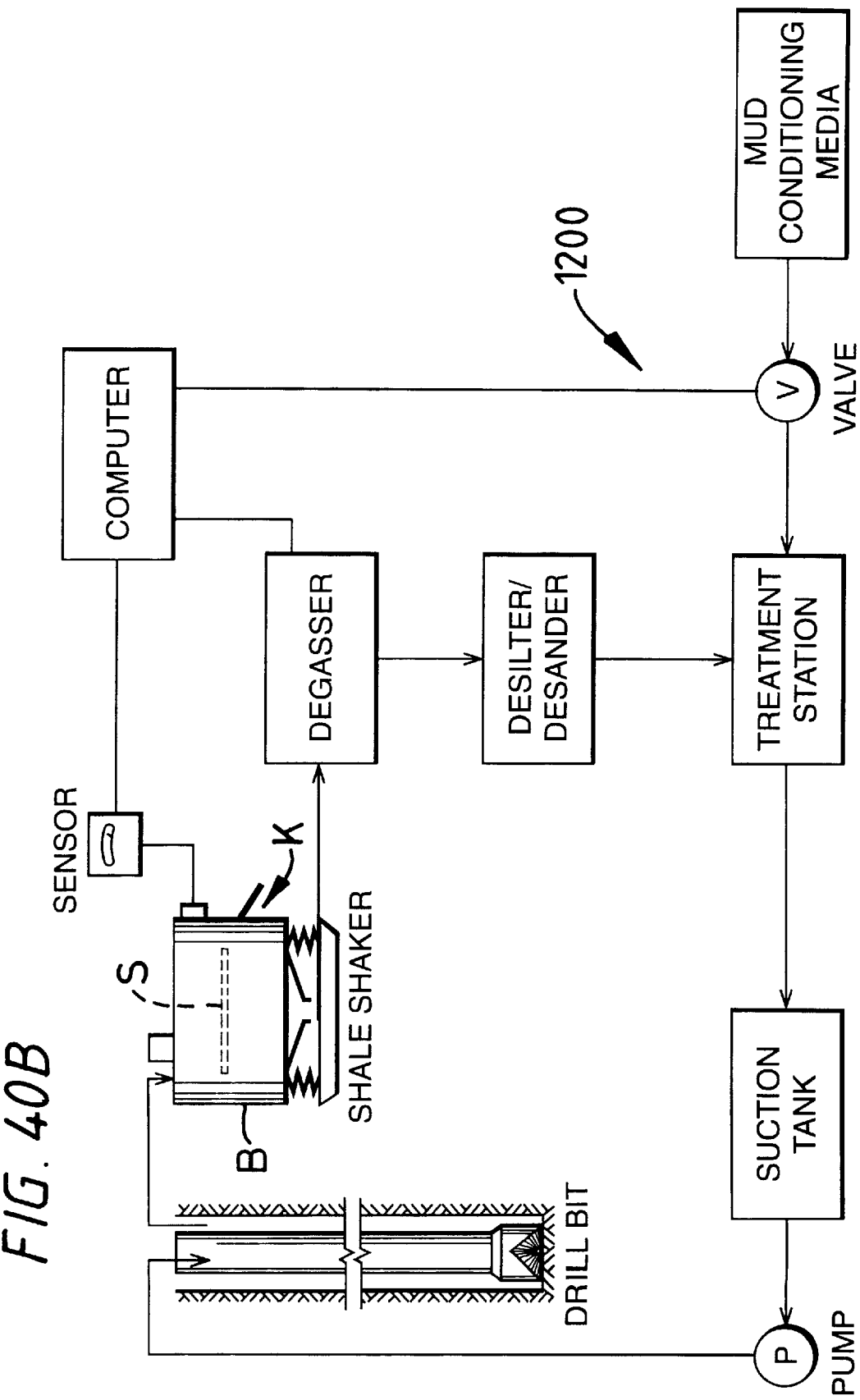
FIG. 40B is a schematic view of a system according to the present invention.

FIG. 40A discloses one example of a typical prior art shaker system (e.g. as shown in U.S. Pat. No. 5,190,645). FIG. 40B shows a system 1200 according to the present invention with parts like those of the system of FIG. 40A; but with a shale shaker K having a screen or screens S according to the present invention (any screen or screens disclosed herein). The screen(s) S are mounted in a typical shaker basket B and one or more vibrators V (any known suitable shaker vibrator) vibrate the basket B and hence the screen(s) S.

FIGS. 45A–45D show a screen panel 1150 according to the present invention with two opposed spaced-apart sides 1151 and 1152 spaced apart by two opposed sides 1153, 1154 and by a plurality of strips 1155. Each pair of spaced-apart strips, with portions of the sides 1151, 1152 define an open space 1156 through the panel 1150. At each side 1153, 1154, a strip 1155 and a portion of the side 1153 and side 1154 define an open space 1157 through the panel 1150.

In one aspect the panel 1150 (and/or strips and/or sides) is made of any suitable metal, e.g. but not limited to iron, steel, stainless steel, zinc, zinc alloys, aluminum, and aluminum alloys. In another aspect the panel is made of any suitable plastic, fiberglass, polytetrafluoroethylene cermet or composite. In one particular aspect the panel is made of 14 gauge cold rolled steel about 0.074 inches thick.

The openings in the panel may be made by any suitable method, including, but not limited to, drilling, sawing, high pressure water cutting, or laser cutting. In one particular aspect a panel of 14 gauge cold rolled steel about 0.074 inches thick is laser cut with a $CO_2$ laser producing very precise and well-defined open spaces and very precise and well-defined strips 1155, in one aspect with strips about 0.22 inches wide, about 1.3 inches apart from each other.

In other aspects, the strips 1155 may range in width between about 0.10 inches to about 3.00 inches and they may be spaced apart between about 0.2 inches to about 4.00 inches. In one particular screen with about 0.22 inch wide strips spaced about 1.3 inches apart, the panel is 14 gauge cold rolled steel about 46.75 inches long, about 35.86 inches wide, about 0.074 inches thick with end portions, as viewed from above, about 1.65 inches wide between the screen ends" outer edge and the edge of an open space. Alternatively, the strips 1155 may be vertically oriented as viewed in FIG. 45A and the panel 1150 may be corrugated.

Alternatively, the outer edges of the panel 1150 may be provided and the strips, as separate pieces, connected thereto in any manner, shape, or design as described above herein.

Figure 45E:
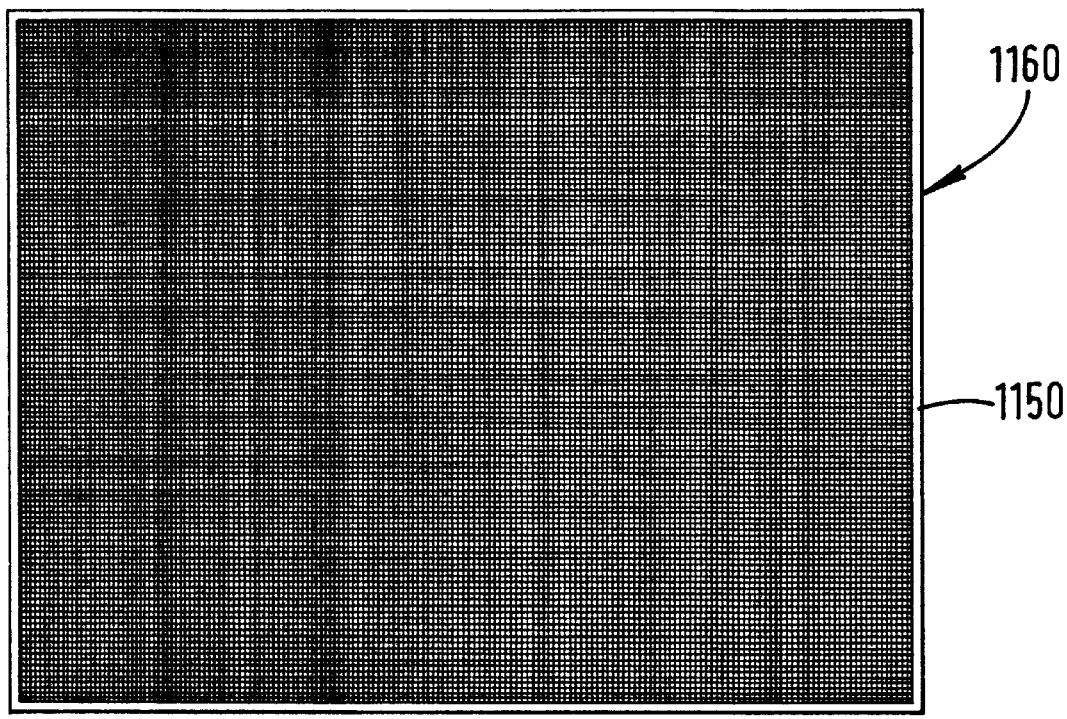
FIG. 45E is a top view.
Figure 45F:
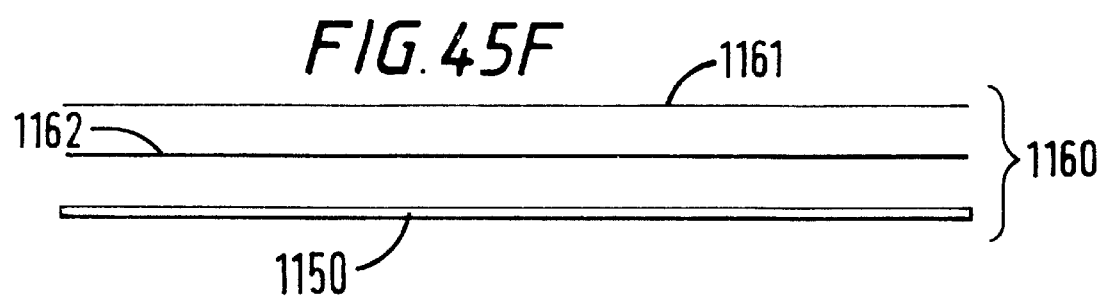
FIG. 45F is an exploded view of the screen assembly of FIG. 45E.

FIG. 45E shows a screen assembly 1160 according to the present invention with a panel 1150. A first mesh (in one aspect a fine mesh) 1161, e.g. 180 mesh, is bonded to a second mesh (in one aspect a backup mesh) 1162, e.g. 12 mesh which is then bonded to the panel 1150. In additional embodiments, the fine mesh may range between 14 mesh and 500 mesh and the backup mesh may range between 2 mesh and 30 mesh. Also, additional meshes may be used, including, but not limited to, any of the meshes and mesh combinations disclosed above herein, including the above-disclosed corrugated meshes in a flat configuration.

In other embodiments a backup mesh, middle mesh and a top mesh (in one aspect ranging between 100 mesh to 300 mesh) are used. In one aspect the backup mesh was 304 stainless steel 32 mesh with wire diameter of 0.045 inches, the middle mesh was 130 mesh 304 stainless steel with wire diameter of 0.0017 inches, and the top mesh was 304 stainless steel 180 mesh with a wire diameter of 0.0012 inches. A panel like the panel 1150 was coated with a powder coating (e.g. such as commercially available TK NOVO B Powder from Tuboscope Vetco) and bonded to the three meshes.

In other embodiments a backup mesh and a top mesh are used bonded together. In one aspect the backup mesh was 304 stainless steel 8 mesh with wire diameter of 0.025 inches, and the top mesh was 304 stainless steel 200 mesh with a wire diameter of 0.0021 inches. A panel like the panel 1150 was coated with a powder coating and bonded to the two meshes.

In other embodiments a backup mesh, middle mesh and a top mesh are used bonded together. In one aspect the backup mesh was 304 stainless steel calendared 8 mesh (with tops of ridges flattened) with wire diameter of 0.025 inches, and the top mesh was 304 stainless steel 180 mesh with a wire diameter of 0.0012 inches (or alternatively 200 mesh with a wire diameter of 0.0010 inches). A panel like the panel 1150 was coated with a powder coating and bonded to the three meshes.

FIGS. 45G–45P are top views of screen panels according to the present invention which have strips in various orientations and of various widths and spacing. Any panel, side, and/or strip depicted in these figures may be made of any material listed above for the panel 1150 and any strip in these figures may have the dimensions described for a strip 1155. Any screen, screens, mesh or meshes or mesh or screen combination described herein may be used with any panel in FIGS. 45G–45P and these panels may be flat, corrugated, or undulating as any such shape for a frame or panel disclosed herein and the screen(s) and/or mesh(es) thereon may have a shape corresponding to the panel shape.

Figure 45G:
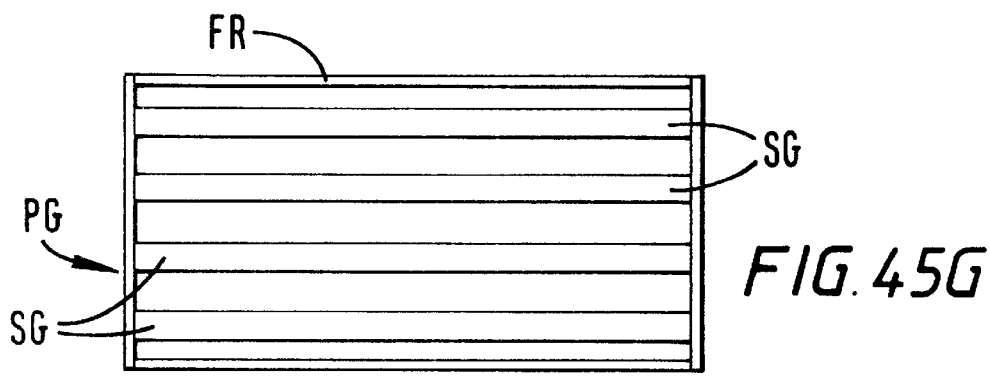
FIGS. 45G–45P are top views of panels according to the present invention.
Figure 45H:
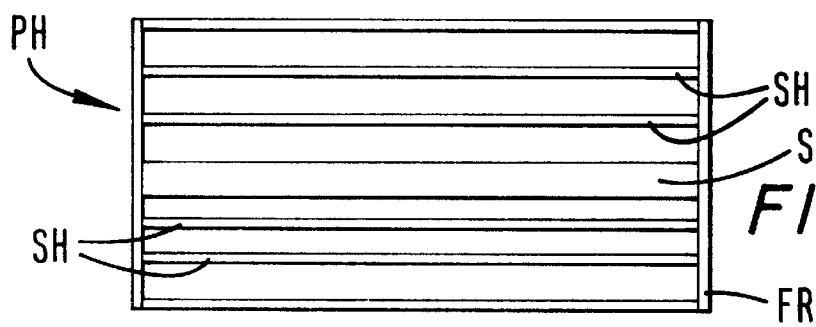
Figure 45I:
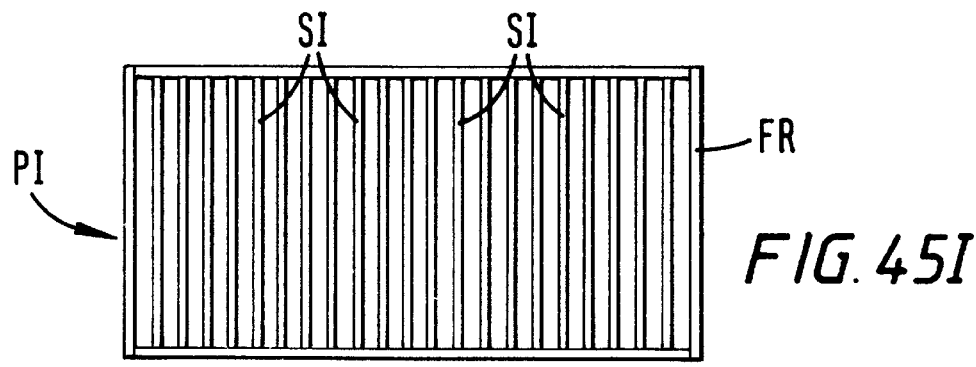
Figure 45J:
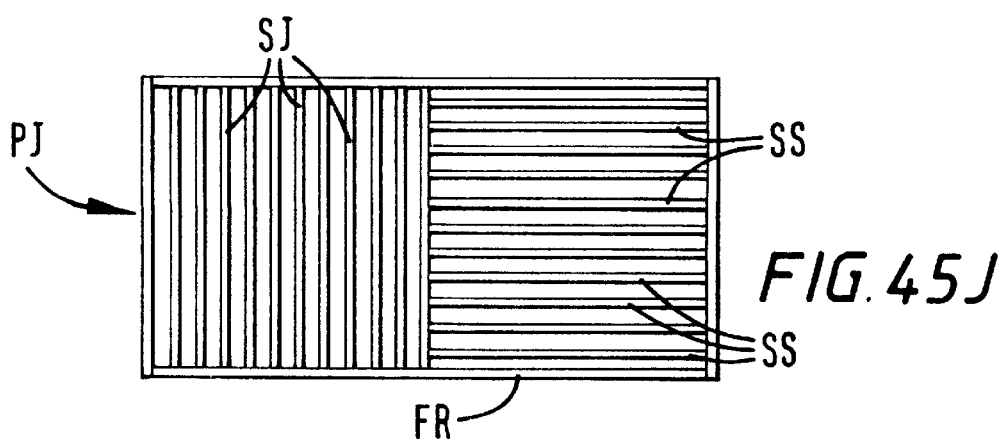

FIG. 45G shows a panel PG with strips SG. FIG. 45H shows a panel PH with strips SH and one wider strip SQ. FIG. 45I shows a panel PI with vertically extending (as viewed in the figure) strips SI. FIG. 45J shows a panel PJ with vertical strips SJ and horizontally extending (as viewed in the figure) strips SS.

Figure 45K:
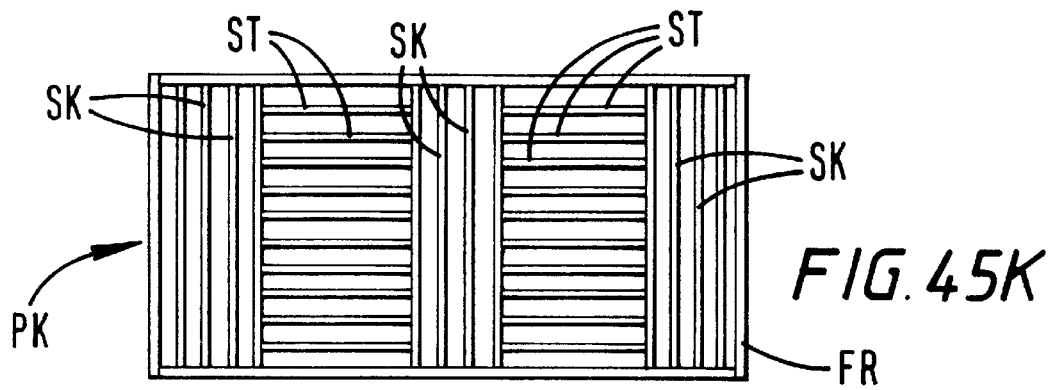
Figure 45L:
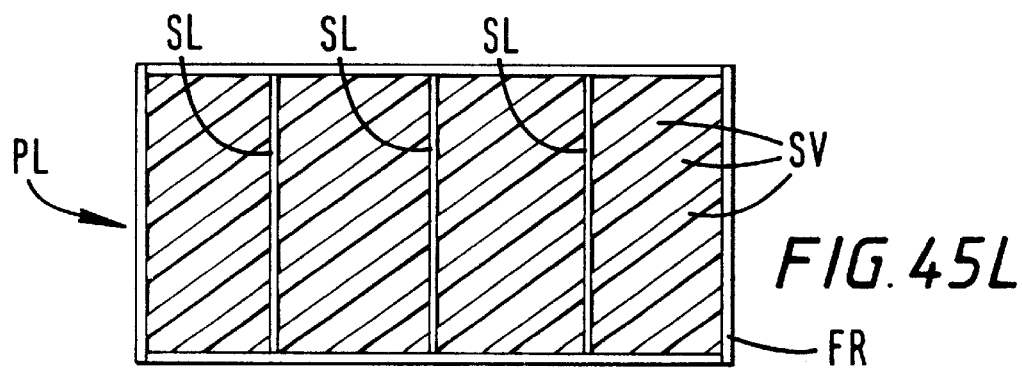
Figure 45M:
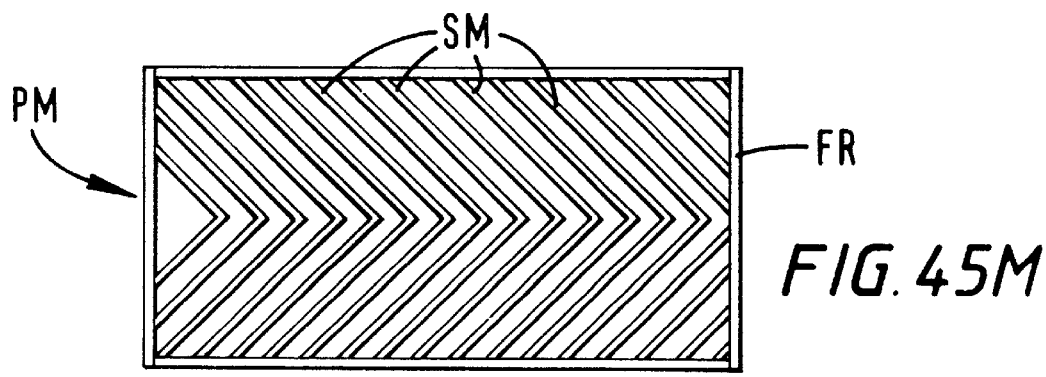

FIG. 45K shows a panel PK with vertical strips SK and horizontal strips ST. FIG. 45L shows a panel PL with vertical strips SL and slanted (as viewed in the figure) strips SV. FIG. 45M shows a panel PM with chevron shaped (as viewed in the figure) strips SM.

Figure 45N:
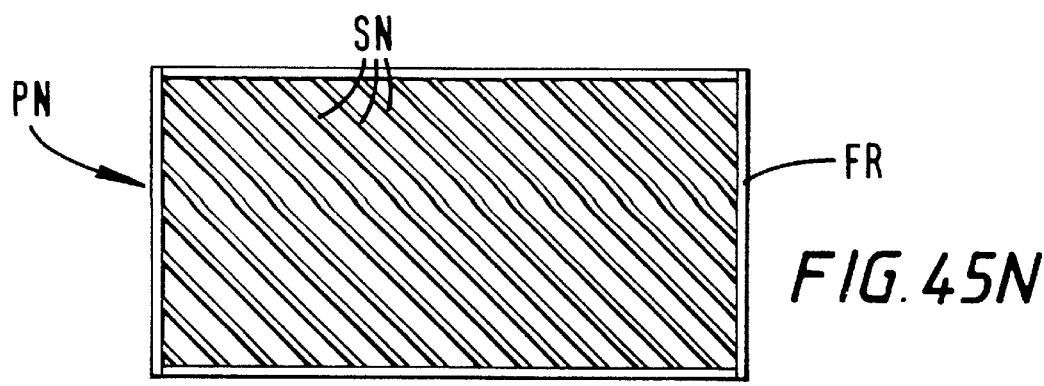
Figure 45O:
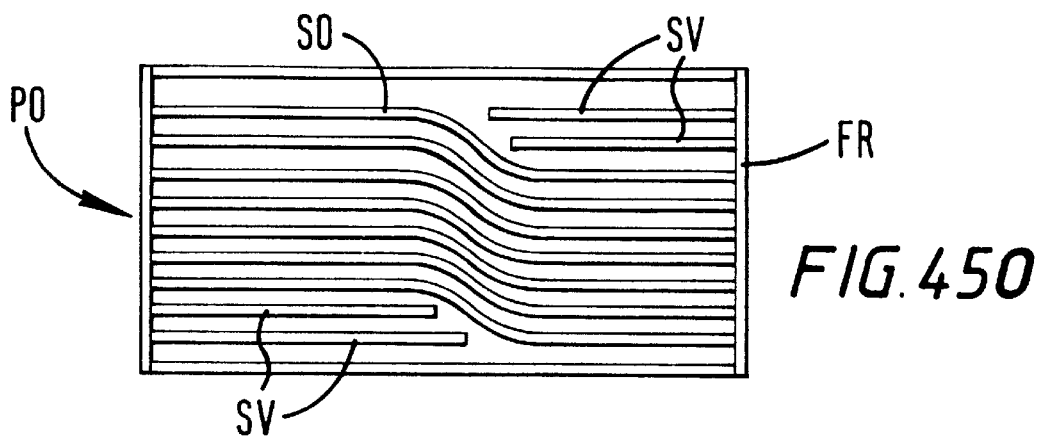

FIG. 45N shows a panel PN with slanted strips SN. FIG. 45O shows a panel PO with partially curved strips SO and optional horizontal strips SV.

Figure 45P:
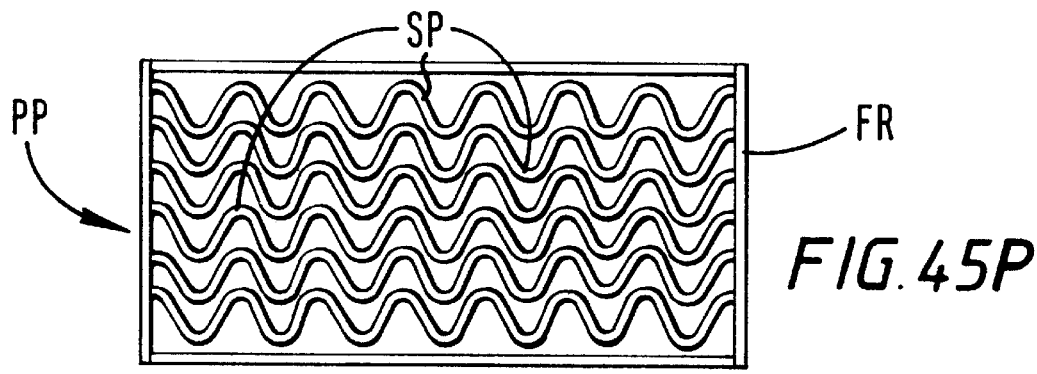

FIG. 45P shows a panel PP with undulating curved (as viewed from above) strips SP.

Each panel in FIGS. 45G–45P has an outer frame FR to which some or all of the strips or attached or formed with. As in FIGS. 45J, 45K, and 45L, some of the strips are connected to other strips. Spaces between strips may be formed by cutting the strips, e.g. with a laser or other suitable tool or instrument.

Figure 46:
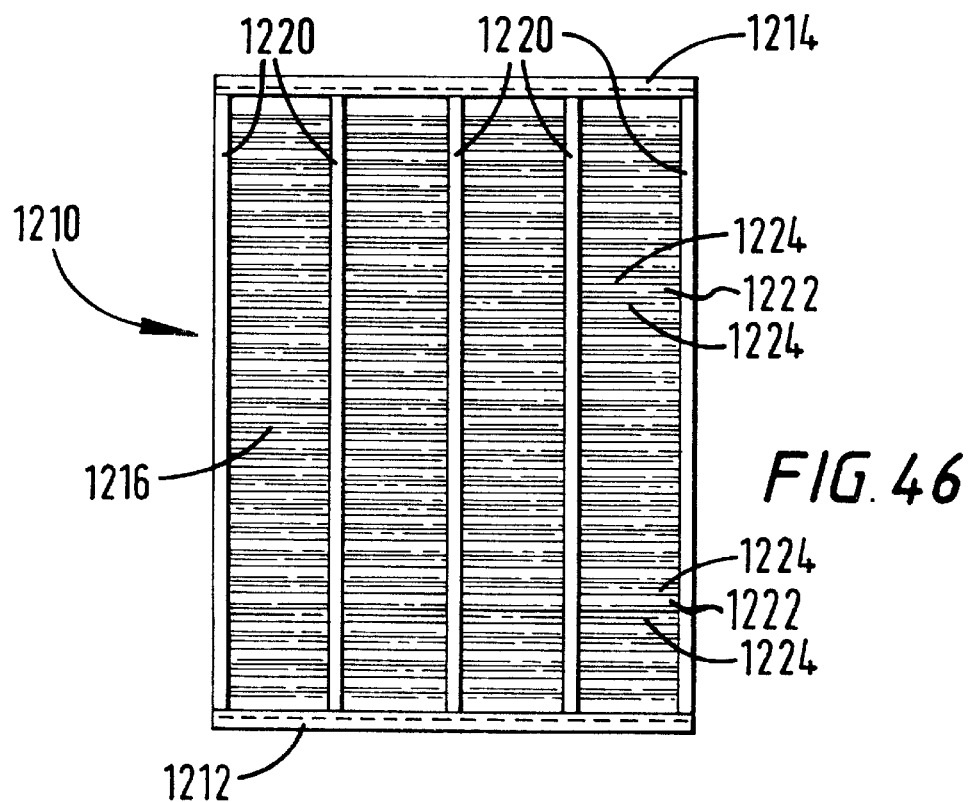
FIG. 46 is a bottom view of a screen according to the present invention.

FIG. 46 shows a screen 1210 according to the present invention with a frame with two sides 1212 and 1214 with strips 1220 extending between the two sides 1212 and 1214; and screen material 1216 on the strips 1220 and connected to the sides 1212 and 1214. Screen material 1216 (and any other screen or screening material disclosed herein) represents any known mesh, screen, or screens, used in any combination, bonded together or unbonded. The screen material 1216 as shown is "three-dimensional," i.e., not generally flat and has undulating portions with hills 1222 (as seen in FIGS. 1A–1C) and valleys 1224. (It is within the scope of this invention for the screening material 1216 and any other screening material herein to be generally flat.)

Figure 47:
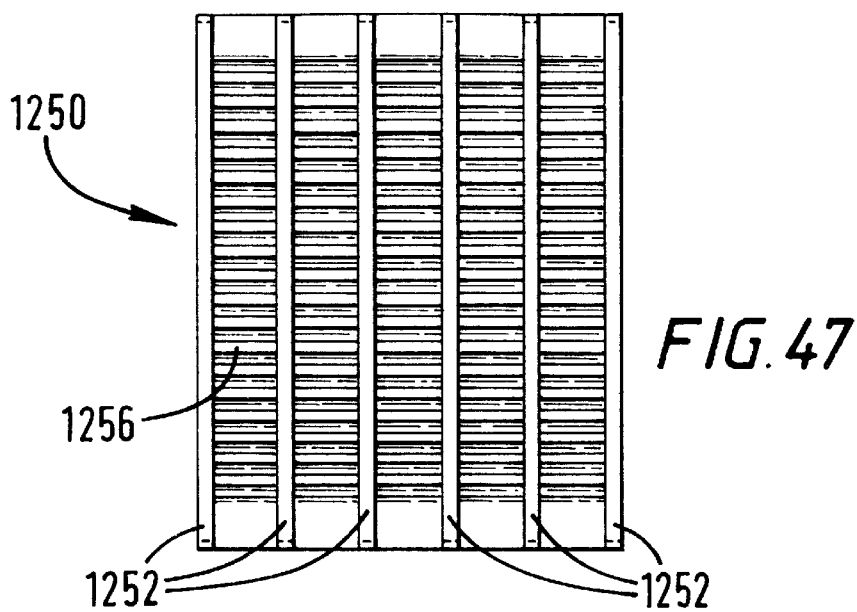
FIG. 47 is a bottom view of a screen according to the present invention.

FIG. 47 shows a screen 1250 like the screen in FIG. 46, but without any frame sides. The screen 1250 has a plurality of bottom support strips 1252, each of which has two upper in-turned edges formed into a mounting hook (not shown). Undulating screening material 1256 is bonded to the strips 1252. Flat material may, alternatively, be used.

Figure 48:
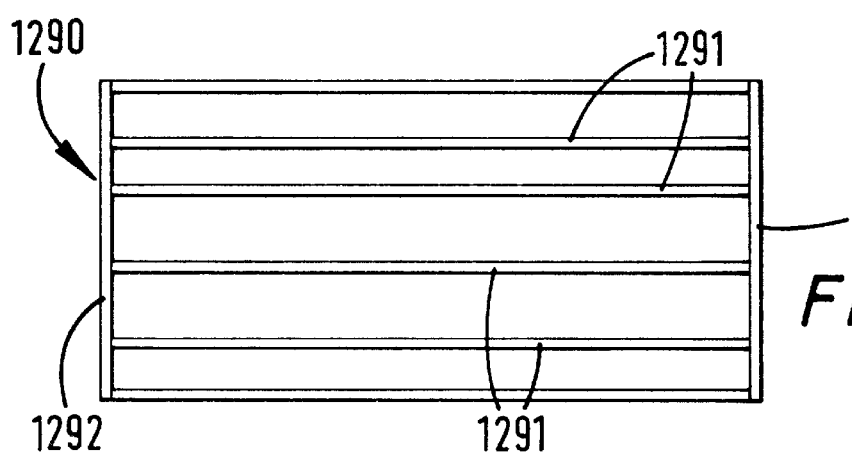
FIG. 48 is a bottom view of part of a screen with cross strips according to the present invention.
Figure 49:
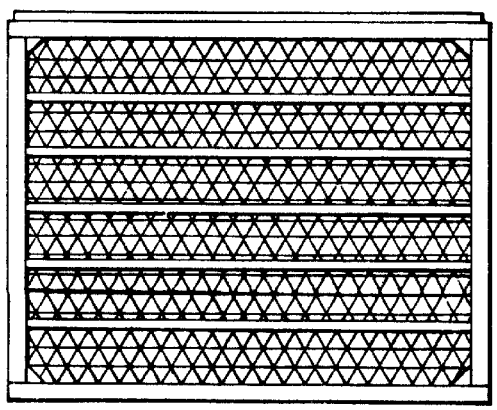
FIG. 49 is a bottom view of the screen of FIG. 26.
Figure 50:
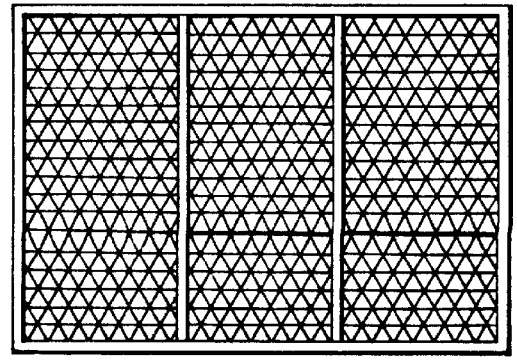
FIG. 50 is a bottom view of a screen according to the present invention.

FIG. 48 shows a bottom strip support assembly 1290 for a screen according to the present invention. A plurality of strips 1291 extend between and are secured to frame sides 1292 and 1293.

In certain embodiments of a screen as in FIG. 48, the strips 1291 are between one-thirty second and one-eighth inches thick and about forty-five and a half inches long; the frame sides 1292, 1293 are about thirty six inches long; the strips 1291 are made from galvanized steel; and the frame sides 1292, 1293 are made from 20 gauge galvanized steel.

FIG. 51A shows a screen frame 1500 according to the present invention with a plurality of spaced-apart strips 1502 (made of any suitable metal or metal-like material) secured to and between spaced-apart sides 1504. Each end 1506 of each strip 1502 is received and held in a recess 1524 in a side 1504. The recess 1524 corresponds in shape to the shape of the end 1506 and a shoulder 1526 of each strip 1502 abuts a side 1504. The end 1506 may be inserted into the recess 1524 from the side (to the left in FIG. 51B) or from above or below. The top and bottom strips 1502 (as viewed in FIG. 51A) each has two humps or ridges 1553 (see FIG. 51C) which are located, sized, and configured to be received in corresponding corrugations of a corrugated plate and/or corrugated screen assembly. It is within the scope of this invention for each strip to have one, two, or a plurality of multiple humps or ridges. In one aspect there is one hump or ridge for each corrugation on a superimposed plate and/or screen assembly. It is within the scope of this invention to delete the humps and/or ridges so that the strips 502 are flat for use with flat mesh and/or screen(s).

FIG. 52 (prior art) shows a strip interlocking structure which includes a bulb 1505 at each end of a strip 1503 (disposed in a frame as are the strips 1502). The bulb 1505 is in a recess 1525 in a side 1501 (like the sides 1504). The bulb 1505 is lifted out from the recess 1525 for removal or inserted into it from below or above for installation. A frame with such strips is prior art.

FIG. 53 (prior art) shows a strip interlocking structure which includes a bulb 1509 at each end of a strip 1508 (disposed in a frame as are the strips 1502). The bulb 1509 is in a recess 1530 in a side 1507 (like the sides 1504). The bulb 1509 is lifted out from the recess 1530 for removal or inserted into it from below or above for installation. An enlarged end 1531 resides removably in a recess 1532 and prevents the strip 1508 from inadvertently moving out from the recess 1530 to the side (to the left in FIG. 53). A frame with such strips is prior art.

Pending U.S. application Ser. No. 08/786,515 describes the items of FIGS. 46–53 in detail and these descriptions are incorporated herein fully for all purposes.

The present invention, therefore, provides a screen assembly for a vibratory separator, the screen assembly having at least one wire mesh screen formed with undulating mesh material having a series of ridges spaced apart by a series of valleys, an optional corrugated perforated plate with an undulating shape corresponding to the undulating mesh material of the at least one wire mesh screen, the at least one wire mesh screen on the corrugated perforated plate when it is used, and either a series of spaced apart rods, the corrugated perforated plate mounted on the rods of the series of spaced apart rods or lower coarser mesh screen. Such a screen assembly may have one, some, any combination of, or all the following: wherein the at least one wire mesh screen is adhered to the corrugated perforated plate; wherein the at least one wire mesh screen is a plurality of two or more wire mesh screens; wherein the plurality of wire mesh screens are adhered together; wherein the at least one wire mesh screen includes at least one upper wire mesh screen having a first mesh size and a lower wire mesh screen having a mesh size coarser than the first screen mesh size; a pair of spaced apart top bars, one top bar on each side of the screen assembly at an outer edge of a side thereof; an adapter bar on which the corrugated perforated plate is mounted, the adapter bar having recesses for receiving the series of spaced-apart rods; a layer of seal material on top of the adapter bar for sealing mounting thereon of the corrugated perforated plate; the undulating shape of the at least one wire mesh screen and of the corrugated perforated plate forming a series of end openings on two sides of the screen assembly, and plug apparatus in said series of end openings; and/or wherein said two sides with end openings are encapsulated in encapsulating material.

The present invention discloses, in certain aspects, a screen assembly for a vibratory separator, the screen assembly having at least one wire mesh screen formed with undulating mesh material having a series of ridges spaced apart by a series of valleys, an optional corrugated perforated plate with an undulating shape corresponding to the undulating mesh material of the at least one wire mesh screen, the at least one wire mesh screen on the corrugated perforated plate, a series of spaced apart rods, the corrugated perforated plate mounted on the rods of the series of spaced apart rods, and the rods having an undulating shape corresponding to the undulating shape of the undulating mesh material of the at least one wire mesh screen. Such a screen assembly may have any of the features of the preceding paragraph in any combination.

The present invention, in certain embodiments, discloses a support strip for supporting part of a screen used in a vibratory shaker, the support strip with a support body having spaced-apart ends spaced-apart sides, and a top surface, and at least one upturned finger projecting above the top surface of the support body, the at least one upturned finger configured and sized for contacting and supporting at least a part of a raised portion of the screen; such a support strip wherein the at least one upturned finger is a plurality of spaced-apart upturned fingers; and/or wherein the at least one upturned finger has a curved top with a shape corresponding to a shape of a raised portion of the screen, and/or wherein the at least one upturned finger extends up from cuts in the support body and the at least one upturned finger is integral with the support body; and such a support strip with a support (totally internal or with part projecting from beneath the finger) beneath the at least one upturned finger, and such a support strip wherein the internal support is secured to the at least one upturned finger, and such a support strip wherein the internal support has a series of holes therethrough for fluid flow therethrough, and/or wherein the at least one upturned finger defines an interior space, the internal support is disposed within said interior space, and the internal support occupies less than all said interior space, and/or wherein the interior space has a top area, the internal support has a top surface, the top surface of the internal support is spaced apart from the at least one raised part, and the top surface of the internal support defining a lower limit of the top area, and/or wherein said support body has a body width and said internal support has a support width which is less than said body width, and/or wherein said support body has a series of holes therethrough for fluid flow therethrough; and/or any such support in combination with the screen and/or in combination with a vibratory shaker on which the screen is releasably mounted.

The present invention, in certain embodiments discloses a support strip for supporting part of a screen used in a vibratory shaker, the support strip having a support body having spaced-apart ends spaced-apart sides, and a top surface, and at least one raised portion projecting above the top surface of the support body, the at least one raised portion configured and sized for contacting and supporting at least a part of a raised portion of the screen of a support and/or with a support beneath the raised portion(s), including any embodiment described in the preceding paragraph.

The present invention, in certain embodiments, discloses a screen apparatus for a vibratory shaker device, the screen apparatus with screening material with an undulating shape with a series of raised portions, and at least one support strip beneath said screening material and in contact therewith, said at least one support strip between one half inch to three inches in width and between one thirty-second of an inch and one-eighth of an inch in thickness, said at least one support strip having at least one raised part thereof with a shape corresponding to a shape of a raised portion of the screening material, said at least one raised part positioned beneath and supporting said raised portion, and the at least one raised part thereof having a support thereunder.

The present invention discloses, in certain embodiments, a separatory apparatus with a vibratory shaker device, a screen apparatus mounted on the vibratory shaker device and with screening material with an undulating shape with a series of raised portions, and at least one support strip beneath said screening material and in contact therewith, said at least one support strip between one half inch to three inches in width and between one thirty-second of an inch and one-eighth of an inch in thickness, said at least one support strip having at least one raised part thereof with a shape corresponding to a shape of a raised portion of the screening material, said at least one part positioned beneath and supporting said raised portion, and the at least one raised part thereof having a support thereunder.

The present invention discloses, in certain embodiments, a screen assembly for screening material in a vibratory screening machine, said assembly with a frame, a plurality of apertures in said frame, spaced frame members on opposite sides of said plurality of apertures, a screen formed in an undulating shape with elongated substantially parallel ridges having sloping sides, troughs formed between said sloping sides for conducting material which is being screened longitudinally of said troughs while it is being screened, undersides on said troughs, said undersides of said troughs being secured to said spaced frame members on the opposite sides of a plurality of said apertures with said ridges and troughs overlying said plurality of apertures, said elongated ridges having first end portions, said troughs having second end portions, and sealing means for sealing said first end portions of said elongated ridges against entry of material which is being screened while maintaining said second end portions unsealed to permit passage of said material being screened therethrough, and at least one support beneath at least one of said ridges.

The present invention discloses, in certain embodiments, a plurality of screen assemblies for mounting on a vibratory screening machine for screening material, each assembly with a plate, a plurality of apertures in said plate, elongated spaced plate members on opposite sides of said plurality of apertures, a screen formed in an undulating shape with elongated substantially parallel ridges, troughs formed between said ridges of each of said screen assemblies for conducting material longitudinally of said troughs while it is being screened, and undersides on said troughs, said undersides of said troughs being secured to said elongated spaced plate members on the opposite sides of a plurality of said apertures, each screen assembly being mounted adjacent to another screen assembly with said ridges and troughs of adjacent assemblies being in alignment so that material which is being screened can pass longitudinally through the aligned troughs of said adjacent screen assemblies, and at least one support beneath at least one of said ridges.

The present invention discloses, in certain embodiments, a plurality of screen assemblies for mounting on a vibratory screening machine for screening material, each assembly with a frame, a plurality of apertures in said frame, elongated spaced frame members on opposite sides of said plurality of apertures, a screen formed in an undulating shape with elongated substantially parallel ridges, troughs formed between said ridges of each of said screen assemblies for conducting material which is being screened longitudinally of said troughs while it is being screened, and undersides on said troughs, said undersides of said troughs being secured to said spaced frame members on the opposite sides of a plurality of said apertures with said ridges over-lying said plurality of apertures, each assembly being mounted adjacent to another screen assembly with said ridges and troughs of adjacent assemblies being in alignment so that material which is being screened can pass longitudinally through the aligned troughs of said adjacent screen assemblies, and at least one support beneath at least one of said ridges.

The present invention discloses, in certain embodiments, a screen assembly for screening material in a vibratory screening machine, said assembly with a plate having a length and a width, an area defined by said length and width, a plurality of plate members on said plate, a plurality of apertures defined by said plate members, a multiple-layer screen formed in an undulating shape to provide a screening area which is larger than said area of said plate, said multiple layer screen including a plurality of elongated alternating parallel ridges and troughs, said ridges further including side walls extending toward said plate and defining said troughs for conducting material which is being screened longitudinally of said troughs while it is being screened, undersides on said plurality of troughs, said undersides of said plurality of troughs being secured to said plate members where said undersides of said troughs overlie said plate members, said plurality of ridges which comprise said screening area which is larger than the area of said plate overlying said plurality of apertures, said screen comprising an undulating screening screen and an apertured plate formed in the same undulating shape as said screening screen and located in underlying relationship thereto and secured to said plate, said elongated ridges having first end portions which are sealed against entry of material which is being screened, and said troughs having second end portions which are unsealed, and at least one support beneath at least one of said ridges.

The present invention discloses, in certain embodiments, a screen assembly for screening material in a vibratory screening machine, said assembly with a plate having a length and a width, an area defined by said length and width, a plurality of plate members on said plate, a plurality of apertures defined by said plate members, a multiple-layer screen formed in an undulating shape to provide a screening area which is larger than said area of said plate, said multiple layer screen including a plurality of elongated alternating parallel ridges and troughs, said ridges further including side walls extending toward said plate and defining said troughs for conducting material which is being screened longitudinally of said troughs while it is being screened, undersides on said plurality of troughs, said undersides of said plurality of troughs being secured to said plate members where said undersides of said troughs overlie said plate members, said plurality of ridges which comprise said screening area which is larger than the area of said plate overlying said plurality of apertures, said elongated ridges have first end portions which are sealed against entry of material which is being screened, and said troughs have second end portions which are unsealed, and at least one support beneath at least one of said ridges.

The present invention discloses, in certain embodiments a screen assembly for screening material in a vibratory screening machine, said assembly with a plate having a length and a width, an area defined by said length and width, a plurality of plate members on said plate, a plurality of apertures defined by said plate members, a multiple-layer screen formed in an undulating shape to provide a screening area which is larger than said area of said plate, said multiple layer screen including a plurality of elongated alternating parallel ridges and troughs, said ridges further including side walls extending toward said plate and defining said troughs for conducting material which is being screened longitudinally of said troughs while it is being screened, undersides on said plurality of troughs, said undersides of said plurality of troughs being secured to said plate members where said undersides of said trough overlie said plate members, said plurality of ridges which comprise said screening area which is larger than the area of said plate overlying said plurality of apertures, said screen comprising an undulating base screen of relatively large mesh, an undulating top screening screen of fine mesh, and an undulating intermediate screening screen of less fine mesh than said top screen, said intermediate screen being located between said base screen and said top screen, said elongated ridges have first end portions which are sealed against entry of material which is being screened, and said troughs have second end portions which are unsealed, and at least one support beneath at least one of said ridges.

The present invention discloses, in certain embodiments, a screen assembly for screening material in a vibratory screening machine with an undulating apertured plate having ridges and troughs between said ridges, and a screen formed in the same configuration as said apertured plate and bonded in complementary mating relationship thereto, open ends on said ridges and said troughs, and means for sealing said open ends of said ridges while permitting said open ends of said troughs to remain unsealed, and at least one support beneath at least one of said ridges.

The present invention discloses, in certain embodiments, a screen for screening material in a vibratory screening machine comprising a coarse screen and a fine screen bonded thereto, said fine and coarse screens being formed into an undulating shape having substantially parallel ridges and troughs between said ridges for conducting material being screened in a direction longitudinally of said troughs while said material is being screened, said ridges having first ends, seals sealing said first ends of said ridges, and said troughs having second ends while are unsealed, and at least one support beneath at least one of said ridges.

The present invention, therefore, provides in certain, but not necessarily all, embodiments, a screen assembly for a vibratory separator, the screen assembly with a panel with two connected pairs of spaced-apart sides including a first pair of spaced-apart side separated by a second pair of spaced-apart sides, a plurality of spaced-apart strips extending between the first pair of spaced-apart sides, each adjacent pair of the plurality of spaced-apart strips defining a space therebetween through the panel, a first mesh bonded to the spaced-apart strips, and a second mesh bonded to the first mesh. Such a screen assembly may have one, some, or all of the following: wherein the first mesh is a backup mesh ranging between 2 mesh and 30 mesh; wherein the second mesh is a fine mesh ranging between 14 mesh and 500 mesh; wherein the first mesh is 12 mesh and the second mesh is 180 mesh; wherein the panel and its sides and strips are made of material from the group consisting of iron, steel, stainless steel, zinc, zinc alloy, aluminum, aluminum alloy, plastic, polytetrafluoroethylene, fiberglass, cermet and composite; wherein the strips are formed by cutting out the spaces therebetween with a laser; wherein the strips range in width between about 0.10 inches and about 3.00 inches; wherein the strips are about 0.22 inches wide; wherein the strips are spaced-apart between about 0.2 inches to about 4.00 inches; wherein the strips are about 1.3 inches apart; wherein the panel, sides and strips are made of 14 gauge cold rolled steel; a third mesh on top of the second mesh; wherein the third mesh ranges between 100 mesh and 300 mesh; wherein the third mesh is bonded to the second mesh; wherein the first mesh is made of wire of a first diameter and the second mesh is made of wire of a second diameter smaller than the first diameter; wherein the first mesh is made of wire of a first diameter and the second mesh is made of wire of a second diameter smaller than the first diameter and the third mesh is made of wire of a third diameter smaller than the second diameter; wherein the strips are separate pieces secured to and between the first pair of spaced-apart sides or are formed from an integral panel piece by cutting, e.g. but not limited to with a laser or a saw; and/or wherein the strips are straight or are curved or have at least a curved portion as viewed from above.

The present invention, therefore, provides in certain, but not necessarily all, embodiments, a screen assembly for a vibratory separator, the screen assembly with a panel with two connected pairs of spaced-apart sides including a first pair of spaced-apart side separated by a second pair of spaced-apart sides, a plurality of spaced-apart strips extending between the first pair of spaced-apart sides, each adjacent pair of the plurality of spaced-apart strips defining a space therebetween through the panel, a first mesh bonded to the spaced-apart strips, a second mesh bonded to the backup mesh, wherein the first mesh is a backup mesh ranging between 2 mesh and 30 mesh, wherein the second mesh is a fine mesh ranging between 14 mesh and 500 mesh, wherein the panel and its sides and strips are made of material from the group consisting of iron, steel, stainless steel, zinc, zinc alloy, aluminum, aluminum alloy, plastic, polytetrafluoroethylene, fiberglass, cermet and composite, wherein the strips range in width between about 0.10 inches and about 3.00 inches, wherein the strips are spaced-apart between about 0.2 inches to about 4.00 inches, and wherein the first mesh is made of wire of a first diameter and the second mesh is made of wire of a second diameter smaller than the first diameter. Such a screen assembly may also have a third mesh as any third mesh described above.

Figure 54A:
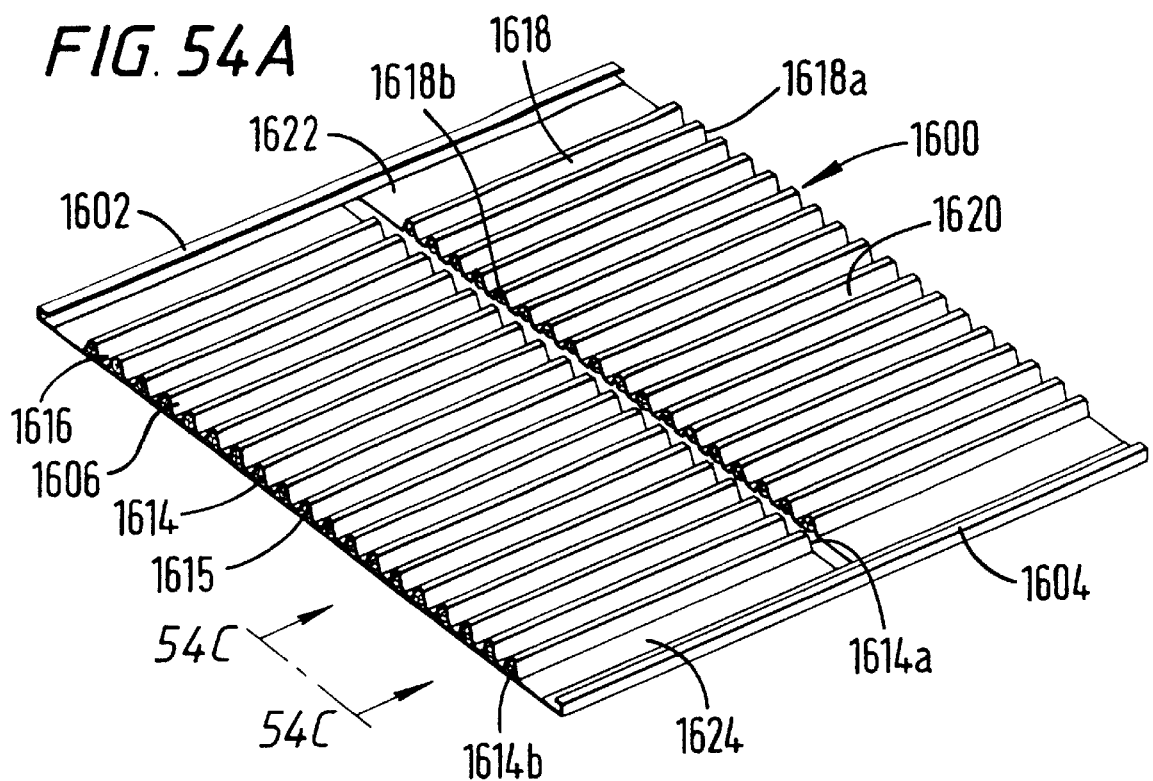
FIG. 54A is a perspective view of a screen apparatus according to the present invention.
Figure 54B:
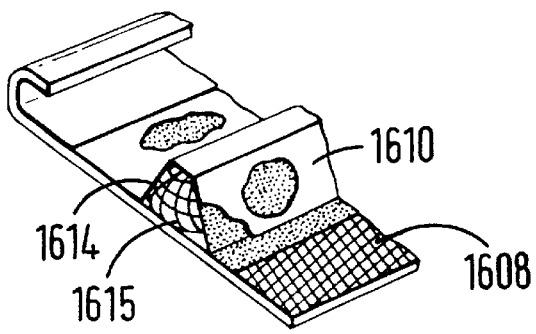
FIG. 54B is an enlarged view of part of the screen apparatus of FIG. 54A.
Figure 54C:
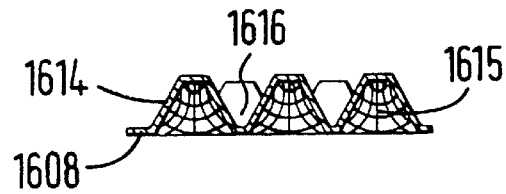
FIG. 54C is a view along line 54C—54C of FIG. 54A.

FIGS. 54A–54C show a screen 1600 according to the present invention useful, e.g. in a vibratory shaker, shale shaker, and/or the apparatus of FIG. 33, which has hook strips 1602 and 1604 on either side thereof. Screening material 1606 is connected along the length of each hook strip by known methods, e.g. folding, welding, crimping together, epoxying, press/fiction fit, and/or interlocking of parts. In one aspect no underlying plate, straps, or strips and no frame are used with the screen 1600.

The screening material 1606 may be any known screening material, screen and/or mesh or combination thereof and/or any screening material disclosed herein. In the screen 1600 as shown, the screening material 1606 includes a lower mesh (e.g. 1 to 80 mesh) 1608 which may be a relatively coarse mesh and an upper mesh 1610 (e.g. 8 to 400 mesh) and which may be a relatively fine mesh. Two fine mesh screens and one coarse mesh screen may also be used. The fine screen may be bonded to the coarse mesh, sewed to the coarse mesh, glued to it, welded to it, and/or sintered to it.

An optional perforated plate or a series of straps or strips may be used below the coarse mesh, including, but not limited to, any as disclosed herein. One, two, three or more layers of wire mesh may be used instead of or with such a plate, straps, or strips. In one particular aspect a flat coarse mesh (e.g. mesh 1 to mesh 12) is used instead of or in addition to a plate, straps, or strips.

Mesh (fine, coarse, or both) is folded over open exposed ends of ridges 1614 and 1618. This mesh can be substantially flat over the open ridge end or, as shown, it can protrude as part of a bulb or closed curve shape 1615. Such shape can provide more screen area for separation and can deflect and re-route solids and fluid to a subsequent set of valleys. Alternatively any or all openings may be plugged with a solid, porous, or perforated plug glued or welded in place. Alternatively, instead of folding screening material and/or mesh over the ends of ridges, a separate piece of screen, screens, mesh, and/or meshes can be placed at an open ridge end and the edges of the piece attached to, connected to, interlocked with, interwoven with, and/or adhered to the edges of the ridge end opening. Also, it is within the scope of this invention for any ridge end to be closed off to fluid flow, to be covered with screen(s) and/or mesh, and/or to be plugged. It is within the scope of this invention for all ridge ends on one side of a series of ridges (e.g. on side 1618a or 1614a) to be closed off to flow while the other side's ridge ends (e.g. on side 1618b or 1614b) are covered with material which permits flow [e.g. perforated plug, screen(s), mesh(es)]. These possibilities for end closure and end openings may be used with any screen assembly disclosed herein. It is also within the scope of this invention for all ridge ends of all ridge sets to be open.

Figure 54D:
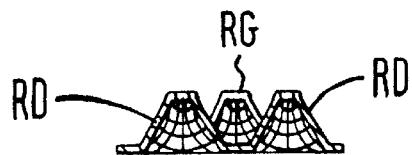
FIG. 54D is a view of another version of the screen of FIG. 54A looking at it as in FIG. 54C.

A series of valleys or troughs 1616 is interspersed between the series of ridges 1614. A second series of ridges 1618 and valleys 1620 is offset from the ridges 1614/valleys 1616, as shown in FIGS. 54A–54D. Alternatively, as shown in FIG. 54D the shape of one set of ridges RD can overlap (when viewed on end) the ridges RG of the other set of ridges. It is within the scope of this invention to employ any desired amount of such overlap. As shown, e.g. in FIGS. 54C and 54D, the ridges are of substantially the same height and ridge ends are of substantially the same cross-sectional area. It is also within the scope of this invention for the ridges of one set of ridges to be of a different width than those of the other set; for the one set to be wider or narrower than the second set; for ridges or ridge ends on one set to have a different cross-sectional area than those of another set; and/or to employ three, four, five, six or more series of offset ridges on a single screen. Optional side paths 1622 and 1624 may be eliminated by having a ridge edge or ridge adjacent a hook strip side or positioned against a frame side (when an optional frame is used) or side member if hook strips are not used.

Figure 54E:
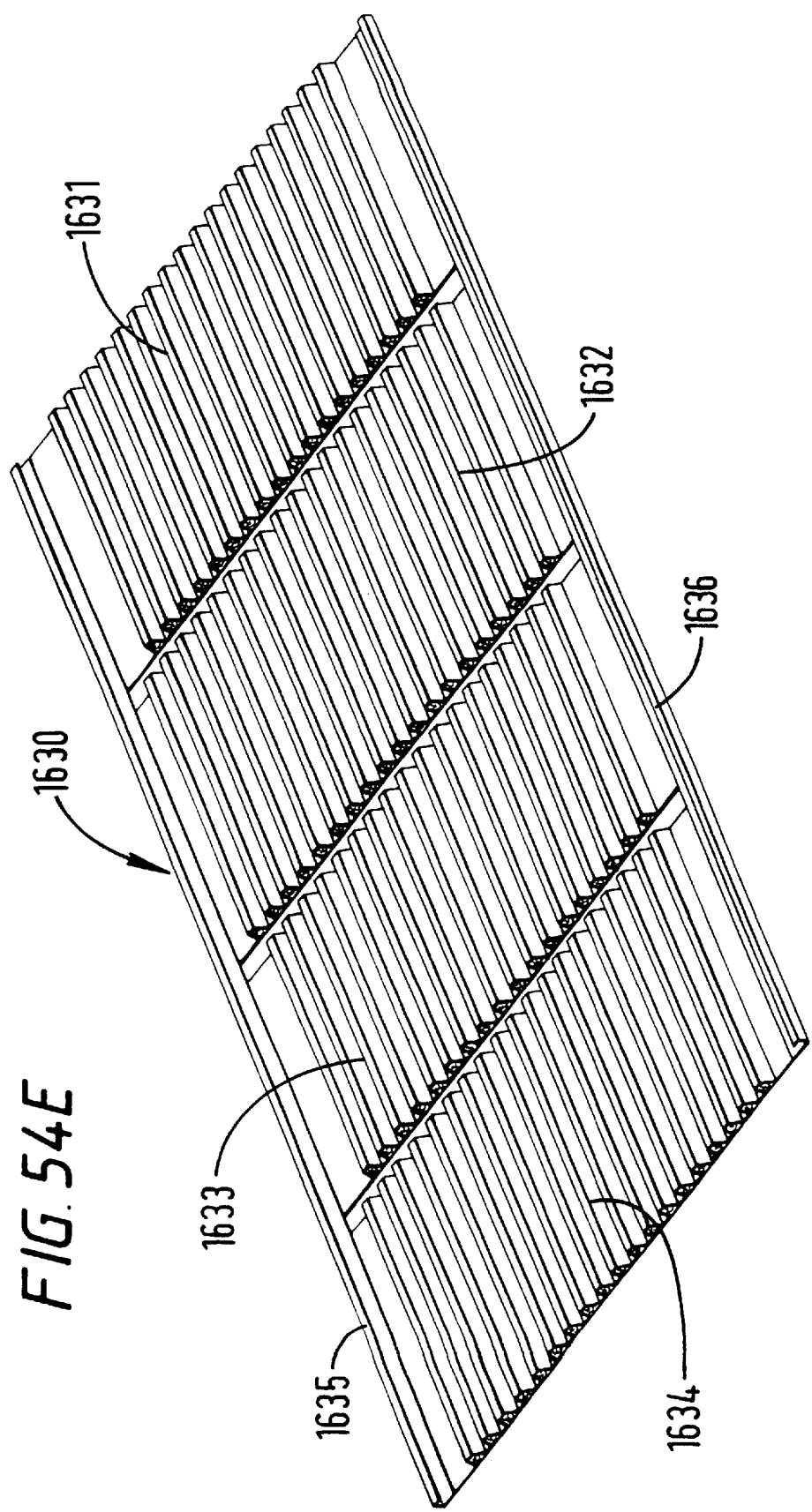
FIG. 54E is a perspective view of a screen apparatus according to the present invention.

FIG. 54E presents a screen apparatus 1630 with four sets of offset ridges 1631, 1632, 1633, 1634 and hook strip sides 1635, 1636.

FIGS. 55A–55C show a screen apparatus 1640, e.g. useful with a vibratory shaker, shale shaker and/or apparatus as in FIG. 33, with a series of ridges 1641 and valleys 1642 of screening material 1643 (like any of the screening material 1606, FIG. 54A). Ends of ridges are, optionally, covered with screen and/or mesh (or, alternatively, plugged as described above with either solid or perforated plugs) in a closed curved shape or bulbous shape 1644 or they may be flat. The screening material 1643 extends between side hook strips 1645, 1646. As shown in FIG. 55C, ridges of the set of ridges 1641 may have different heights; e.g. alternating high and low, high in the middle and lower on the ends, or as shown in FIG. 55C higher on the ends and lower in the middle. Any such series of ridges with height differences, with width differences, and, therefore, with differing cross-sectional area and different amount of surface area may be used for any ridge series or part thereof on any screen disclosed herein. As shown in FIG. 55C, the height (and also the cross-sectional area as viewed on end as in FIG. 55C) of the ridges may gradually decrease from the sides of the screen assembly to the middle. Alternatively, the height (and cross-sectional area) may increase from the screen sides to the screen middle.

FIGS. 55D–55H show possible shapes for ridge end coverings for the ends 1644 (and for any ridge end disclosed herein). The coverings are designated CV-55D, CV-55E, CV-55F, CV-55G and CV-55H for FIGS. 55D–55H, respectively.

FIG. 56A shows a screen apparatus 1650 according to the present invention, e.g. useful with a vibratory shaker, shale shaker and/or apparatus as in FIG. 33, with three sub-screens 1651, 1652, 1653 in an integral unit. Alternatively, three sub-screens may be connected together, e.g. with an interlock fit or suitable fasteners. It is within the scope of this invention to employ two, four or more appropriately sized sub-screens in an integral unit or interconnected. Each sub-screen has a series of alternating ridges and valleys 1651R, 1652R, 1653R and 1651V, 1652V, 1653V, respectively. Each ridge-valleys et is at an angle to hook strip sides SS of each screen, and the angle of the ridge-valley series of sub-screen 1652 is different from that of the sub-screens 1651 and 1653. As shown in FIG. 56B, ridges 1653R of the sub-screen 1653 are lined up with ridges 1652R of the sub-screen 1652, but it is within the scope of this invention for ridges of any set to be offset with respect to ridges of another set. For any screen in FIGS. 54A–56A the hook strip sides may be eliminated and any known suitable edge or side structure may be employed. Any one of the sub-screens 1651, 1652, 1653 may be eliminated and any two adjacent ridge-valley series in any screen herein may be offset as are the sub-screens in FIG. 56A.

Figure 57:
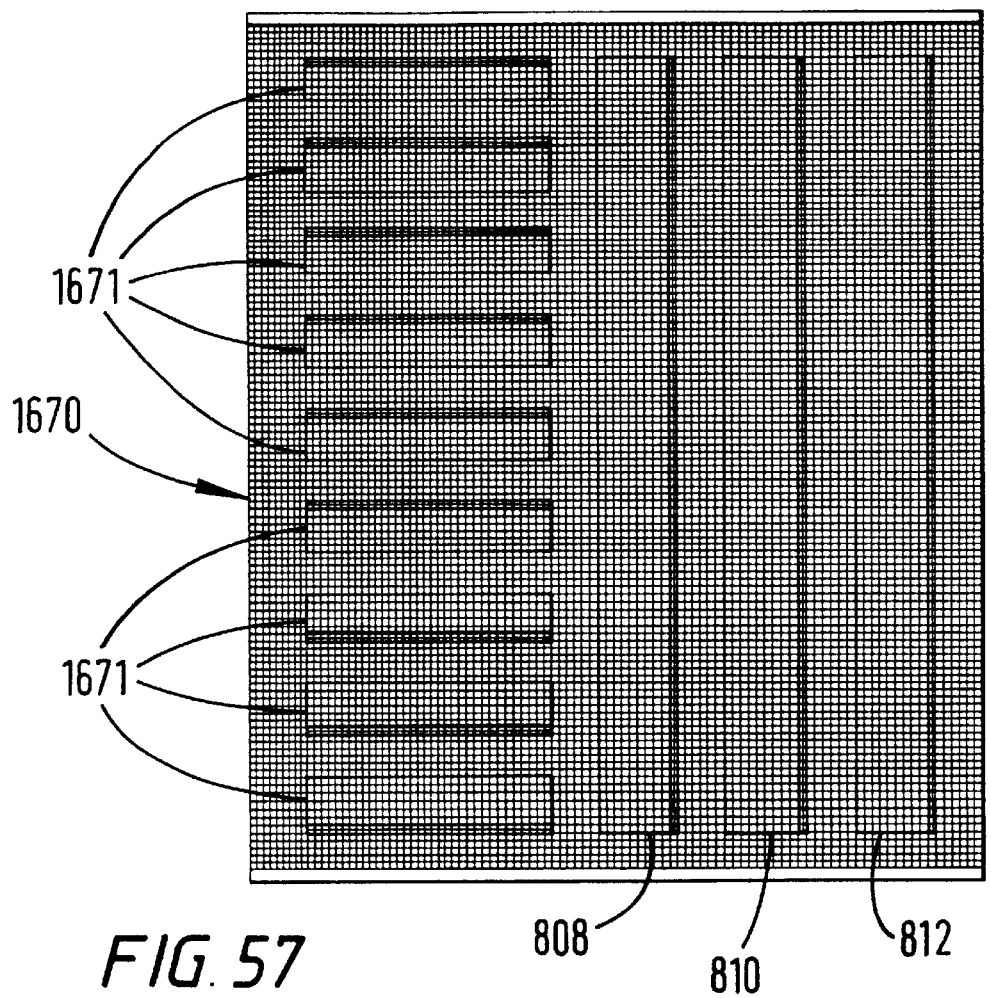
FIG. 57 is a top view of a screen according to the present invention.

FIG. 57 shows a screen 1670 according to the present invention which is like the screen of FIG. 24D, but with the addition of a series of spaced-apart ramps or raised portions 1671 (on the left side as viewed in FIG. 57). These portions 1671 are at an angle to the ramps 808, 810, 812, but it is within the scope of this invention for them to be normal (90° angle) to the ramps 808, 810, 812. The other parts of the screen 1670 are like those of the screen of FIG. 24D.

Figure 58:
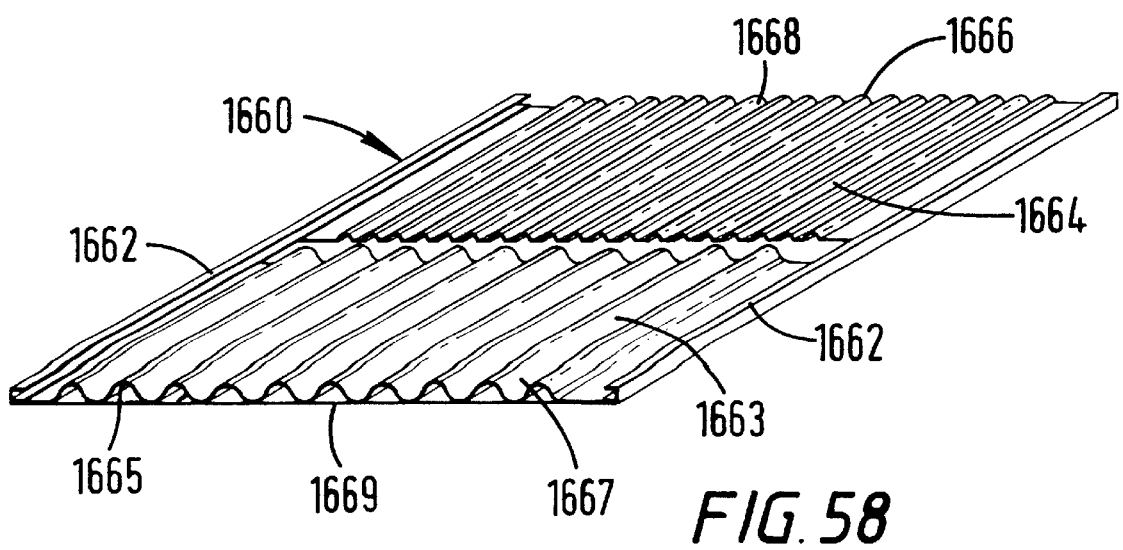
FIG. 58 is a perspective view of a screen according to the present invention.

FIG. 58 shows a screen assembly 1660 according to the present invention with side hook strips 1662 and a two ridge-valley series 1663, 1664. Ridges 1665 of the series 1663 are higher than ridges 1666 of the series 1664. Any suitable spacing between ridges may be employed. The series 1663, 1664 may be made of any mesh or screen or meshes or screen combination disclosed herein. Any plate, frame, straps or strips disclosed herein may, optionally, be used with the screen assembly 1660; but in one aspect no such item is used. As shown flow is from the lower height series 1664 to the higher height series 1663; but it is within the scope of this invention to flow fluid from a higher height series to a lower height series. As shown screening material 1667, 1668 [any screen(s) and/or mesh(es) described herein] is connected to (in any way disclosed herein) an optional flat coarse mesh 1669.

FIG. 59A shows a screen assembly 1670 according to the present invention with side hook strips 1671 and two series of ridge-valley screen material [any screen(s) and/or mesh (es) disclosed herein] 1672, 1673 which are angled to direct flow generally toward the center of the screen assembly. The screening material of the series 1672, 1673 is, optionally, connected to (in any way disclosed herein) a flat coarse mesh 1674. Although optional, any plate, frame, strips, or straps disclosed herein may be used with the assembly 1670.

FIG. 60B shows a screen assembly 1680 according to the present invention with side hook strips 1681 and a series of ridge-valleys 1682. Each ridge 1683 of the series 1682 is higher at one end than the other, as illustrated in FIG. 60A. Any desired height difference may be employed and flow may be either way, from the higher ridge end to the lower, or vice versa. Also, a ridge end top 1684 is narrower than a ridge end top 1685. Alternatively, the end 1684 may be wider than the end 1685. Any ridge disclosed herein or any series of ridges disclosed herein may have a height differential from end-to-end and/or any ridge disclosed herein may have one ridge end of a particular ridge wider than the other end of the ridge and/or with different cross-sectional area. The series 1682 is made of any screening material [screen(s) and/or mesh(es)] disclosed herein. The series 1682 is, optionally, connected to a flat coarse screen (any disclosed herein) 1686. Alternatively or in addition to the screen 1686 any plate, frame, strap or strips disclosed herein may be used. In one particular aspect the linear measurement E1=E2 and A1+B1+C1+D1=A2+B2+C2+D2, although any suitable desired lengths may be employed, and one end (the end 1684) is higher than the end 1685. Ridge ends of the assembly 1680 (as may be any ridge end disclosed herein) may be covered or plugged in any way as described above.

In certain embodiments any of the panels of FIGS. 45G–45P may be used with any of the screens and/or meshes of FIGS. 54A–60A.

The present invention, therefore, provides in certain, but not necessarily all embodiments, a screen assembly for a vibratory separator, the screen assembly having at least two ridge-valley series of screening material comprised of a plurality of alternating ridges and valleys of screening material, and at least one of the ridge-valley series of screening material offset from at least one other ridge-valley series of screening material with ridge ends open to fluid flow or closed off to fluid flow, or with any one or some ridge ends open and one or some closed; such a screen assembly may have one, some (in any possible combination) or all of the following: hook strip connection apparatus on spaced-apart sides of said at least two ridge-valley series of screening material; wherein the at least one ridge-valley series of screening material offset from at least one other ridge valley series of screening material is a first series and said other ridge-valley series is a second series, the first series with ridges different in height from the second series and/or with the same or different cross-sectional area; wherein the at least one ridge-valley series of screening material offset from at least one other ridge valley series of screening material is a first series and said other ridge-valley series is a second series, the first series with valleys different in width from the second series and/or with the same or different cross-sectional area; wherein the at least one ridge-valley series of screening material offset from at least one other ridge valley series of screening material is a first series and said other ridge-valley series is a second series, the first series with ridges different in width from the second series and/or with the same or different cross-sectional area; wherein ends of the ridges of the ridge-valley series of screening material are closed off to fluid flow; wherein the ridge-valley series have two spaced-apart ends, said ends comprising a plurality of ridge openings below the ridges, said openings covered with screen or mesh material; wherein said ends are covered with screen or mesh material in a generally bulbous shape; wherein at least one ridge-valley series of screening material has a plurality of ridges, the ridges of differing height, with said height higher at two-spaced apart sides of said screen assembly and said height lower in a middle between spaced-apart sides of said screening material; wherein at least one ridge-valley series of screening material has a plurality of ridges, the ridges of differing height with said height lower at two-spaced apart sides of said screen assembly and said height higher in a middle between spaced-apart sides of said screening material; wherein said at least two ridge-valley series of screening material is a first series and a second series, said first series at an angle to said second series as viewed from above; a third ridge-valley series and said second series at an angle to said third series as viewed from above; a flat screen of screening material, said at least two ridge-valley series on said flat screen; wherein said flat screen is made of coarse mesh and said at least two ridge-valley series are made of fine mesh(es) or fine screen(s); wherein the ridge-valley series have two spaced-apart ends, said ends comprising a plurality of ridge openings below the ridges, said openings closed off to fluid flow with solid material and/or plugs; wherein the ridge-valley series have two spaced-apart ends, said ends including a first set of ends and a second set of ends and each end set comprising a plurality of ridge openings below its ridges, said openings of said first set of ends covered with screen or mesh material and said openings of said second set of ends closed off to fluid flow.

The present invention, therefore, provides in certain, but not necessarily all embodiments, a screen assembly for a vibrator separator apparatus, the screen assembly having at least one ridge-valley series of screening material, said ridge-valley series including a plurality of ridges each ridge between valleys of a plurality of valleys, and each ridge having a first end spaced apart from a second end, said first end having a top wider than a top of the second end, said first end having a cross-sectional area the same as or different from that of the second end. Such a screen assembly with one, some (in any possible combination) or all of the following: wherein said second end is higher than said first end; hook strip connection apparatus on spaced-apart sides of said at least one ridge-valley series; and/or wherein ends of the ridges of the ridge-valley series of screening material are covered with at least one screen or mesh.

The present invention, therefore, provides in certain, but not necessarily all embodiments, a screen assembly for a vibratory separator, the screen assembly having at least two ridge-valley series of screening material including at least a first series adjacent a second series, said first series comprising a first side series and a second side series each of a plurality of ridges and valleys, said first side series at an angle to said second side series as viewed from above, and said second series comprising a third side series and a fourth side series each of a plurality of ridges and valleys, said third side series at an angle to said fourth side series as viewed from above.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A screen assembly for a vibratory separator, the screen assembly comprising
    at least two ridge-valley series of screening material comprised of a plurality of alternating ridges and valleys of screening material,
    at least one of the ridge-valley series of screening material offset from at least one other ridge-valley series of screening material, and
    a flat screen of screening material, said at least two ridge-valley series on said flat screen.

2. The screen assembly of claim 1 further comprising
    hook strip connection apparatus on spaced-apart sides of said at least two ridge-valley series of screening material.

3. The screen assembly of claim 1 wherein the at least one ridge-valley series of screening material offset from at least one other ridge valley series of screening material is a first series and said other ridge-valley series is a second series, the first series with ridges different in height from the second series.

4. The screen assembly of claim 1 wherein the at least one ridge-valley series of screening material offset from at least one other ridge valley series of screening material is a first series and said other ridge-valley series is a second series, the first series with valleys different in width from the second series.

5. The screen assembly of claim 1 wherein the at least one ridge-valley series of screening material offset from at least one other ridge valley series of screening material is a first series and said other ridge-valley series is a second series, the first series with ridges different in width from the second series.

6. The screen assembly of claim 1 wherein ends of the ridges of the ridge-valley series of screening material are closed off to fluid flow.

7. The screen assembly of claim 1 wherein the ridge-valley series have two spaced-apart ends, said ends comprising a plurality of ridge openings below the ridges, said openings covered with screen or mesh material.

8. The screen assembly of claim 7 wherein said ends are covered with screen or mesh material in a generally bulbous shape.

9. The screen assembly of claim 1 wherein at least one ridge-valley series of screening material has a plurality of ridges, the ridges of differing height, with said height higher at two-spaced apart sides of said screen assembly and said height lower in a middle between spaced-apart sides of said screening material.

10. The screen assembly of claim 1 wherein at least one ridge-valley series of screening material has a plurality of ridges, the ridges of differing height with said height lower at two-spaced apart sides of said screen assembly and said height higher in a middle between spaced-apart sides of said screening material.

11. The screen assembly of claim 1 wherein
    said at least two ridge-valley series of screening material is a first series and a second series, and
    said first series at an angle to said second series as viewed from above.

12. The screen assembly of claim 11 further comprising
    a third ridge-valley series and said second series at an angle to said third series as viewed from above.

13. The screen assembly of claim 1 wherein said flat screen is made of coarse mesh and said at least two ridge-valley series are made of fine mesh.

14. The screen assembly of claim 1 wherein the ridge-valley series have two spaced-apart ends, said ends comprising a plurality of ridge openings below the ridges, said openings closed off to fluid flow.

15. The screen assembly of claim 1 wherein the ridge-valley series have two spaced-apart ends, said ends including a first set of ends and a second set of ends and each end set comprising a plurality of ridge openings below the ridges, said openings of said first set of ends covered with screen or mesh material and said openings of said second set of ends closed off to fluid flow.

16. A screen assembly for a vibrator separator apparatus, the screen assembly comprising
    at least one ridge-valley series of screening material,
    said ridge-valley series including a plurality of ridges each ridge between valleys of a plurality of valleys,
    each ridge having a first end spaced apart from a second end, said first end having a top wider than a top of the second end, and
    wherein ends of the ridges of the ridge-valley series of screening material are covered with at least one screen or mesh.

17. The screen assembly of claim 16 wherein said second end is higher than said first end.

18. The screen assembly of claim 16 further comprising
    hook strip connection apparatus on spaced-apart sides of said at least one ridge-valley series.

19. A screen assembly for a vibratory separator, the screen assembly comprising
    at least two ridge-valley series of screening material comprised of a plurality of alternating ridges and valleys of screening material,
    at least one of the ridge-valley series of screening material offset from at least one other ridge-valley series of screening material, and wherein the ridge-valley series have two spaced-apart ends, said ends comprising a plurality of ridge openings below the ridges, said openings covered with screen or mesh material.

20. The screen assembly of claim 19 wherein said ends are covered with screen or mesh material in a generally bulbous shape.

21. A screen assembly for a vibratory separator, the screen assembly comprising at least two ridge-valley series of screening material comprised of a plurality of alternating ridges and valleys of screening material, at least one of the ridge-valley series of screening material offset from at least one other ridge-valley series of screening material, and wherein at least one ridge-valley series of screening material has a plurality of ridges, the ridges of differing height, with said height higher at two-spaced apart sides of said screen assembly and said height lower in a middle between spaced-apart sides of said screening material.

22. A screen assembly for a vibratory separator, the screen assembly comprising at least two ridge-valley series of screening material comprised of a plurality of alternating ridges and valleys of screening material, at least one of the ridge-valley series of screening material offset from at least one other ridge-valley series of screening material, and wherein at least one ridge-valley series of screening material has a plurality of ridges, the ridges of differing height with said height lower at two-spaced apart sides of said screen assembly and said height higher in a middle between spaced-apart sides of said screening material.

23. A screen assembly for a vibratory separator, the screen assembly comprising at least two ridge-valley series of screening material comprised of a plurality of alternating ridges and valleys of screening material, at least one of the ridge-valley series of screening material offset from at least one other ridge-valley series of screening material, said at least two ridge-valley series of screening material is a first series and a second series, and said first series at an angle to said second series as viewed from above.

24. The screen assembly of claim 23 further comprising a third ridge-valley series and said second series at an angle to said third series as viewed from above.

25. A screen assembly for a vibratory separator, the screen assembly comprising at least two ridge-valley series of screening material comprised of a plurality of alternating ridges and valleys of screening material, at least one of the ridge-valley series of screening material offset from at least one other ridge-valley series of screening material, and wherein the ridge-valley series have two spaced-apart ends, said ends including a first set of ends and a second set of ends and each end set comprising a plurality of ridge openings below the ridges, said openings of said first set of ends covered with screen or mesh material and said openings of said second set of ends closed off to fluid flow.

26. A screen assembly for a vibratory separator, the screen assembly comprising at least two ridge-valley series of screening material including at least a first series adjacent a second series, said first series comprising a first side series and a second side series each of a plurality of ridges and valleys, said first side series at an angle to said second side series as viewed from above, and said second series comprising a third side series and a fourth side series each of a plurality of ridges and valleys, said third side series at an angle to said fourth side series as viewed from above.

* * * * *